United States Patent
Berkebile

(10) Patent No.: US 12,361,650 B2
(45) Date of Patent: Jul. 15, 2025

(54) SYSTEMS AND METHODS FOR VIRTUAL AND AUGMENTED REALITY

(71) Applicant: MAGIC LEAP, INC., Plantation, FL (US)

(72) Inventor: Robert David Berkebile, Phoenix, MD (US)

(73) Assignee: Magic Leap, Inc., Plantation, FL (US)

( * ) Notice: Subject to any disclaimer, the term of this patent is extended or adjusted under 35 U.S.C. 154(b) by 336 days.

(21) Appl. No.: 17/950,424

(22) Filed: Sep. 22, 2022

(65) Prior Publication Data

US 2023/0016490 A1 Jan. 19, 2023

Related U.S. Application Data

(63) Continuation of application No. 17/083,808, filed on Oct. 29, 2020, now Pat. No. 11,494,995.

(60) Provisional application No. 62/927,433, filed on Oct. 29, 2019, provisional application No. 62/982,434, filed on Feb. 27, 2020.

(51) Int. Cl.
*G06T 19/00* (2011.01)
*G06T 17/20* (2006.01)

(52) U.S. Cl.
CPC ............ *G06T 19/006* (2013.01); *G06T 17/20* (2013.01)

(58) Field of Classification Search
None
See application file for complete search history.

(56) References Cited

U.S. PATENT DOCUMENTS 9,183,676 B2 * 11/2015 McCulloch ........... G06T 19/006
2020/0226820 A1 7/2020 Stachniak et al.

OTHER PUBLICATIONS

Final Office Action for U.S. Appl. No. 17/083,808 dated Apr. 5, 2022.
Non-Final Office Action for U.S. Appl. No. 17/083,808 dated Oct. 14, 2021.
Amendment Response to NFOA for U.S. Appl. No. 17/083,808 dated Jan. 12, 2022.
Amendment Response to FOA for U.S. Appl. No. 17/083,808 dated Jun. 3, 2022.
Notice of Allowance for U.S. Appl. No. 17/083,808 dated Jan. 27, 2022.

* cited by examiner

*Primary Examiner* — Nicholas R Wilson
(74) *Attorney, Agent, or Firm* — Vista IP Law Group, LLP

(57) ABSTRACT

Disclosed are methods, systems, and computer program products that present, by a spatial computing system, an extended reality presentation to a user, wherein the extended reality presentation comprises virtual object(s) generated by a spatial computing system and transmitted to one or both eyes of the user and a physical environment that includes a first physical object and a second physical object and is perceived by the user via light reflected from the physical environment. The extended-reality representation is rendered for an object interaction between the first physical object and the first virtual object or the user. A physics-based effect on the first physical object by the object interaction is determined by using at least a stereoscopic model for the first physical object based at least in part upon the object interaction. The extended reality presentation into an undated extended reality presentation based at least in part upon the physics-based effect.

20 Claims, 41 Drawing Sheets

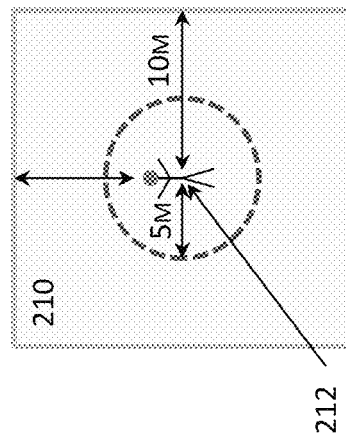
FIG. 2B-3
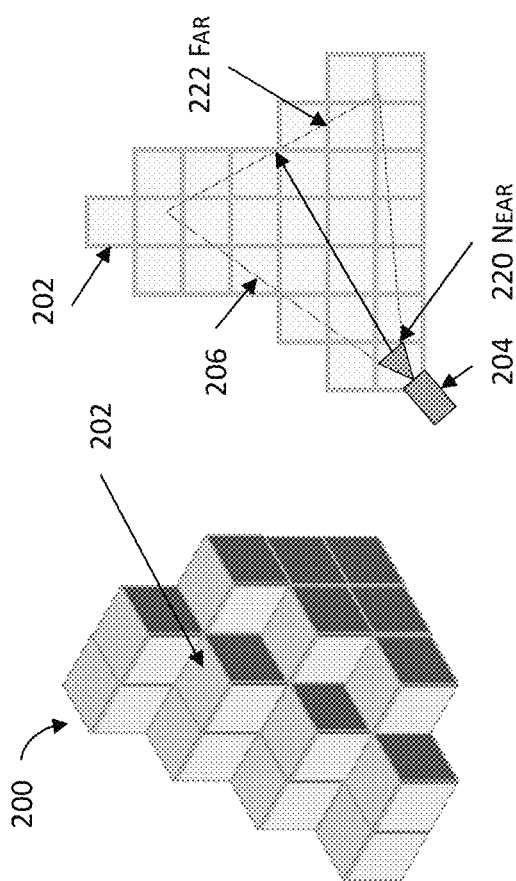
FIG. 2B-2
FIG. 2B-1

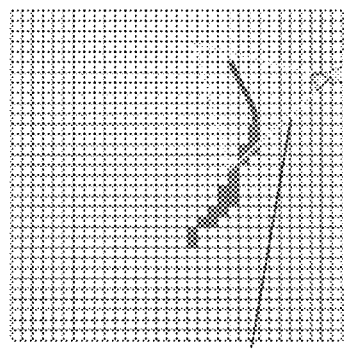
FIG. 2C-1
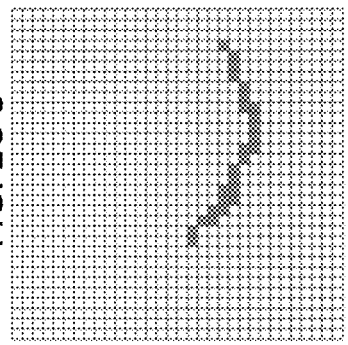
FIG. 2C-2
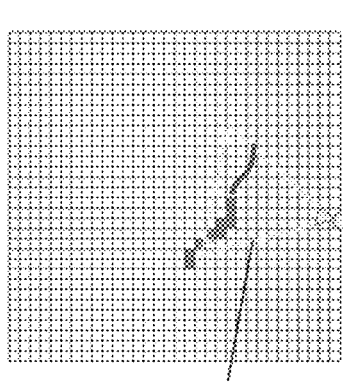
FIG. 2C-3
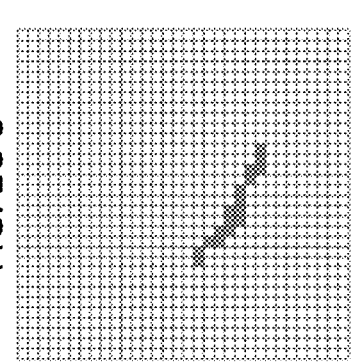
FIG. 2C-4
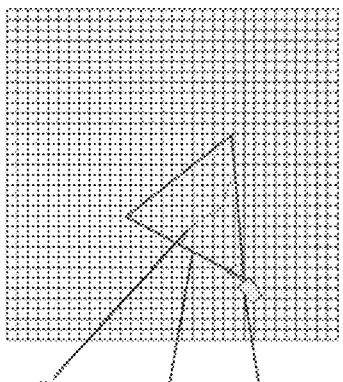
FIG. 2C-5
FIG. 2C-6

206 User 1 and User 2 are both wearing spatial computing system which may comprise components such as a head-worn component (2), a hand-held controller component (4), and/or an auxiliary computing or controller component (6)

↓

208 Local environment for each of the users (such as features of their local room(s), which may or may not be the same rom) is meshed, and their spatial computing systems are capable of utilizing Persistent Coordinate frame ("PCF") information

↓

210 The spatial computing systems of User 1 and User 2 are both on the same UDP local network and able to work with one or more established PCFs, and in one embodiment both the spatial computing systems of User 1 and User 2 may be running the same app that has the same identifier in the app (within an environment such as Unity), so that User 1 and User 2 may exchange packets of information pertaining to messages, remote RPC commands, changes to global variables, and/or shares of created and/or changing object(s), etc., and also maintain known relative positions and orientations of the various components of User 1's spatial computing system relative to those of User 2 (and vice versa) through the one or more PCFs

↓

212 User 1 and User 2 may exchange packets of information within their connectivity paradigm to interact with each other through their computing systems to perform actions such as exchange messages, remote RPC commands, changes to global variables, or shares of created and/or changing object(s), et., some or all of which may be performed relative to commonly utilized PCF information, so that the users may predictably experience the locations and orientations of the components of the systems of each other in a shared experience, such as a shared and collaboratively created 3-dimensional spatial drawing (e.g., as though they are sharing and visualizing a portion of the same 3-dimensional space, whether or not they are actually in the same physical location)

FIG. 3H

SYSTEMS AND METHODS FOR VIRTUAL AND AUGMENTED REALITY

CROSS REFERENCE TO RELATED U.S. PATENT APPLICATIONS

This application is a continuation of U.S. patent application Ser. No. 17/083,808 that has the title "SYSTEMS AND METHODS FOR VIRTUAL AND AUGMENTED REALITY" filed on Oct. 29, 2020 and claims the benefit of U.S. Prov. Pat. App. Ser. No. 62/927,433 entitled "SYSTEMS AND METHODS FOR VIRTUAL AND AUGMENTED REALITY" and filed on Oct. 29, 2019 and U.S. Prov. Pat. App. Ser. No. 62/982,434 entitled "SYSTEMS AND METHODS FOR VIRTUAL AND AUGMENTED REALITY" and filed on Feb. 27, 2020. The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computing and display technologies have facilitated the development of systems for so-called "virtual reality" (VR), "augmented reality" (AR) experiences, "mixed reality" (MR) experiences, and/or extended reality (XR) experiences (hereinafter collectively referred to as "mixed reality" and/or "MR"), where digitally reproduced images or portions thereof are presented to a user in a manner where they seem to be, or may be perceived as, real. A VR scenario typically involves presentation of digital or virtual image information without transparency to other actual real-world visual input, whereas an AR or MR scenario typically involves presentation of digital or virtual image information as an augmentation to visualization of the real world around the user such that the digital or virtual image (e.g., virtual content) may appear to be a part of the real world. However, MR may integrate the virtual content in a contextually meaningful way, whereas AR may not.

Applications of mixed reality technologies have been expanding from, for example, gaming, military training, simulation-based training, etc. to productivity and content creation and management. A mixed reality system has the capabilities to create virtual objects that appear to be, or are perceived as, real. Such capabilities, when applied to the Internet technologies, may further expand and enhance the capability of the Internet as well as the user experiences so that using the web resources is no longer limited by the planar, two-dimensional representation of web pages.

With the advent of MR systems and devices and the development therefor, MR systems and devices may bring about revolution to information technology and expand the applications of MR technologies to a new era beyond conventional applications such as gaming or mere Web browsing. For example, by hosting productivity software applications locally on MR systems or devices, by providing productivity software applications as services and/or microservices through, for example, a cloud-based environment to MR systems or devices, or a combination of locally hosted productivity software application(s) and cloud-based software services may simply revolutionize conventional ways of corporate work culture, office arrangement, the manners in which co-workers collaborate and/or perform their daily productivity tasks, etc. For example, a business entity may adopt MR devices to replace conventional desktop computers and/or laptop computers. Although the benefits may be numerous, management a fleet of MR devices and systems for enterprise applications of MR technologies is nevertheless lacking.

Therefore, there exists a need for methods, systems, and computer program products for mixed reality systems management.

SUMMARY

Disclosed are method(s), system(s), and article(s) of manufacture for management of mixed reality systems in one or more embodiments. Some embodiments are directed at a method for managing various aspects pertaining to mixed reality systems.

In some embodiments, these techniques determine a three-dimensional model for at least a portion of a physical environment in which a user is located; and present, by a spatial computing system, a mixed-reality representation to the user. In addition, these methods or systems determine a first object model for a first object in the mixed-reality representation and update, by the spatial computing system, the mixed-reality representation into an updated mixed-reality representation that reflects an interaction pertaining to the first object.

In some embodiments, one or more second objects in the at least the portion of the physical environment or in the mixed-reality representation may be recognized. In some of these embodiments, one or more physical objects in the at least the portion of the physical environment may be recognized; and the at least the portion of the physical environment may be decomposed into one or more sets of voxels.

In addition or in the alternative, at least one voxel of the one or more sets of voxels may be meshed with two-dimensional and/or three-dimensional mesh; and the at least the portion may be represented with the two-dimensional and/or three-dimensional mesh. In some of the immediately preceding embodiments, a physical object of the one or more physical objects may be replaced with a physical object model.

In some embodiments, one or more object recognizers may be identified, wherein an object recognizer of the one or more object recognizer is pre-configured to recognize a type of objects or a specific object. In some of these embodiments, the one or more second objects may be recognized at least by applying the one or more object recognizers to the one or more objects.

In some other embodiments, the one or more second objects may be recognized at least by performing a multi-level recognition process to the one or more objects, wherein the multi-level recognition process comprises a first level of applying one or more first object recognizers and a second level of applying one or more second object recognizers, and the first level is performed before the second level is performed.

In some of the immediately preceding embodiments, at least one second object may be pruned from the one or more second objects at least by applying the one or more first object recognizers to the one or more second objects; and a second object in the one or more second objects may be recognized at least by applying the one or more second object recognizers to one or more remaining second objects, wherein the one or more remaining second objects do not include the at least one second object.

In some of these embodiments, one or more properties may be identified for the second object based at least in part upon a type of the second object; and the one or more properties may be associated with the second object, wherein the one or more properties comprise one or more moduli, a density, a mass, a weight, a friction characteristic, or an electrical characteristic of the second object.

In some embodiments, the interaction comprises a user-to-object interaction between the user and the first object or an object-to-object interaction between the first object and a different object, and the different object comprises a virtual object or a physical object. In addition or in the alternative, updating the mixed-reality representation into the updated mixed-reality representation comprises at least one of: performing a physics-based behavior modeling for at least the first object model; performing object interaction modeling for the interaction and at least the first object model; or performing object soft locking for the first object or a separate object in the mixed-reality representation or the updated mixed-reality representation.

Some embodiments are directed at a hardware system that may be invoked to perform any of the methods, processes, or sub-processes disclosed herein. The hardware system may include or involve a mixed reality system having at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 2B-1 illustrates a simplified example schematic diagram for discretizing a three-dimensional (3D) space into voxels in one or more embodiments.

FIGS. 2B-2 illustrates a simplified example schematic diagram including a reconstruction range with respect to a single viewpoint in one or more embodiments.

FIGS. 2B-3 illustrates a simplified example schematic diagram for reconstructing a surface in a physical world into a voxel model by an image sensor viewing the surface from multiple positions and viewpoints in one or more embodiments.

FIGS. 2C-1 through 2C-6 illustrates example schematic diagrams for reconstructing a surface in a physical world into a voxel model by an image sensor viewing the surface from multiple positions and viewpoints in one or more embodiments.

FIG. 2I illustrates an example representation including some example status information or event information presented through an MR device in one or more embodiments.

FIG. 2T-1 illustrates an example field of view of a user through an MR device in one or more embodiments.

FIG. 2T-2 illustrates another example field of view of the user in FIG. 2T-1 through an MR device in one or more embodiments.

FIG. 2U-1 illustrates an example where the virtual object pertaining to an instruction within a field of view of the user through an MR device in one or more embodiments.

FIG. 2U-2 illustrates an example where the MR device avoids collision between the virtual object placed by the user in FIG. 2U-1 and another object recognized by the MR device in one or more embodiments.

FIG. 2V-1 illustrates an example where an MR device programmatically orients one or more objects within a field of view of the user through the MR device in one or more embodiments.

FIG. 2V-2 illustrates an example pointer having a pointer tip that may be used by a user via an MR device in one or more embodiments.

FIG. 2W-1 illustrates an example where the pointer in FIG. 2V-2 is presented with physics-based behavior with simulated mass configuration and/or simulated structural modulus configuration through the MR device in one or more embodiments.

FIG. 2W-2 illustrates an example user view of manipulating an object with the pointer in FIG. 2W-1 or 2V-2 with an MR device in one or more embodiments.

FIG. 2X-1 illustrates an example user view of manipulating an object into collision with another object using a pointer provided by an MR device in one or more embodiments.

FIG. 2X-2 illustrates an example user view of resizing an object using a pointer provided by an MR device in one or more embodiments.

FIG. 2Y-1 illustrates an example split view of a first user and a second user associated or tagged with respective one or more markers provided by respective MR devices in one or more embodiments.

FIG. 2Y-2 illustrates an example split view of the first user in FIG. 2Y-1 placing one or more objects with the MR device of the first user in one or more embodiments.

FIG. 2Z-1 illustrates an example split view of the first user and the second user in FIG. 2Y-2 where the second user manipulates an object placed by the first user with their respective MR devices in one or more embodiments.

FIG. 2Z-2 illustrates an example split view of a first user and a second user where the first user places a pattern of objects with his MR device in one or more embodiments.

FIG. 3H illustrates an example process for multi-user collaboration in a MR environment in one or more embodiments.

FIG. 5 illustrates a computerized system on which one or more processes for a spatial computing system (e.g., a mixed reality system or device) may be implemented.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

It shall be noted that, unless the context requires otherwise, throughout the specification and claims which follow, the word "comprise" and variations thereof, such as, "comprises" and "comprising" are to be construed in an open, inclusive sense that is as "including, but not limited to."

It shall be further noted that Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Furthermore, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Various embodiments are directed to management of a virtual reality ("VR"), augmented reality ("AR"), mixed reality ("MR"), and/or extended reality ("XR") system (collectively referred to as an "MR system" or mixed-reality system) in various embodiments.

Figure 1A:
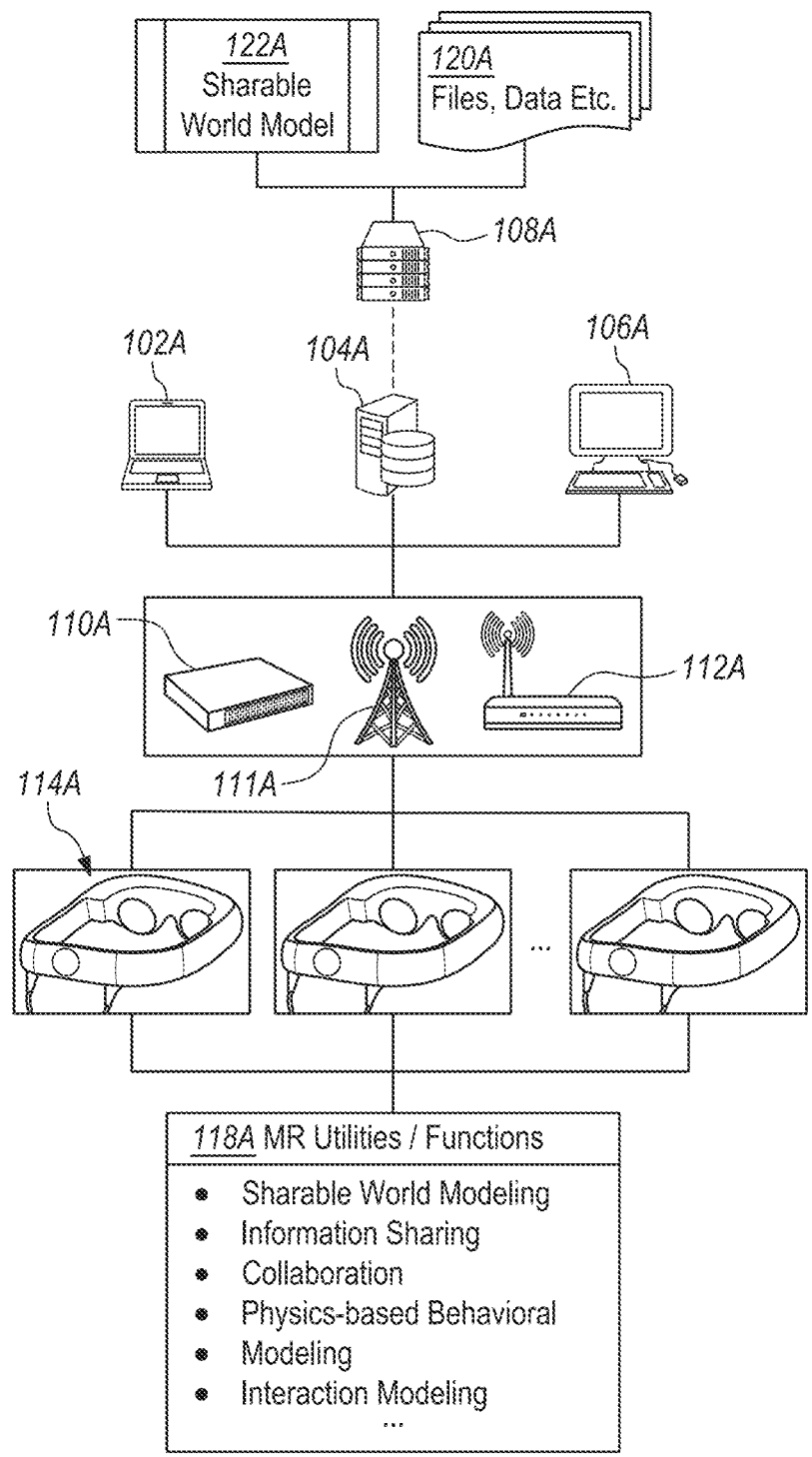
FIG. 1A illustrates a high-level block diagram of a simplified schematic diagram of mixed reality systems or devices performing one or more processes described herein in one or more embodiments.

FIG. 1A illustrates a high-level block diagram of a simplified schematic diagram of mixed reality systems or devices performing one or more processes described herein in one or more embodiments. These one or more embodiments provide a suite of one or more mixed-reality (MR) utilities and/or functions 118A to facilitate the performance of various processes pertaining to one or more MR devices or systems described herein.

The suite of MR utilities and/or functions 118A may be completely installed on an MR device 114A, on a server 104A, a laptop computer 102A, a desktop computer or a terminal 106A, etc. in some embodiments. In some other embodiments, an MR utility or function in 118A may be distributed between an MR device 114A and one or more remote computing systems (e.g., 102A, 104A, and/or 106A, etc.) the one or more computing systems (e.g., 102A, 104A, and/or 106A, etc.) may access a distributed storage or storage 108A storing, for example, sharable world model(s), object models, environment models, one or more parametric models for one or more parameterized objects, object recognizers, code modules, etc. 122A and/or a plurality of files, libraries, classes, data, etc. 120A to facilitate the performance any of the MR utilities and/or functions in the suite 118A.

An MR device may be respectively connected to the one or more remote computing systems (e.g., 102A, 104A, 106A, etc.) and/or one or more other MR devices via one or more wired connections 110A (e.g., a USB or universal serial bus cable, a USB-C cable, an Ethernet cable, or any other types of cables capable of transmitting digital data), a cellular network 111A, or a wireless connection 112A to facilitate the performance any of the MR utilities and/or functions in the suite 118A.

Figure 1B:
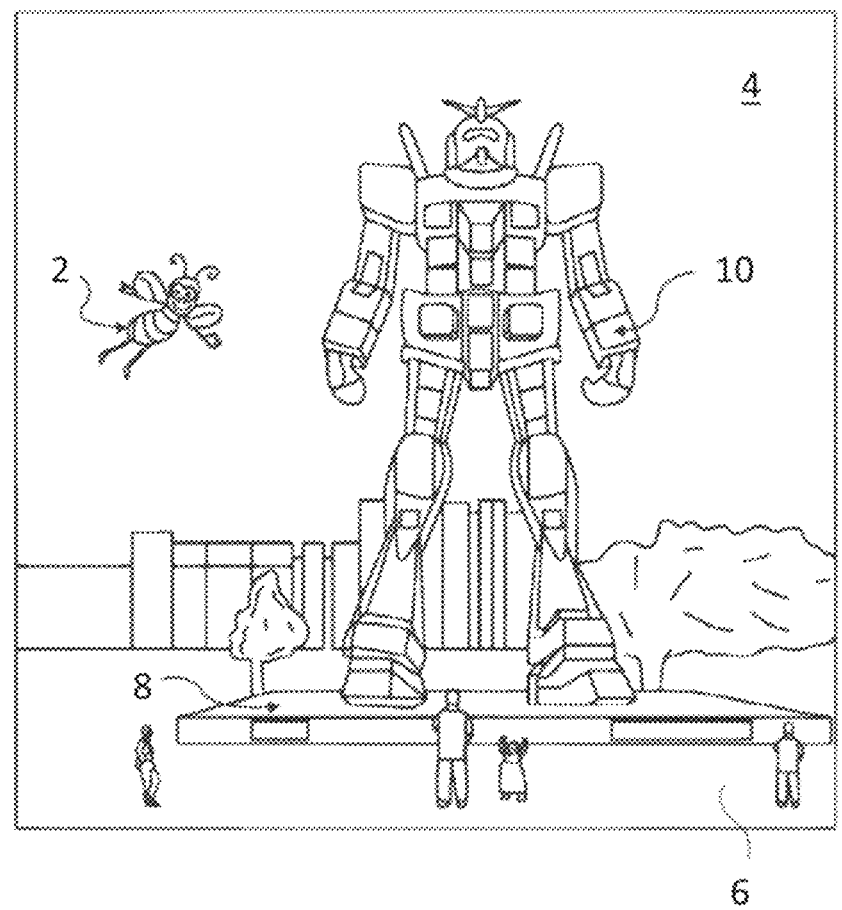
FIG. 1B illustrates an example rendering of a simplified augmented reality (AR) scene according to some embodiments.

FIG. 1B illustrates an example rendering of a simplified augmented reality (AR) scene according to some embodiments. More specifically, FIG. 1B illustrates an AR scene 4 is depicted wherein a user of an AR technology sees a physical world park-like setting 6, featuring people, trees, buildings in the background, and a concrete platform 8. In addition to these items, the user of the AR technology also perceives that they "see" a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that includes a world reconstruction component, which may build and update a representation of the physical world surfaces around the user. This representation may be used to occlude rendering, to place virtual objects, in physics-based interactions, and for virtual character path planning and navigation, or for other operations in which information about the physical world is used.

Figure 1C:
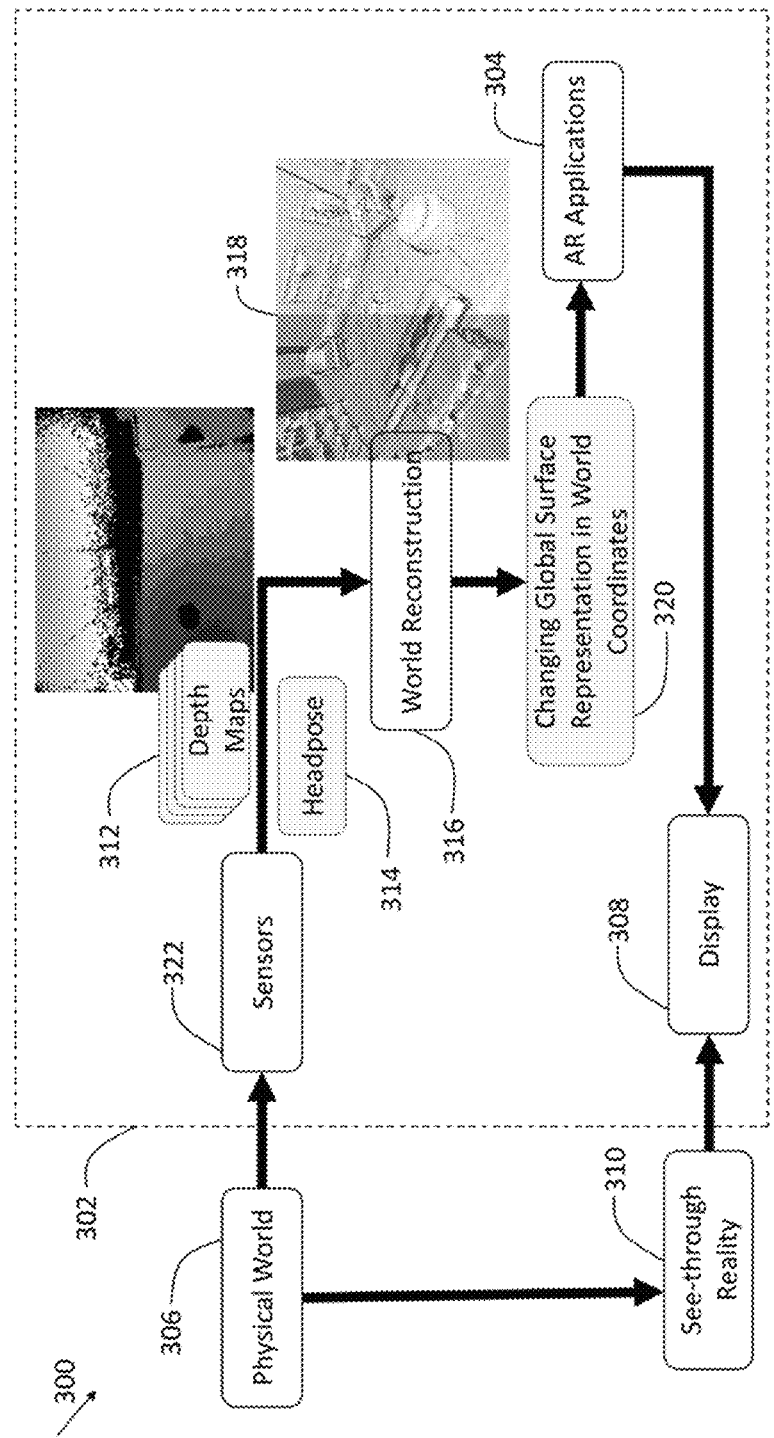
FIG. 1C illustrates an example schematic diagram illustrating data flow in an AR system configured to provide an experience of mixed-reality (MR) contents interacting with a physical world, according to some embodiments.

FIG. 1C illustrates an example schematic diagram illustrating data flow 300 in an MR system configured to provide an experience of mixed-reality (MR) contents interacting with a physical world, according to some embodiments. More particularly, FIG. 1C illustrates an MR system 302 configured to provide an experience of MR contents interacting with a physical world 306, according to some embodiments. The MR system 302 may include a display 308. In the illustrated embodiment, the display 308 may be worn by the user as part of a headset such that a user may wear the display over their eyes like a pair of goggles or glasses. At least a portion of the display may be transparent such that a user may observe a see-through reality 310. The see-through reality 310 may correspond to portions of the physical world 306 that are within a present viewpoint of the MR system 302, which may correspond to the viewpoint of the user in the case that the user is wearing a headset incorporating both the display and sensors of the MR system to acquire information about the physical world.

MR contents may also be presented on the display 308, overlaid on the see-through reality 310. To provide accurate interactions between MR contents and the see-through reality 310 on the display 308, the MR system 302 may include sensors 322 configured to capture information about the physical world 306. The sensors 322 may include one or more depth sensors that output depth maps 312. Each depth map 312 may have multiple pixels, each of which may represent a distance to a surface in the physical world 306 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire information that may be processed to represent the physical world in other ways. For example, the images may be processed in world reconstruction component 316 to create a mesh, representing connected portions of objects in the physical world. Metadata about such objects, including for example, color and surface texture, may similarly be acquired with the sensors and stored as part of the world reconstruction.

The system may also acquire information about the head pose of the user with respect to the physical world. In some embodiments, sensors 310 may include inertial measurement units (IMUs) that may be used to compute and/or determine a head pose 314. A head pose 314 for a depth map may indicate a present viewpoint of a sensor capturing the depth map with six degrees of freedom (6DoF), for example, but the head pose 314 may be used for other purposes, such as to relate image information to a particular portion of the physical world or to relate the position of the display worn on the user's head to the physical world. In some embodiments, the head pose information may be derived in other ways than from an IMU, such as from analyzing objects in an image.

The world reconstruction component 316 may receive the depth maps 312 and head poses 314, and any other data from the sensors, and integrate that data into a reconstruction 318, which may at least appear to be a single, combined reconstruction. The reconstruction 318 may be more complete and less noisy than the sensor data. The world reconstruction component 316 may update the reconstruction 318 using spatial and temporal averaging of the sensor data from multiple viewpoints over time.

The reconstruction 318 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 318, portions of the physical world are presented as a global surface; on the right side of the reconstruction 318, portions of the physical world are presented as meshes. The reconstruction 318 may be used for MR functions, such as producing a surface representation of the physical world for occlusion processing or physics-based processing. This surface representation may change as the user moves or objects in the physical world change. Aspects of the reconstruction 318 may be used, for example, by a component 320 that produces a changing global surface representation in world coordinates, which may be used by other components.

The MR contents may be generated based on this information, such as by MR applications 304. An MR application 304 may be a game program, for example, that performs one or more functions based on information about the physical world, such visual occlusion, physics-based interactions, and environment reasoning. It may perform these functions by querying data in different formats from the reconstruction 318 produced by the world reconstruction component 316. In some embodiments, component 320 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user. The MR applications 304 may use this information to generate and update the MR contents. The virtual portion of the MR contents may be presented on the display 308 in combination with the see-through reality 310, creating a realistic user experience.

Figure 1D:
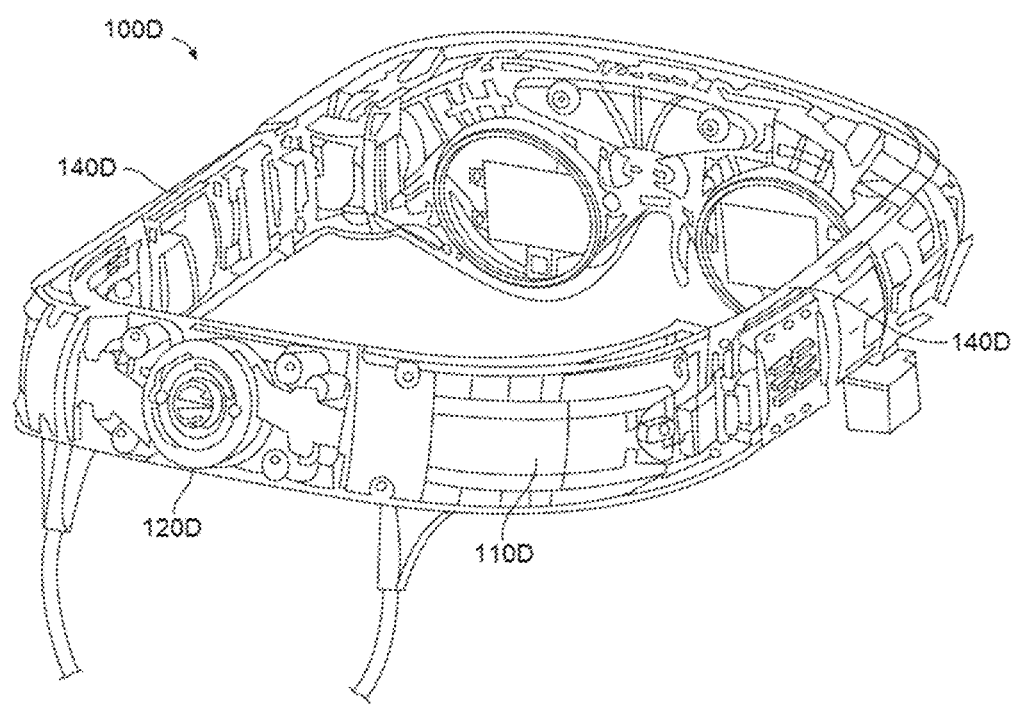
FIG. 1D illustrates an example mixed reality headset of an example mixed reality system or device that may be a subject for various techniques described herein for management of mixed reality systems or devices in one or more embodiments.

FIG. 1D illustrates an example of a mixed-reality headset according to some embodiments of the invention. Headset 100D includes AR/VR/MR/XR components that are attached to a frame 140D. The headset 100D may comprise one or more compliant arms, one or more rigid arms, or a combination of at least one compliant arm and at least one rigid arm. In some embodiments, one or more compliant arms 110D may be attached to frame 140D such that the compliant arms 110D (depicted as being within the frame of the headset) wrap around an entire circumference of the head of a user. The one or more compliant arms 110D may be joined together by a connector 120D.

The connector 120D may include, for example, a spool type spring that provides a compression force to join the compliant arms, wherein the spool type spring provides a compression force that joins the compliant arms together for fitting adjustments to accommodate different head sizes instead of a compression force for constricting the compliant arms and headset to a user's head. Connector 120D may maintain a continuous force via the spool type spring so that the user does not have to manually adjust the compliant arms or the connector 120D once the headset 100D is adjusted to fit the user's head. For example, a user may adjust a circumference of the wrap around configuration (e.g., expand) of headset 100D by separating the compliant arms 110D such that the spool type spring of connector 120D may maintain a compression force to hold the compliant arms 110D in a shape that provides an appropriate circumference to maintain a comfortable fit for different sized heads.

Headset 100D may rest on the parietal bone located just above the occipital bone of a user to prevent interference with the user's ears while maintaining a counterweight to the front viewing optics assembly. Headset 100D may prevent the frame 140D having the front viewing optics assembly from slipping down the nose bridge by transferring the weight of the headset 100D from a user's nose bridge to other areas of a user's head (e.g., parietal bone/crown, occipital bone, and forehead).

Figure 1E:
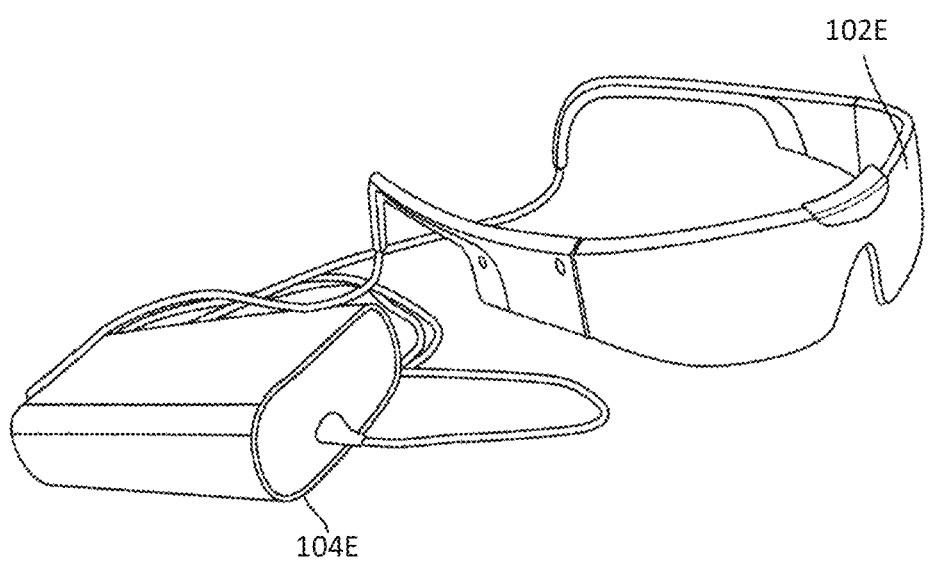
FIG. 1E illustrates an example mixed reality system or device that may be a subject for various techniques described herein for management of mixed reality systems or devices in one or more embodiments.

FIG. 1E illustrates a simplified example of a wearable XR device with a belt pack external to the MR glasses in some embodiments. More specifically, FIG. 1E illustrates a simplified example of a user-wearable VR/AR/MR/XR system that includes an optical sub-system 102E and a processing sub-system 104E and may include multiple instances of personal augmented reality systems, for example a respective personal augmented reality system for a user. Any of the neural networks described herein may be embedded in whole or in part in or on the wearable MR device. For example, some or all of a neural network described herein as well as other peripherals (e.g., ToF or time-of-flight sensors) may be embedded on the processing sub-system 104E alone, the optical sub-system 102E alone, or distributed between the processing sub-system 104E and the optical sub-system 102E.

Some embodiments of the VR/AR/MR/XR system may comprise optical sub-system 102E that deliver virtual content to the user's eyes as well as processing sub-system 104E that perform a multitude of processing tasks to present the relevant virtual content to a user. The processing sub-system 104E may, for example, take the form of the belt pack, which can be convenience coupled to a belt or belt line of pants during use. Alternatively, the processing sub-system 104E may, for example, take the form of a personal digital assistant or smartphone type device.

The processing sub-system 104E may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The processing sub-system 104E may include one or more non-transitory computer- or processor-readable media, for example volatile and/or nonvolatile memory, for instance read only memory (ROM), random access memory (RAM), static RAM, dynamic RAM, Flash memory, EEPROM, etc.

The processing sub-system 104E may be communicatively coupled to the head worn component. For example, the processing sub-system 104E may be communicatively tethered to the head worn component via one or more wires or optical fibers via a cable with appropriate connectors. The processing sub-system 102E and the optical sub-system 104E may communicate according to any of a variety of tethered protocols, for example UBS®, USB2®, USB3®, USB-C®, Ethernet®, Thunderbolt®, Lightning® protocols.

Alternatively or additionally, the processing sub-system 104E may be wirelessly communicatively coupled to the head worn component. For example, the processing sub-system 104E and the optical sub-system 102E may each include a transmitter, receiver or transceiver (collectively radio) and associated antenna to establish wireless communications there between. The radio and antenna(s) may take a variety of forms. For example, the radio may be capable of short-range communications, and may employ a communications protocol such as BLUETOOTH®, WI-FI®, or some IEEE 802.11 compliant protocol (e.g., IEEE 802.11n, IEEE 802.11a/c). Various other details of the processing sub-system and the optical sub-system are described in U.S. patent application Ser. No. 14/707,000 filed on May 8, 2015 and entitled "EYE TRACKING SYSTEMS AND METHOD FOR AUGMENTED OR VIRTUAL REALITY", the content of which is hereby expressly incorporated by reference in its entirety for all purposes.

Figure 1F:
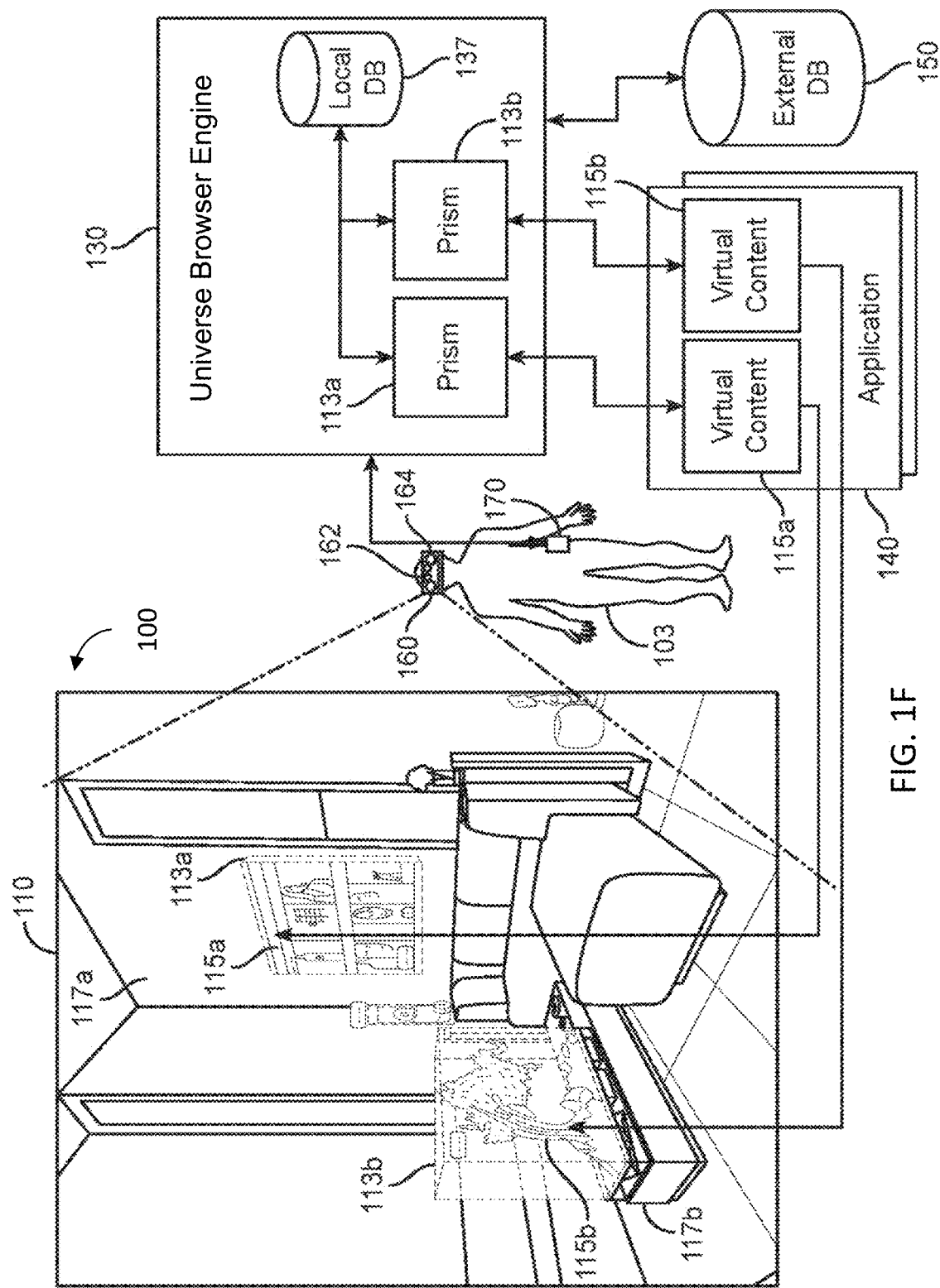
FIG. 1F illustrates an example user physical environment and system architecture for managing and displaying productivity applications and/or resources in a three-dimensional virtual space with a mixed reality system or device in one or more embodiments.

FIG. 1F illustrates an example user physical environment and system architecture for managing and displaying productivity applications and/or resources in a three-dimensional virtual space with a mixed reality system or device in one or more embodiments. More specifically, FIG. 1F illustrates an example user physical environment and system architecture for managing and displaying web pages and web resources in a virtual 3D space with a mixed reality system in one or more embodiments. The representative environment 100 includes a user's landscape 110 as viewed by a user 103 through a head-mounted system 160. The user's landscape 110 is a 3D view of the world where user-placed content may be composited on top of the real world. The representative environment 100 further includes accessing a universe application or universe browser engine 130 via a processor 170 operatively coupled to a network (not shown).

Although the processor 170 is shown as an isolated component separate from the head-mounted system 160, in an alternate embodiment, the processor 170 may be integrated with one or more components of the head-mounted system 160, and/or may be integrated into other system components within the representative environment 100 such as, for example, a network to access a computing network (not shown) and external storage device(s) 150. In some embodiments, the processor 170 may not be connected to a network. The processor 170 may be configured with software (e.g., a universe application or universe browser engine 130) for receiving and processing information such as video, audio, and/or other data (e.g., depth camera data) received from the head-mounted system 160, a local storage device 137, application(s) 140, a computing network, and/or external storage device(s) 150.

The universe application or universe browser engine 130 may be a 3D windows manager that is analogous to a 2D windows manager running on, for example, a desktop computer for managing 2D windows displayed on the display screen of the desktop computer. However, the universe application or universe browser engine 130 (hereinafter may be referred to as "the Universe" for simplicity) manages the creation, placement and display of virtual content 115 in a 3D spatial environment, as well as interactions between a plurality of virtual content 115 displayed in a user's landscape 110. Virtual content 115 from applications 140 are presented to users 103 inside of one or more 3D window display management units such as bounded volumes and/or 3D windows, hereinafter may be referred to as Prisms 113.

A bounded volume/3D window/Prism 113 may be a rectangular, cubic, cylindrical, or any other shape volume of space that may be positioned and oriented in space. A Prism 113 may be a volumetric display space having boundaries for content (e.g., virtual content) to be rendered/displayed into, wherein the boundaries are not displayed. In some embodiments, the boundaries may be displayed. The Prism 113 may present a standard base level of interaction and control over an application's content and its placement. The Prism 113 may represent a sub-tree of a multi-application scene graph, which may be embedded inside of the universe browser engine 130, or may be external to but accessed by the universe browser engine.

A scene graph is a general data structure commonly used by vector-based graphics, editing applications and modern gaming software, which arranges the logical and often (but not necessarily) spatial representation of a graphical scene. A scene graph may be considered a data-structure that defines how content is positioned and transformed relative to each other within its structure. Application(s) 140 are given instances of Prisms 113 to place content within. Applications may render 2D/3D content within a Prism 113 using relative placement algorithms and arbitrary transforms, but the universe browser engine (130) may still ultimately be in charge of gross interaction patterns such as content extraction.

Multiple applications may render to the universe browser engine (130) via the Prisms 113, with process boundaries separating the Prisms 113. There may be n number of bounded volumes/Prisms 113 per application process, but this is explicitly an n:1 relationship such that only one process for each application may be running for each bounded volume/Prism 113, but there may be a number of m processes running, each with their own bounded volume/Prism 113.

The universe browser engine (130) operates using a Prism/distributed scene graph approach for 2D and/or 3D content. A portion of the universe browser engine's scene graph is reserved for each application to render to. Each interaction with an application, for example the launcher menu, the landscape, or body-centric application zones (all described in more detail below) may be done through a multi-application scene graph. Each application may be allocated 1 to "n" rectangular Prisms that represent a sub-tree of the scene graph. Prisms are not allocated by the client-side applications, but instead are created through the interaction of the user inside of the universe browser engine (130), for example when the user opens a new application in the landscape by clicking a button on a controller. In some embodiments, an application can request a Prism from the universe browser engine (130), but the request may be denied. In some embodiments, if an application requests and is allowed a new Prism, the application may only transform the new Prism relative to one of its other Prisms.

The universe browser engine (130) comprises virtual content 115 from application(s) 140 in objects called Prisms 113. Each application process or instance may render its virtual content into its own individual Prism 113 or set of Prisms. The universe browser engine (130) manages a world space, sometimes called a landscape, where Prisms 113 are displayed. In some embodiments, the universe browser engine (130) provides the ability to attach applications to walls and surfaces, place Prisms at an arbitrary location in space, register them with the mixed reality system's world database, and/or control sharing of content between multiple users of the mixed reality system.

In some embodiments, the purpose of the Prisms 113 is to provide behaviors and control over the rendering and display of the content. Much like a 2D display, where a window may be used to define location, menu structures, and display of 2D content within a 2D window, with 3D virtual display, the Prism allows the mixed reality system (e.g., the universe browser engine (130)) to wrap control relating to, for example, content locations, 3D window behavior, and/or menu structures around the display of 3D content. For example, controls may include at least placing the virtual content in a particular location in the user's landscape 110, removing the virtual content from the landscape 110, copying the virtual content and/or placing the copy in a different location, etc. In some embodiments, Prisms may be created and destroyed by the user and only the user. This may be done explicitly to help control abuse of the interfaces provided and to help the user maintain control of the user's content.

Additionally, in some embodiments, application(s) 140 do not know where their volumes are placed in the landscape—only that they exist. In some embodiments, applications may request one or more Prisms, and the request may or may not be granted. After the new Prism is created, the user may change the position, and/or the application may automatically position the new Prism relative to a currently existing Prism associated with the application. In some embodiments, each application 140 making use of the universe browser engine's service to render 3D content (e.g. composited 3D content) into the universe browser engine process may be required to first register a listener with the universe browser engine. This listener may be used to inform the application 140 of creation and destruction of rendering Prisms, based upon user movement and user interaction with those Prisms. A listener is an interface object that receives messages from an inter-process communication system. For example, in the Android operating system, a listener is an object that receives messages through an Android Binder interface. However, any IPC system may be used such that a Binder is not always used.

In some embodiments, Prisms may be created from the following example interactions: (1) The user has extracted content from an extractable node (disclosed further below); (2) The user has started an application from the launcher; (3) The user has downloaded a nearby passable world map tile that includes a placed instance of an application that the user has permission to see; (4) The user has downloaded a nearby passable world map tile that includes an object that the passable world object recognizer infrastructure has detected, that a given application must render content for; and/or (5) The user has triggered a dispatch from another application that must be handled in a different application. In some embodiments, a passable world model allows a user to effectively pass over a piece of the user's world (e.g., ambient surroundings, interactions, etc.) to another user.

Extractable Content is content inside a Prism (including but not limited to an icon, 3D icon, word in a text display, and/or image) that can be pulled out of the Prism using an input device and placed in the landscape. For example, a Prism might display a web page showing a running shoe for sale. To extract the running shoe, the shoe can be selected and "pulled" with an input device. A new Prism would be created with a 3D model representing the shoe, and that Prism would move out of the original Prism and towards the user. Like any other Prism, the user may use an input device to move, grow, shrink or rotate the new Prism containing the shoe in the 3D space of the landscape. An Extractable Node is a node in the Prism's scene graph that has been tagged as something that can be extracted. In the universe browser engine, to extract content means to select an extractable node, and use an input device to pull the content out of the Prism. The input to initiate this pull could be aiming a 6dof pointing device at extractable content and pulling the trigger on the input device.

Each user's respective individual mixed reality system (e.g., mixed reality devices) captures information as the user passes through or inhabits an environment, which the mixed reality system processes to produce a passable world model. More details regarding a passable world are described in U.S. patent application Ser. No. 14/205,126, filed on Mar. 11, 2014, entitled "SYSTEM AND METHOD FOR AUGMENTED AND VIRTUAL REALITY", which is hereby explicitly incorporated by reference for all purposes. The individual mixed reality system may communicate or pass the passable world model to a common or shared collection of data, referred to as the cloud. The individual mixed reality system may communicate or pass the passable world model to other users, either directly or via the cloud. The passable world model provides the ability to efficiently communicate or pass information that essentially encompasses at least a field of view of a user. In one embodiment, the system uses the pose and orientation information, as well as collected 3D points described above in order to create the passable world.

In some embodiments, the passable world model allows the user the ability to integrate content (e.g., virtual and/or physical content) with the real world. A passable world system may include one or more mixed reality systems or mixed reality user devices that are able to connect to a cloud network, a passable world model, a set of object recognizers, and a database (e.g., external database 150). The passable world model may be configured to receive information from the mixed reality user devices and also transmit data to them through the network. For example, based on the input from a user, a piece of the passable world may be passed on from one user to another user.

The passable world model may be thought of as a collection of images, points and other information (e.g., real-world information) based on which the mixed reality system is able to construct, update and build the virtual world on the cloud, and effectively pass pieces of the virtual world to various users. For example, a set of real-world points collected from a mixed reality user device may be collected in the passable world model. Various object recognizers may crawl through the passable world model to recognize objects, tag images, etc., and attach semantic information to the objects. The passable world model may use the database to build its knowledge of the world, attach semantic information, and store data associated with the passable world.

In the case of a Prism that is visible to the user but whose controlling application is not currently installed, the universe browser engine may render a temporary placeholder for that application that, when interacted with, redirects the user to the application store page for that application. In some embodiments, Prisms may be destroyed in similar interactions: (1) The user has walked far enough from a passable world map tile that the placed instance of an application has been unloaded (i.e. removed) from volatile memory; (2) The user has destroyed a placed instance of an application; and/or (3) An application has requested that a Prism be closed.

In some embodiments, if no Prisms for an application are visible and/or loaded, then the process associated with those Prisms may be paused or ended. Once a placed Prism for that application is visible again, the process may be restarted. Prisms may also be hidden, but, in some embodiments, this may only happen at the behest of the universe browser engine and the user. In some embodiments, multiple Prisms may be placed at the same exact location. In such embodiments, the universe browser engine may only show one instance of a placed Prism in one place at a time, and manage the rendering by hiding the visibility of a Prism (and its associated content) until a user interaction is detected, such as the user "swipes" to the next visible element (e.g., Prism) in that location.

In some embodiments, each Prism 113 may be exposed to the application 140 via a volume listener interface with methods for accessing properties of the Prism 113 and registering content in a scene graph sub-tree for shared resources such as meshes, textures, animations, and so on. In some embodiments, since the application 140 does not know where a given Prism 113 is placed in 3D space, the volume listener interface may provide accessor methods to a set of hints that help to define where the given Prism is present in the universe browser engine, for example hand centric, stuck in the landscape, Body Centric, etc. These properties additionally specify expected behavior of the Prisms, and may be controlled in a limited fashion either by the user, the application 140, or the universe browser engine. A given Prism can be positioned relative to another Prism that an application owns. Applications can specify that Prisms should snap together (two sides of their bounding volumes touch) while Prisms from that application are being placed. Additionally, Prisms may provide an API (e.g., 118B) for key-value data storage. Some of these key-value pairs are only writable by privileged applications.

In some embodiments, application(s) 140 are client software applications that provide content that is to be displayed to the user 103 in the user's landscape 110. For example, an application 140 may be a video streaming application, wherein video data may be streamed to the user to be displayed on a 2D planar surface. As another example, an application 140 may be a Halcyon application that provides 3D imaging of physical objects that may denote a period of time in the past that was idyllically happy and peaceful for the user. Application 140 provides the content that a user may want to include in the user's landscape 110. The universe browser engine via the Prisms 113 manages the placement and management of the content that is generated by application 140.

When a non-immersive application is executed/launched in the user's landscape 110, its content (e.g., virtual content) is rendered inside of a Prism 113. A non-immersive application may be an application that is able to run and/or display content simultaneously with one or more other applications in a shared 3D environment. Although the virtual content may be contained within the Prism, a user may still interact with the virtual content, such as, for example, hovering over an object, clicking on it, etc. The Prism 113 may also bound application 140's displayed content so different applications 140 do not interfere with each other or other objects in the user's landscape 110. Prisms 113 may also provide a useful abstraction for suspending, pausing, and/or minimizing virtual content from application(s) 140 that are out of view or too far away from the user.

The Prisms 113 may be anchored/attached/pinned to various objects within a user's landscape 110, including snapping or anchoring to another Prism. For example, Prism 113a, which displays virtual content 115 (e.g., a video 115a from a video streaming application), may be anchored to a vertical wall 117a. As another example, Prism 113b, which displays a 3D tree 115b from a Halcyon application, is shown in FIG. 1 to be anchored to a table 117b. Furthermore, a Prism 113 may be anchored relative to a user 103 (e.g., body-centric), wherein the Prism 113 which displays virtual content 115 may be anchored to a user's body, such that as the user's body moves, the Prism 113 moves relative to the movement of the user's body. A body-centric content may be application content such as planes, meshes, etc. that follow the user and remain positionally consistent with the user. For example, a small dialog box that follows the user around but exists relative to the user's spine rather than the landscape 110. Additionally, a Prism 113 may also be anchored to a virtual object such as a virtual display monitor displayed within the user's landscape 110. The Prism 113 may be anchored in different ways, which is disclosed below.

The universe browser engine may include a local database 137 to store properties and characteristics of the Prisms 113 for the user. The stored Prism information may include Prisms activated by the user within the user's landscape 110. Local database 137 may be operatively coupled to an external database 150 that may reside in the cloud or in an external storage facility. External database 150 may be a persisted database that maintains information about the mixed reality environment of the user and of other users.

For example, as a user launches a new application to display virtual content in the user's physical environment, the local database 137 may store information corresponding to a Prism that is created and placed at a particular location by the universe browser engine, wherein an application 140 may render content into the Prism 113 to be displayed in the user's landscape 110. The information corresponding to the Prism 113, virtual content 115, and application 140 stored in the local database 137 may be synchronized to the external database 150 for persistent storage.

In some embodiments, the persisted storage may be important because when the mixed reality system is turned off, data stored in the local database 137 may be erased, deleted, or non-persisted. Thus, when a user turns on the mixed reality system, the universe browser engine may synchronize with the external database 150 to retrieve an instance of the local database 137 corresponding to the user 103 and the user's landscape 110 prior to the mixed reality system being turned off. The local database 137 may be an instance of the external database 150, wherein the instance of the local database 137 includes information pertinent to the user 103 and the user's current environment. The external database 150 may additionally store instances of local databases of other users, multiple users, the same user over time, and/or other environments. The external database 150 may contain information that is used to manage and share virtual content between multiple users of the mixed reality system, whereas the local database 137 stores and maintains information corresponding to the user 103.

The universe browser engine may create a Prism 113 for application 140 each time application(s) 140 needs to render virtual content 115 onto a user's landscape 110. In some embodiments, the Prism 113 created by the universe browser engine allows application 140 to focus on rendering virtual content for display while the universe browser engine focuses on creating and managing the placement and display of the Prism 113 having the virtual content 115 displayed within the boundaries of the Prism by the application 140.

Each virtual content 115 rendered by an application 140, displayed in the user's landscape 110, may be displayed within a single Prism 113. For example, if an application 140 needs to render two virtual contents (e.g., 115a and 115b) to be displayed within a user's landscape 110, then application 140 may render the two virtual contents 115a and 115b. Since virtual contents 115 include only the rendered virtual contents, the universe browser engine may create Prisms 113a and 113b to correspond with each of the virtual content 115a and 115b, respectively. The Prism 113 may include 3D windows management properties and characteristics of the virtual content 115 to allow the universe browser engine to manage the virtual content 115 inside the Prism 113 and the placement and display of the Prism 113 in the user's landscape 110.

The universe browser engine may be the first application a user 103 sees when the user 103 turns on the mixed reality device. The universe browser engine may be responsible for at least (1) rendering the user's world landscape; (2) 2D window management of planar applications and 3D windows (e.g., Prisms) management; (3) displaying and executing the application launcher menu; (4) allowing the user to place virtual content into the user's landscape 110; and/or (5) managing the different states of the display of the Prisms 113 within the user's landscape 110.

The head-mounted system 160 may be a mixed reality head-mounted system that includes a display system (e.g., a user interface) positioned in front of the eyes of the user 103, a speaker coupled to the head-mounted system and positioned adjacent the ear canal of the user, a user-sensing system, an environment sensing system, and a processor (all not shown). The head-mounted system 160 presents to the user 103 the display system (e.g., user interface) for interacting with and experiencing a digital world. Such interaction may involve the user and the digital world, one or more other users interfacing the representative environment 100, and objects within the digital and physical world.

The user interface may include viewing, selecting, positioning and managing virtual content via user input through the user interface. The user interface may be at least one or a combination of a haptics interface devices, a keyboard, a mouse, a joystick, a motion capture controller, an optical tracking device, an audio input device, a smartphone, a tablet, or the head-mounted system 160. A haptics interface device is a device that allows a human to interact with a computer through bodily sensations and movements. Haptics refers to a type of human-computer interaction technology that encompasses tactile feedback or other bodily sensations to perform actions or processes on a computing device.

An example of a haptics controller may be a totem (not shown). In some embodiments, a totem is a hand-held controller that tracks its position and orientation relative to the headset 160. In this example, the totem may be a six degree-of-freedom (six DOF) controller where a user may move a Prism around in altitude and azimuth (on a spherical shell) by moving the totem up or down. In some embodiments, to move the object closer or farther away, the user may use the joystick on the totem to "push" or "pull" the Prism, or may simply move the totem forward or backward. This may have the effect of changing the radius of the shell. In some embodiments, two buttons on the totem may cause the Prism to grow or shrink. In some embodiments, rotating the totem itself may rotate the Prism. Other totem manipulations and configurations may be used, and should not be limited to the embodiments described above.

The user-sensing system may include one or more sensors 162 operable to detect certain features, characteristics, or information related to the user 103 wearing the head-mounted system 160. For example, in some embodiments, the sensors 162 may include a camera or optical detection/scanning circuitry capable of detecting real-time optical characteristics/measurements of the user 103 such as, for example, one or more of the following: pupil constriction/dilation, angular measurement/positioning of each pupil, sphericity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's landscape 110. Objects or information detected by the sensors 164 may be provided as input to the head-mounted system 160. In some embodiments, this input may represent user interaction with the virtual world. For example, a user (e.g., the user 103) viewing a virtual keyboard on a desk (e.g., the table 188) may gesture with their fingers as if the user was typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for capturing and interpreting scene information, for example, through continuously and/or intermittently projected infrared structured light. The environment-sensing system may be used for mapping one or more elements of the user's landscape 110 around the user 103 by detecting and registering one or more elements from the local environment, including static objects, dynamic objects, people, gestures and various lighting, atmospheric and acoustic conditions, etc. Thus, in some embodiments, the environment-sensing system may include image-based 3D reconstruction software embedded in a local computing system (e.g., the processor 170) and operable to digitally reconstruct one or more objects or information detected by the sensors 164.

In some embodiments, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS (Complementary metal-oxide-semiconductor) sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of the system of the representative environment 100, or may be an isolated device (wearable or separate from the user 103) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., a computing network, and the user-sensing system and the environment-sensing system from the head-mounted system 160) into image and audio data, wherein the images/video and audio may be presented to the user 103 via the user interface (not shown).

The processor 170 handles data processing for the various components of the head-mounted system 160 as well as data exchange between the head-mounted system 160 and the software applications such as the universe browser engine, the external database 150, etc. For example, the processor 170 may be used to buffer and process data streaming between the user 103 and the computing network, including the software applications, thereby enabling a smooth, continuous and high-fidelity user experience. The processor 170 may be configured to execute a set of program code instructions. The processor 170 may include a memory to hold the set of program code instructions, in which the set of program code instructions comprises program code to display virtual content within a subset of available 3D displayable space by displaying the virtual content within a volumetric display space, wherein boundaries of the volumetric display space are not displayed. In some embodiments, the processor may be two or more processors operatively coupled.

In some embodiments, the mixed reality system may be configured to assign to a Prism universal features and application selected/application-specific features from a list of pre-approved options for configurations of display customizations by an application. For example, universal features ensure different applications interact well together. Some example of universal features may include max/min size, no overlapping Prisms (excluding temporary overlap from collision behavior), no displaying content outside the boundaries of the Prism, applications need permission from user if the application wants to access sensors or sensitive information. Application selected/application-specific features enable optimized application experiences.

Application-selected/application-specific features may include max/min size (within limits from the system), default size (within limits from the system), type of body dynamic (e.g., none/world lock, billboard, edge billboard, follow/lazy headlock, follow based on external sensor, fade—discussed below), child Prism spawn location, child head pose highlight, child Prism relational behavior, on surface behavior, independent transformation control, resize vs. scale, idle state timeout, collision behavior, permission/password to access application, etc. In another embodiment, the mixed reality system may be configured to display virtual content into one or more Prisms, wherein the one or more Prisms do not overlap with one another, in some embodiments.

In some embodiments, one or more Prisms may overlap in order to provide specific interactions. In some embodiments, one or more Prisms may overlap, but only with other Prisms from the same application. In another embodiment, the mixed reality system may be configured to change a state of a Prism based at least in part on a relative position and location of the Prism to a user. In another embodiment, the mixed reality system may be configured to manage content creation in an application and manage content display in a separate application. In another embodiment, the mixed reality system may be configured to open an application that will provide content into a Prism while simultaneously placing the Prism in a mixed reality environment.

In some embodiments, the mixed reality system may be configured to assign location, orientation, and extent data to a Prism for displaying virtual content within the Prism, where the virtual content is 3D virtual content. In some embodiments, the mixed reality system may be configured to pin a launcher application to a real-world object within a mixed reality environment. In some embodiments, the mixed reality system may be configured to assign a behavior type to each Prism, the behavior type comprising at least one of a world lock, a billboard, an edge billboard, a follow headlock, a follow based on external sensor, or a fade (described below in more detail). In some embodiments, the mixed reality system may be configured to identify a most used content or an application that is specific to a placed location of a launcher application, and consequently re-order to the applications from most to least frequently used, for example. In another embodiment, the mixed reality system may be configured to display favorite applications at a placed launcher application, the favorite applications based at least in part on context relative to a location of the placed launcher.

Figure 1G:
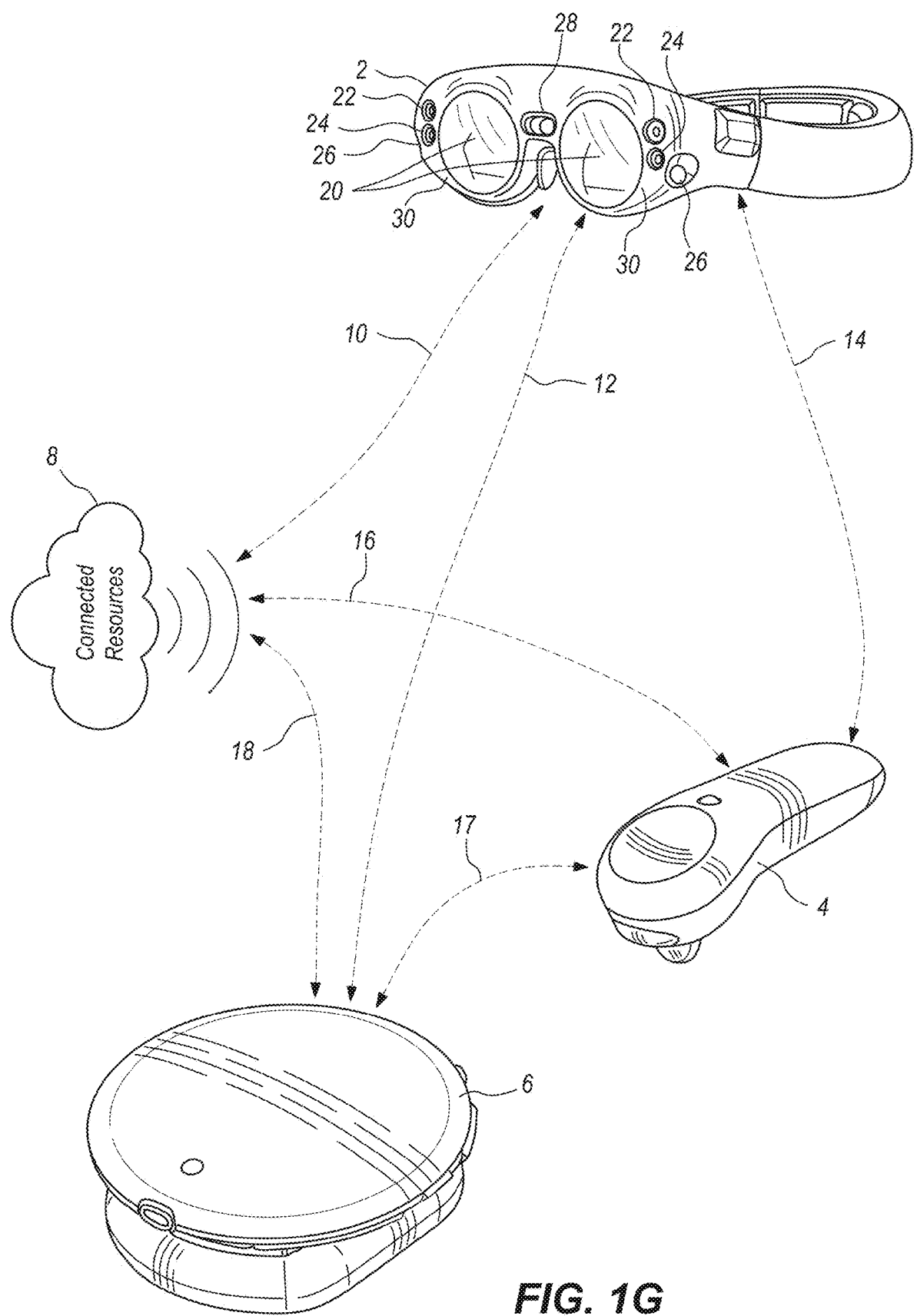
FIG. 1G illustrates an example augmented reality system and some example components in one or more embodiments.

FIG. 1G illustrates an example augmented reality system and some example components in one or more embodiments. More specifically, FIG. 1G illustrates that a system may also comprise various sensors configured to provide information pertaining to the environment around the user, including but not limited to various camera type sensors (such as monochrome, color/RGB (red green blue), and/or thermal imaging components) (22, 24, 26), depth camera sensors (28), and/or sound sensors (30) such as microphones. There is a need for compact and persistently connected wearable computing systems and assemblies such as those described herein, which may be utilized to provide a user with the perception of rich augmented reality experiences, along with development tools related thereto.

Moreover, FIG. 1G illustrates an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth™, and other connectivity standards and configurations.

As described, for example, in U.S. patent application Ser. Nos. 14/555,585, 14/690,401, 14/331,218, 15/481,255, 62/627,155, 62/518,539, 16/229,532, 16/155,564, 15/413,284, 16/020,541, 62/702,322, 62/206,765, 15/597,694, 16/221,065, 15/968,673, 62/682,788, and 62/899,678 each of which is incorporated by reference herein in its entirety, various aspects of such components are described, such as various embodiments of the two depicted optical elements (20) through which the user may see the world around them along with visual components which may be produced by the associated system components, for an augmented reality experience. As illustrated in FIG. 1G, such a system may also comprise various sensors configured to provide information pertaining to the environment around the user, including but not limited to various camera type sensors (such as monochrome, color/RGB, and/or thermal imaging components) (22, 24, 26), depth camera sensors (28), and/or sound sensors (30) such as microphones. FIG. 1G thus illustrates a compact and persistently connected wearable computing systems and assemblies such as those described herein, which may be utilized to provide a user with the perception of rich augmented reality experiences, along with development tools related thereto.

Figure 2A:
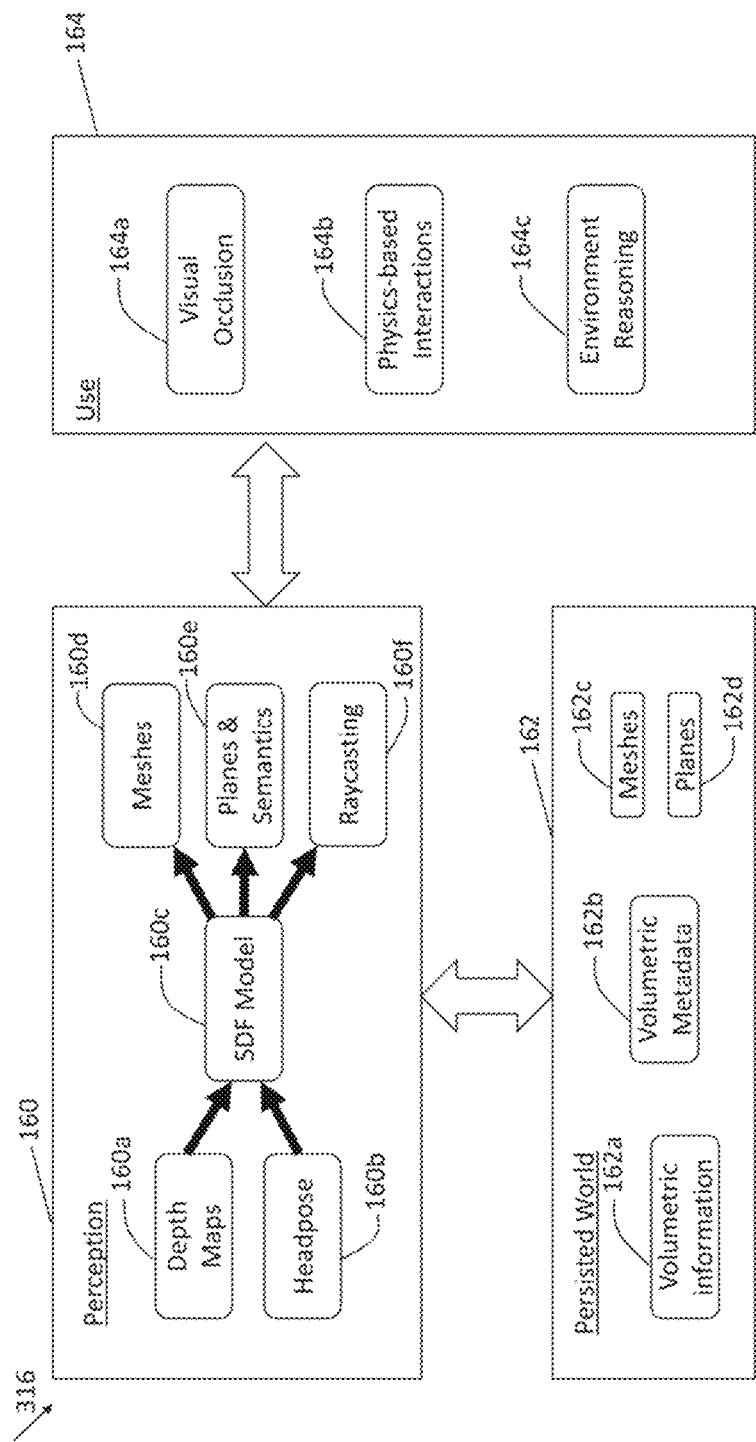
FIG. 2A illustrates a simplified example schematic diagram illustrating an MR system using a world reconstruction system in one or more embodiments.

FIG. 2A illustrates a simplified example schematic diagram illustrating an MR system using a world reconstruction system in one or more embodiments. In these embodiments, the world reconstruction component 316 may include a perception module 160 that may generate, update, and store representations for a portion of the physical world. In some embodiments, the perception module 160 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

FIG. 2B-1 depicts an example of a 3D space 200 discretized into voxels 202. In some embodiments, the perception module (160) may determine objects of interest and set the volume of a voxel in order to capture features of the objects of interest and avoid redundant information. For example, the perception module 160 may be configured to identify larger objects and surfaces, such as walls, ceilings, floors, and large furniture. Accordingly, a volume of a voxel may be set to a relatively large size, for example, a cube of 4 cm³.

A reconstruction of a physical world including voxels may be referred to as a volumetric model. Information to create a volumetric model may be created over time as the sensors move about the physical world. Such motion may happen as the user of a wearable device including the sensors moves around. FIG. 2C-1 through 2C-6 depict an example of reconstructing a physical world into a volumetric model. In the illustrated example, the physical world includes a portion 280 of a surface which is shown in FIG. 2C-1. In FIG. 2C-1, a sensor 282 at a first location may have a field of view 284, within which the portion 280 of the surface is visible.

The sensor 282 may be of any suitable type, such as a depth sensor. However, depth data may be derived from an image sensor(s) or in other ways. The perception module (160) may receive data from the sensor 282, and then set the values of multiple voxels 286 as illustrated in FIG. 2C-2 to represent the portion 280 of the surface visible by the sensor 282 in the field of view 284.

Figure 2D:
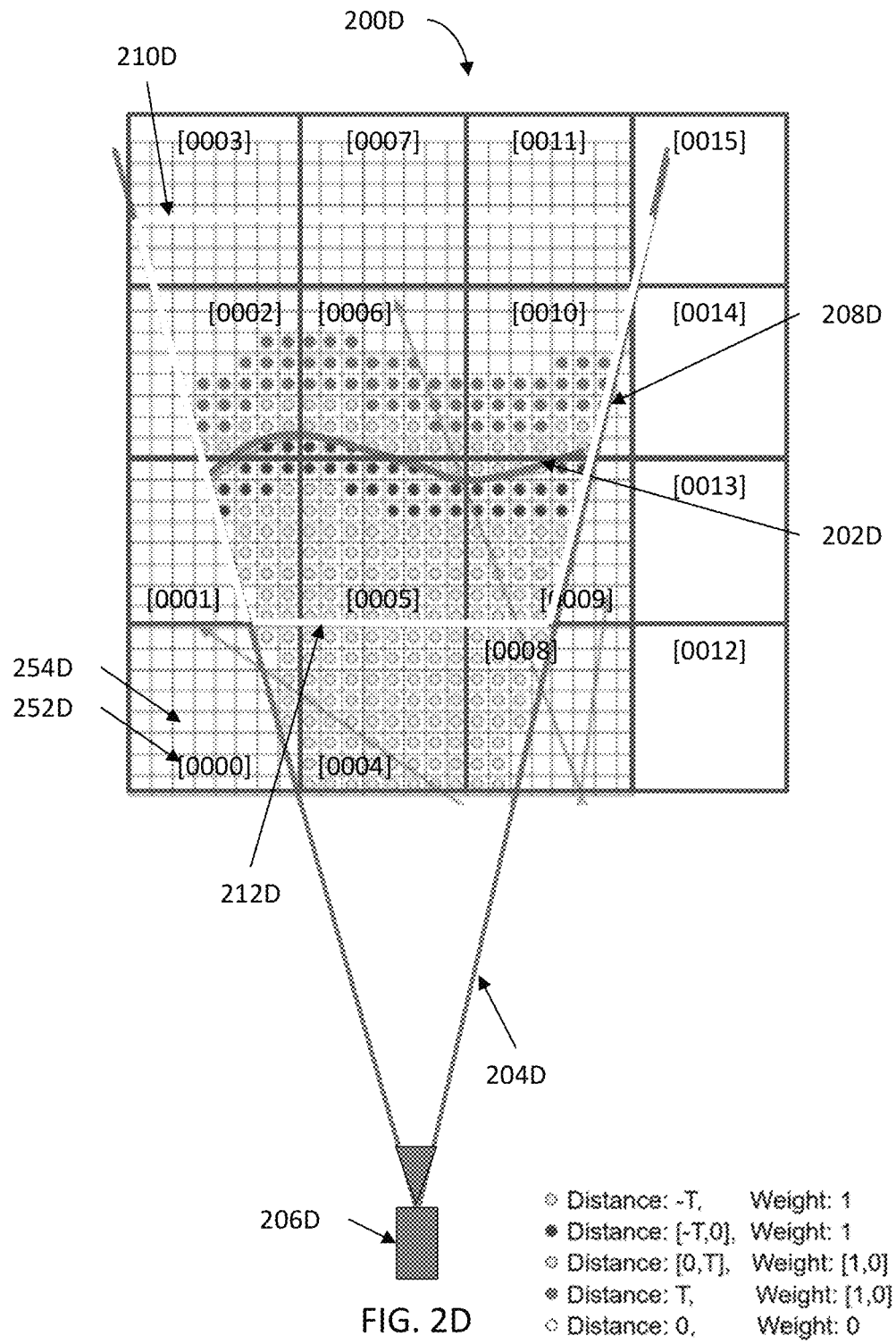
FIG. 2D illustrates a simplified schematic diagram of a scene represented by bricks comprising voxels, a surface in the scene, and a depth sensor capturing the surface in a depth image in one or more embodiments.
Figure 2E:
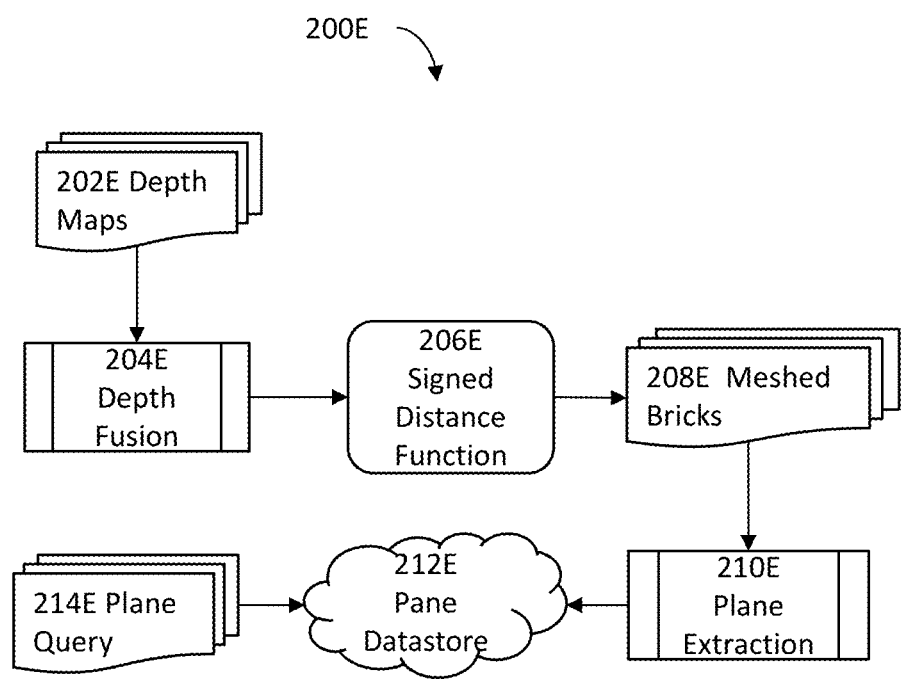
FIG. 2E illustrates a simplified schematic diagram of a plane extraction system in one or more embodiments.
Figure 2F:
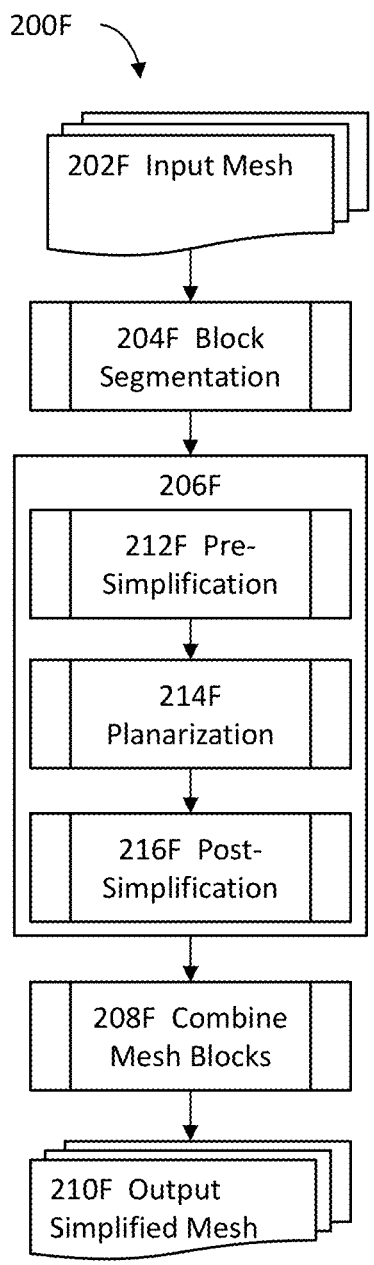
FIG. 2F illustrates a simplified flow diagram for generating a model of an environment represented by a mesh in one or more embodiments.
Figure 2G:
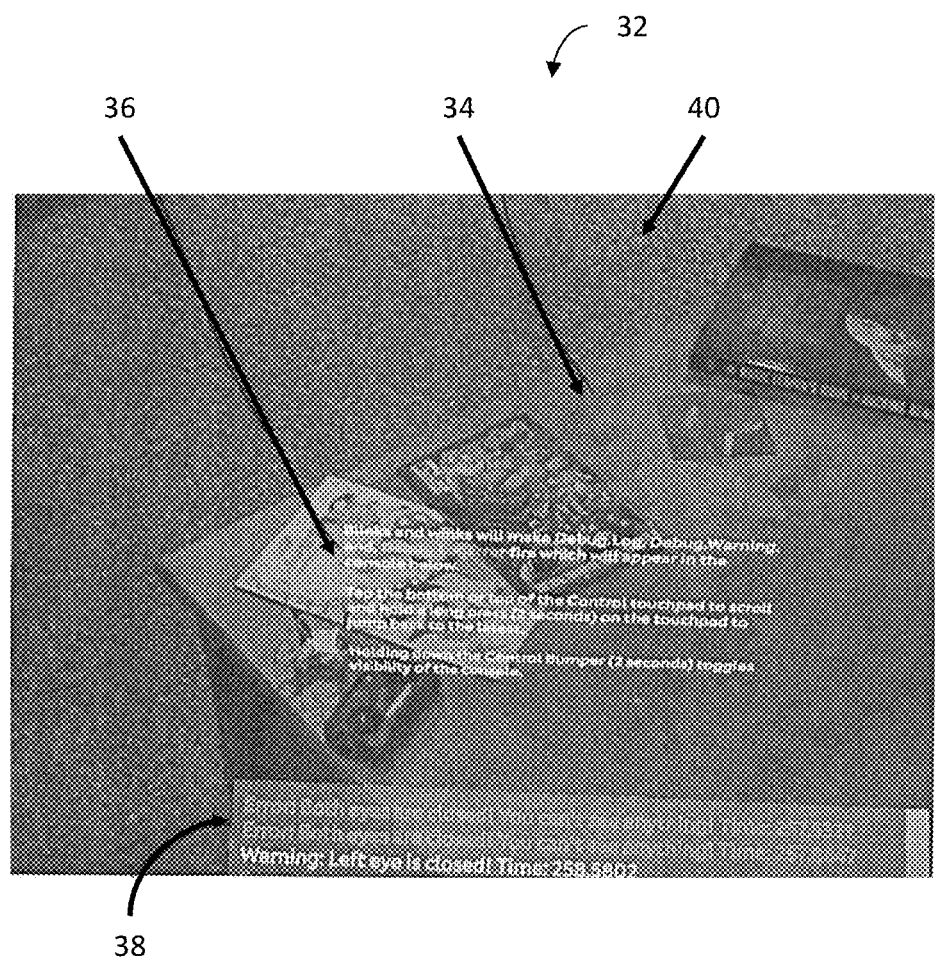
FIG. 2G illustrates an example user's view of a representation of some textual information pertaining to one or more runtime processes for a debugging process in one or more embodiments.
Figure 2H:
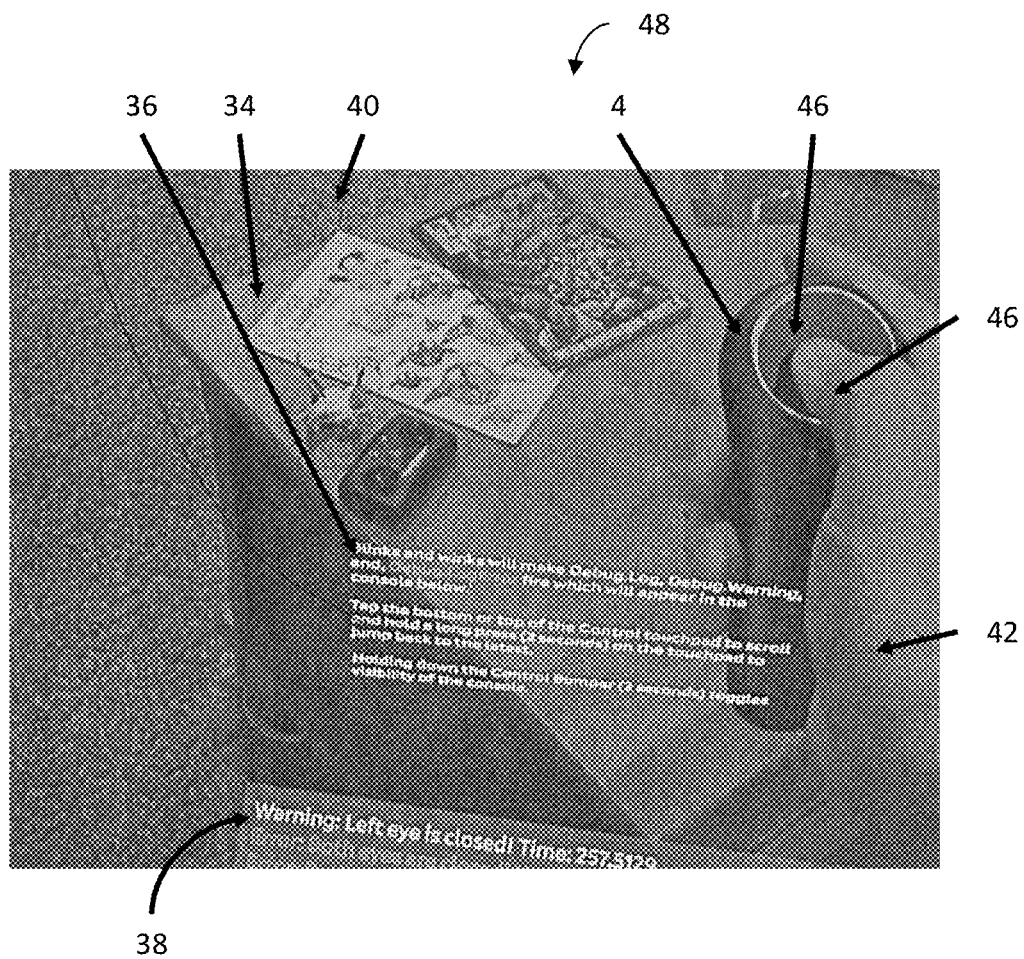
FIG. 2H illustrates an example where a user operates a hand-held controller component (4) to interact with displayed representation through an MR device in one or more embodiments.
Figure 21:
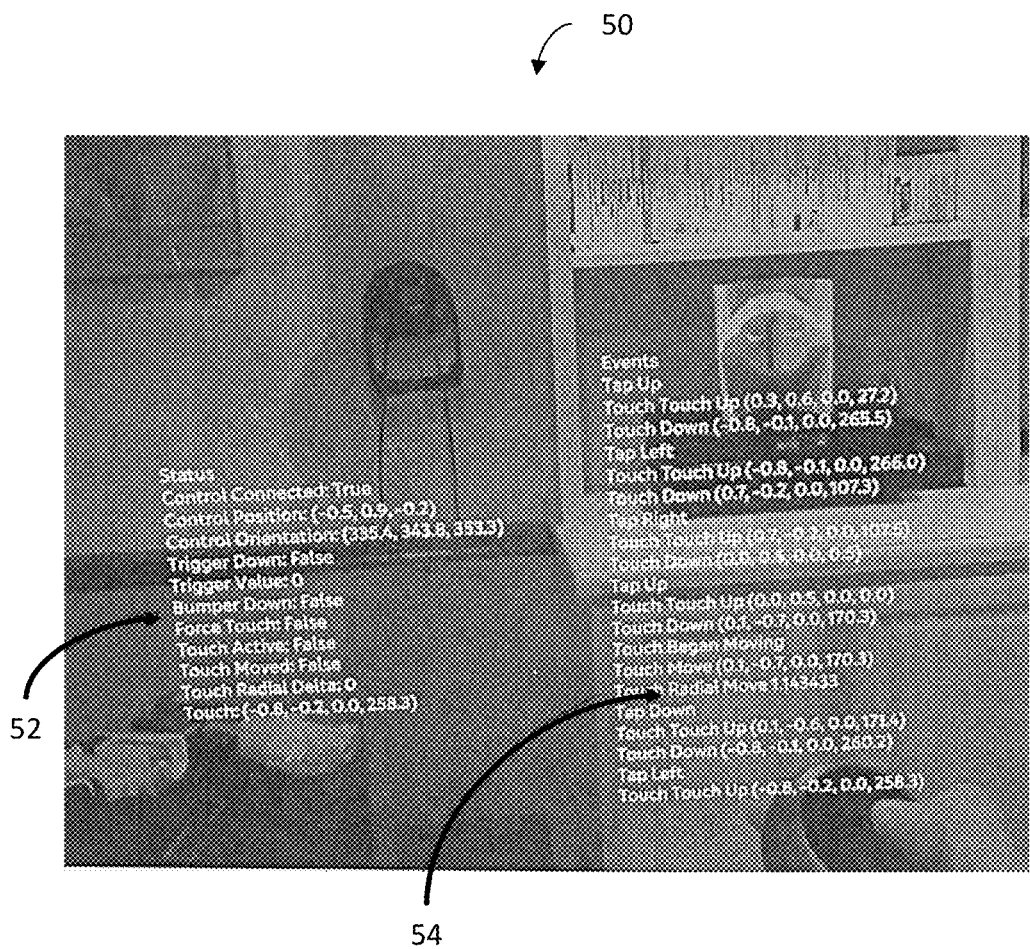
Figure 2J:
FIG. 2J illustrates an example where a user aims a virtual cursor at a first object in a representation through an MR device for recognizing the object in one or more embodiments.
Figure 2K:
FIG. 2K illustrates another example where a user aims a virtual cursor at a second object in a representation through an MR device for recognizing the second object in one or more embodiments.
Figure 2L:
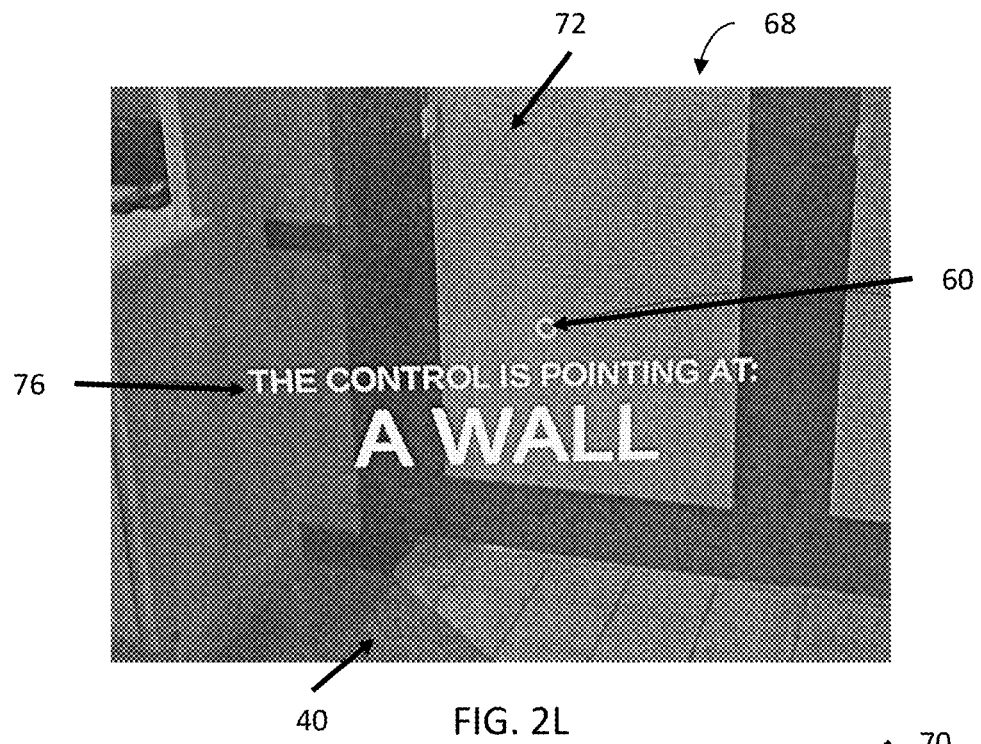
FIG. 2L illustrates another example where a user aims at a third object in a representation through an MR device for recognizing the third object in one or more embodiments.
Figure 2M:
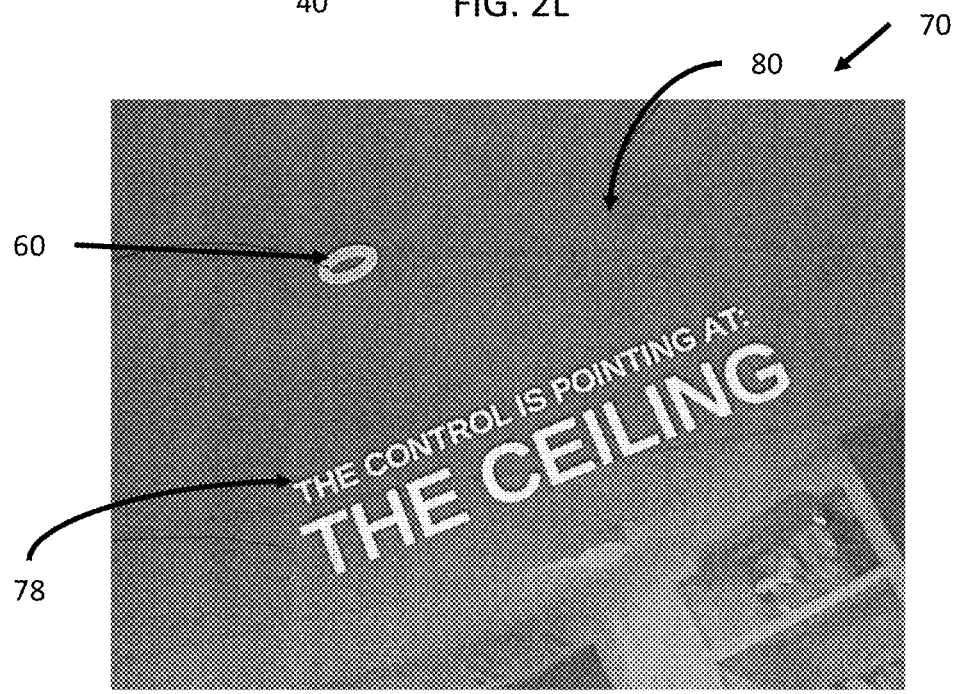
FIG. 2M illustrates another example where a user aims at a fourth object in a representation through an MR device for recognizing the fourth object in one or more embodiments.
Figure 2O:
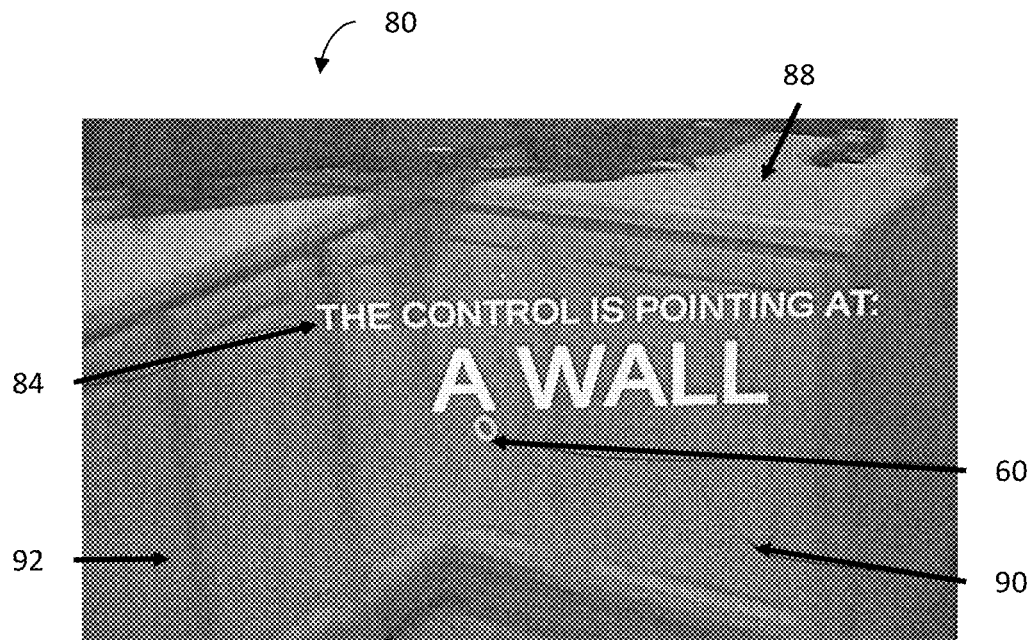
FIG. 2O illustrates another example where a user aims at a fifth object in a representation through an MR device for estimating the fifth object in one or more embodiments.
Figure 2P:
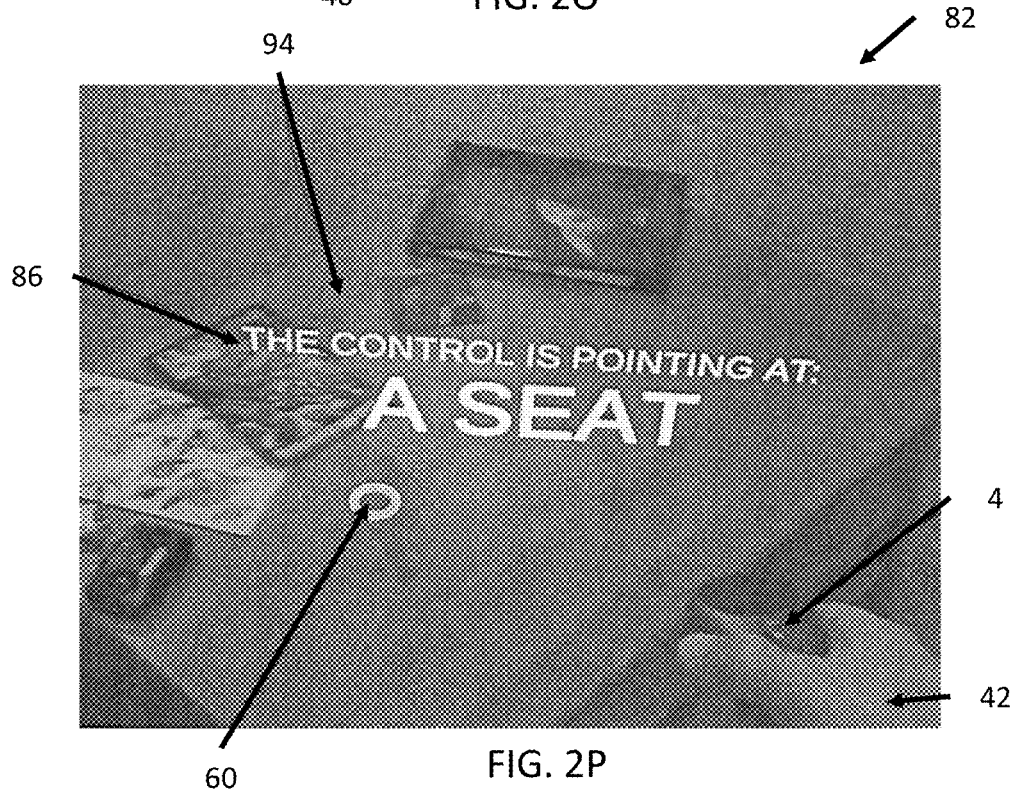
FIG. 2P illustrates another example where a user aims at a sixth object in a representation through an MR device for estimating the sixth object in one or more embodiments.
Figure 2Q:
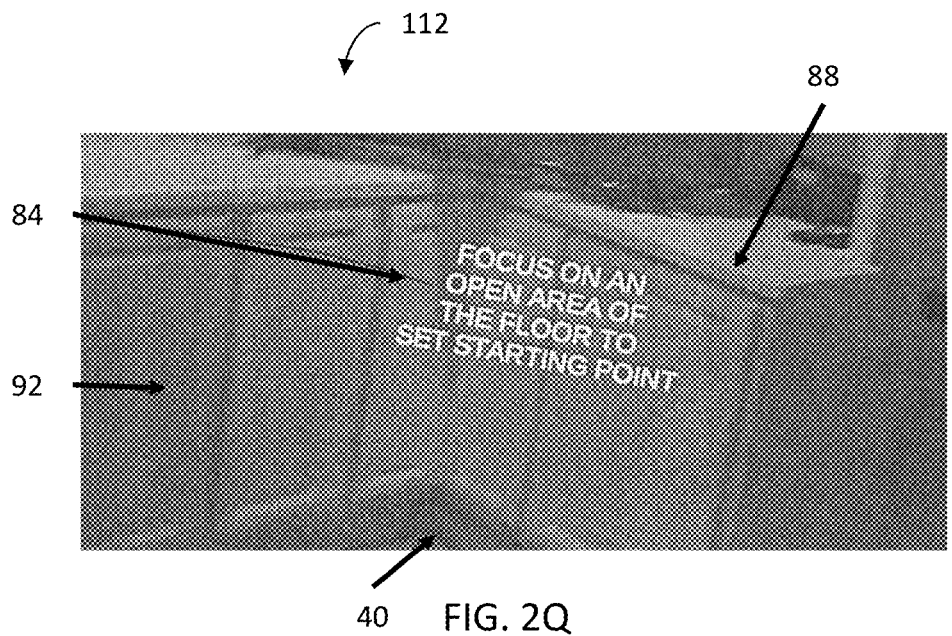
FIG. 2Q illustrates another example where a user views an area in a representation through an MR device for selecting one or more objects in the representation in one or more embodiments.
Figure 2R:
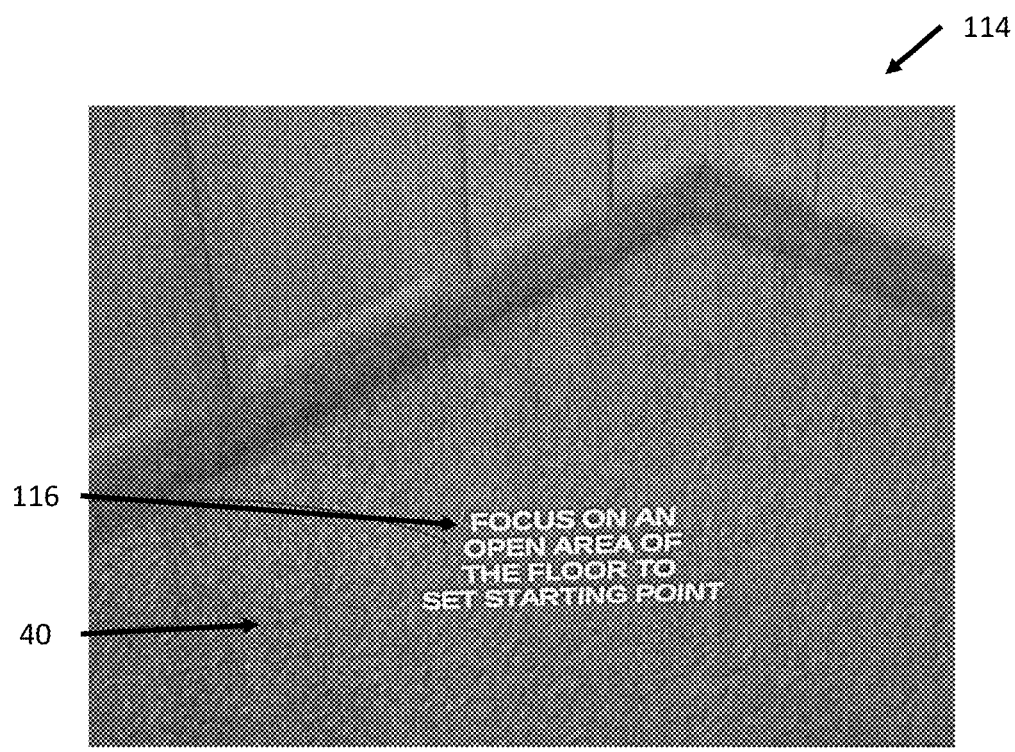
FIG. 2R illustrates another example where a user views an area in a representation through an MR device for placing one or more objects in the area in one or more embodiments.
Figure 2S:
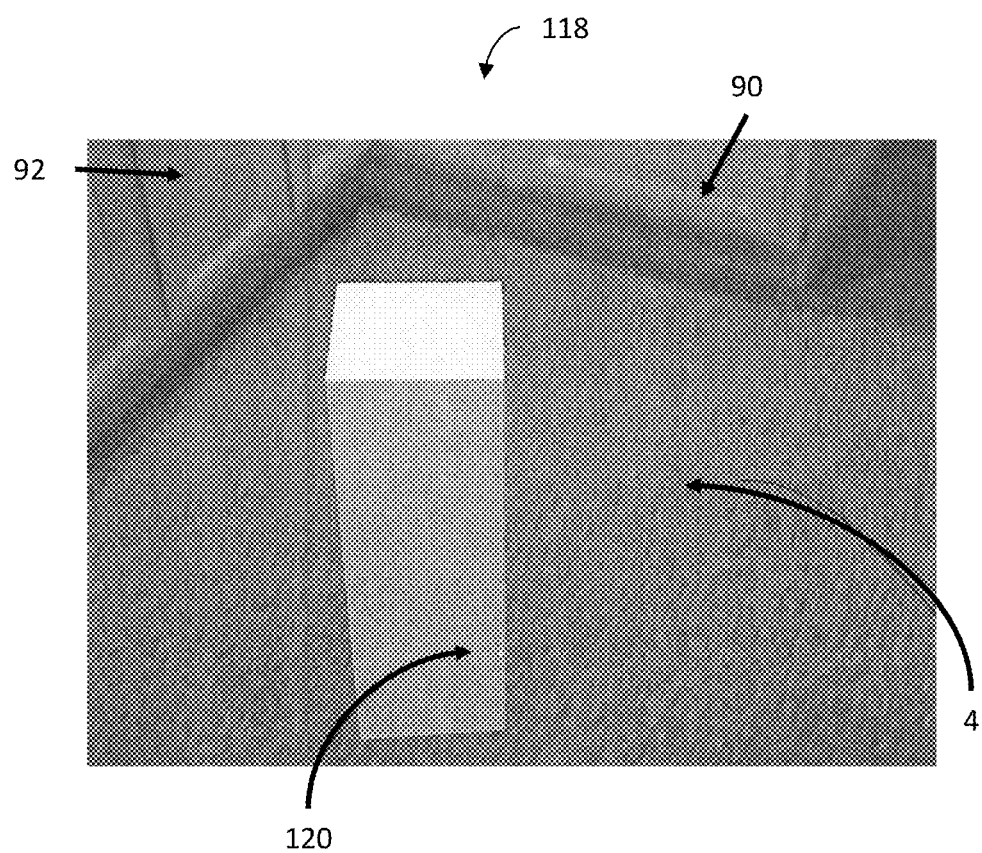
FIG. 2S illustrates another example where an object is placed in an area after a user views the area in a representation through an MR device in the area in one or more embodiments.
Figures 1, 2T:
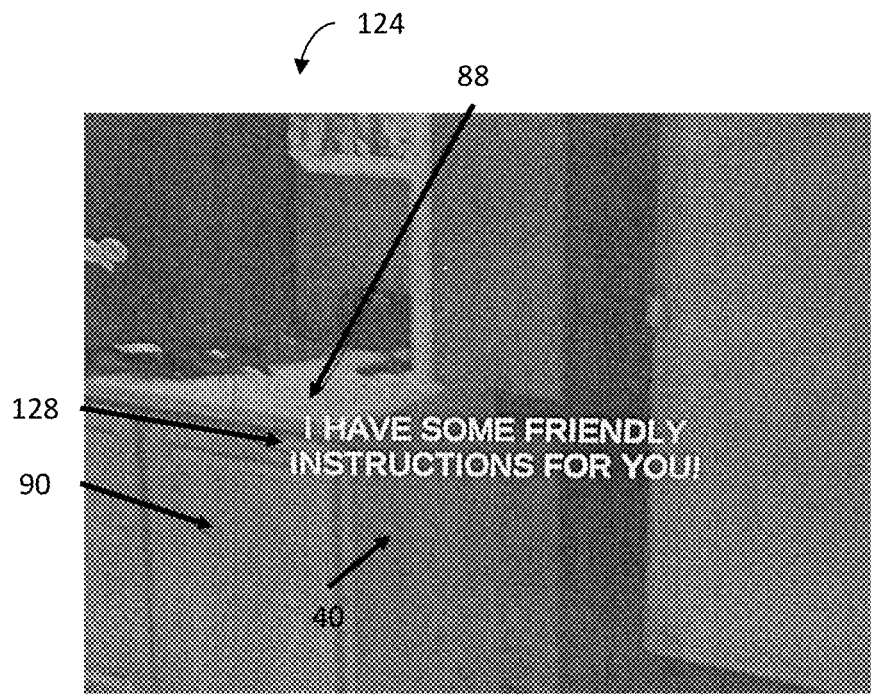
Figures 2, 2T:
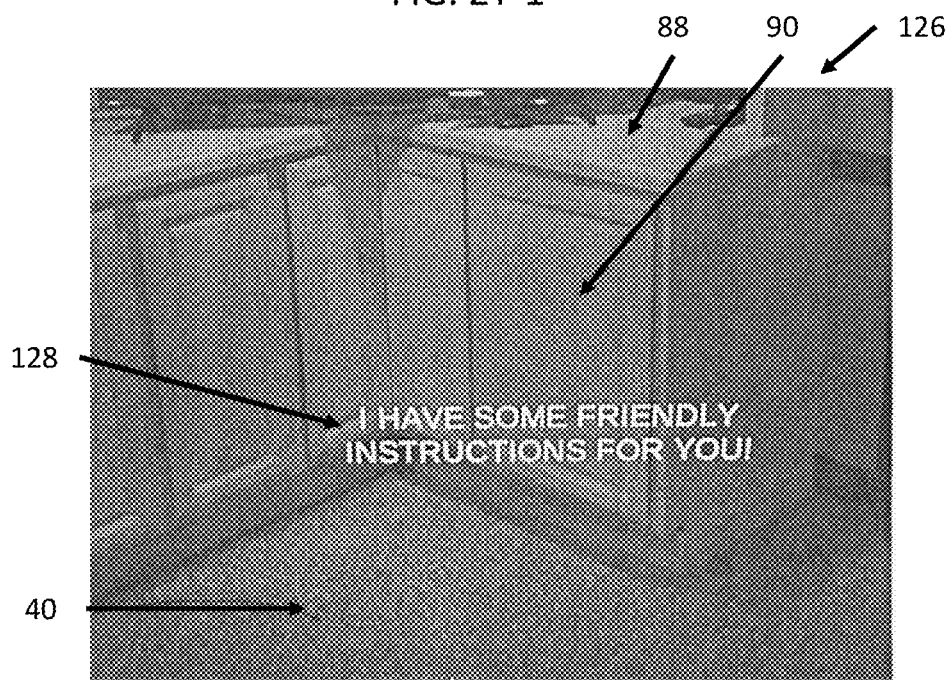

In FIG. 2C-3, the sensor 282 may move to a second location and have a field of view 288. As shown in FIG. 2C-4, a further group of voxels become visible, and the values of these voxels may be set to indicate the location of the portion of the surface that has entered the field of view 288 of sensor 282. The values of these voxels may be added to the volumetric model for the surface.

In FIG. 2C-5, the sensor 282 may further move to a third location and have a field of view 290. In the illustrated example, additional portions of the surface become visible in the field of view 290. As shown in FIG. 2C-6, a further group of voxels may become visible, and the values of these voxels may be set to indicate the location of the portion of the surface that has entered the field of view 290 of the sensor 282. The values of these voxels may be added to the volumetric model for the surface. As shown in FIG. 2A, this information may be stored as part of the persisted world as volumetric information 162*a*. Information about the surfaces may also be stored, such as color or texture. Such information may be stored, for example, as volumetric metadata 162*b*.

In addition to generating information for a persisted world representation, the perception module 160 may identify and output indications of changes in a region around a user of an MR system. Indications of such changes may trigger updates to volumetric data stored as part of the persisted world, or trigger other functions, such as triggering components that generate MR content to update the MR content.

In some embodiments, the perception module 160 may identify changes based on a signed distance function (SDF) model. The perception module 160 may be configured to receive sensor data such as, for example, depth maps 160*a* and head poses 160*b*, and then fuse the sensor data into an SDF model 160*c*. Depth maps 160*a* may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The head poses 160*b* may enable the SDF information to be related to a voxel in the physical world.

Referring back to FIG. 2A, in some embodiments, the perception module 160 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may be operate reliably over a range of distances, creating the observation range of the sensor, which may be from a few centimeters or tens of centimeters to a few meters.

FIG. 2B-2 depicts a reconstruction range with respect to a sensor 204 having a viewpoint 206. A reconstruction of 3D spaces within the viewpoint 206 may be built based on data captured by the sensor 204. In the illustrated example, the sensor 204 may have an observation range of 40 cm (e.g., 220) to 5 m (e.g., 222) in some embodiments. In some embodiments, a sensor's reconstruction range may be determined to be smaller than the observation range of the sensor because sensor outputs close to its observation limits may be more noisy, incomplete, and inaccurate. For example, in the illustrated example of 40 cm to 5 m, a corresponding reconstruction range may be set to be from 1 to 3 m, and data collected with the sensor indicating surfaces outside this range may not be used.

In some embodiments, the perception range may be larger than a sensor's reconstruction range. If components (e.g., 164 in FIG. 2A) that use data about the physical world require data about regions within the perception range that are outside the portions of the physical world that are within the current reconstruction range, that information may be provided from the persisted world 162 in FIG. 2A. Accordingly, information about the physical world may be readily accessible by a query. In some embodiments, an API may be provided to respond to such a query, providing information about the current perception range of the user. Such technique may reduce time needed to access an existing reconstruction and provide an improved user experience.

In some embodiments, the perception range may be a 3D space corresponding to a bounding box centered around a user location. As the user moves, the portion of the physical world within the perception range, which may be queried by, for example, one or more of the components 164 in FIG. 2A, may move with the user. FIG. 2B-3 depicts a bounding box 210 centered around a location 212. It should be appreciated that the size of the bounding box 210 may be set to enclose a sensor's observation range with reasonable extensions because a user cannot move at an unreasonable speed. In the illustrated example, a sensor worn by the user has an observation limit of 5 m. The bounding box 210 is set as a cube of 20 m³.

Referring back to FIG. 2A, the world reconstruction component 316 may include additional modules that may interact with the perception module 160. In some embodiments, a persisted world module 162 may receive representations for the physical world based on data acquired by the perception module 160. The persisted world module 162 also may include various formats of representations of the physical world. For example, volumetric metadata 162b such as voxels may be stored as well as meshes 162c and planes 162d. In some embodiments, other information, such as depth maps could be saved.

In some embodiments, the perception module 160 may include modules that generate representations for the physical world in various formats including, for example, meshes 160d, planes and semantics 160e. These modules may generate representations based on data within the perception range of one or more sensors at the time the representation is generated as well as data captured at prior times and information in the persisted world 162. In some embodiments, these components may operate on depth information captured with a depth sensor. However, an MR system may include vision sensors and may generate such representations by analyzing monocular or binocular vision information in some embodiments.

In some embodiments, these modules may operate on regions of the physical world, such as regions represented by blocks or tiles, as described below. Those modules may be triggered to update a block or tile, or other subregion of the physical world, when the perception module 160 detects a change in the physical world in that subregion. Such a change, for example, may be detected by detecting a new surface in the SDF model 160c or other criteria, such as changing the value of a sufficient number of voxels representing the subregion.

The world reconstruction component 316 may include components 164 that may receive representations of the physical world from the perception module 160. Information about the physical world may be pulled by these components according to, for example, a use request from an application. In some embodiments, information may be pushed to the use components, such as via an indication of a change in a pre-identified region or a change of the physical world representation within the perception range. The components 164, may include, for example, game programs and other components that perform processing for visual occlusion (164a), physics-based interactions (164b), and/or environment reasoning (164c).

Responding to the queries from the components 164, the perception module 160 may send representations for the physical world in one or more formats. For example, when the component 164 indicates that the use is for visual occlusion or physics-based interactions, the perception module 160 may send a representation of surfaces. When the component 164 indicates that the use is for environmental reasoning, the perception module 160 may send meshes, planes and semantics of the physical world.

In some embodiments, the perception module 160 may include components that format information to provide the component 164. An example of such a component may be ray-casting component 160f. A use component (e.g., component 164), for example, may query for information about the physical world from a particular point of view. Ray-casting component 160f may select from one or more representations of the physical world data within a field of view from that point of view.

As should be appreciated from the foregoing description, the perception module 160, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification.

A world reconstruction system may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction. The reconstruction may be more complete and less noisy than the original sensor data by using spatial and temporal averaging (i.e. averaging data from multiple viewpoints over time).

The reconstruction may contain data of different levels of sophistication including, for example, raw data such as live depth data, fused volumetric data such as voxels, and computed data such as meshes. In some embodiments, AR and MR systems represent a 3D scene with a regular voxel grid, where each voxel may contain a signed distance field (SDF) value. The SDF value describes whether the voxel lies inside or outside a surface in the scene to be reconstructed and a distance from the voxel to the surface. Computing the 3D reconstruction data, representing the desired volume of the scene, requires a large amount of memory and processing power. These requirements increase for scenes that represents larger spaces as the number of variables required for the 3D reconstruction grows cubically with the number of depth images processed.

Described herein is an efficient way of reducing processing. In accordance with some embodiments, a scene may be represented by one or more bricks. Each brick may include multiple voxels. The bricks processed to generate the 3D reconstruction of the scene may be selected by culling the set of bricks representing the scene based on a frustum derived from the field-of-view (FOV) of an image sensor, and/or a depth image (or "depth map") of the scene created with a depth sensor.

The depth image may have one or more pixels, each representing a distance to a surface in the scene. These distances can be related to a position relative to an image sensor, such that the data output from the image sensor may be selectively processed. Image data may be processed for those bricks representing portions of the 3D scene that contain surfaces that would be visible from the point of view (or "viewpoint") of the image sensor. Processing of some or all of the remaining bricks may be omitted. With such an approach, the selected bricks may be ones that are likely to contain new information, which may be arrived at by culling bricks about which the output of the image sensor is unlikely to provide useful information. The data output from the image sensor is unlikely to provide useful information about bricks that are either closer to or further from the image sensor than a surface indicated by the depth map because those bricks are either empty space or behind a surface and therefore not depicted in images from the image sensor.

In some embodiments, one or more criteria may be applied to efficiently select a set of bricks for processing. An initial set of bricks may be limited to those within a frustum of an image sensor. A great number of bricks outside the frustum may then be culled. More computer-resource intense processing to update the 3D reconstruction may then be performed on the subset of bricks accepted for processing following the culling. Accordingly, a 3D representation of the scene to be updated is more efficiently computed using processing on a reduced number of voxels.

An even greater reduction in processing may be achieved by culling bricks based on the depth image. In accordance with some embodiments, culling and/or acceptance of bricks may be performed by projecting a silhouette of each brick in the initial set into the depth image. Such culling may be based on whether the brick corresponds to a portion of the scene that the depth image indicates is in the vicinity of a surface. Bricks that may be simply identified as entirely in front of or entirely behind a surface may be culled from a set of bricks. In some embodiments, such a determination may be efficiently made. For example, a bounding box around the projection of the brick into the depth map may be used to determine a maximum brick value and a minimum brick value along a z-coordinate direction, which may be substantially perpendicular to a 2D plane of the depth image. By comparing these maximum and minimum brick values to the distances represented by pixels in the depth map, bricks may be culled and/or accepted for further processing. Such processing may result in selection of bricks for initial processing that intersect with surfaces, as reflected in the depth image, and/or that are in front of a surface, as reflected in the depth image. In some embodiments, such processing may differentiate between bricks that are in front of solid surfaces and those that are in front of holey surfaces (i.e. bricks representing regions for which the depth sensor was unable to reliably measure a distance to a surface).

In some embodiments, the culling/acceptance criteria may result in classifying some or all of the bricks accepted for further processing such that processing algorithms for the computationally volumetric reconstruction may be tailored for the characteristics of the brick. In some embodiments, different processing may be selected based on whether the brick is classified as intersecting a surface, being in front of a solid surface or being in front of a holey surface.

FIG. 2D shows a cross-sectional view of a scene 200D along a plane parallel to y-coordinate and z-coordinate. An XR system may represent the scene 200D by a grid of voxels 254D. Conventional XR systems may update each voxel of the grid of voxels based on every new depth image captured by a sensor 206D, which may be an image sensor or depth sensor, such that a 3D reconstruction generated from the grid of voxels can reflect changes in the scene. Updating in this fashion may consume significant computing resources and also cause artifacts at the output of an XR system due to, for example, time latency caused by heavy computing. Some embodiments are directed to techniques of providing accurate 3D reconstructed data with low usage of computational resources, for example, by culling parts of the grid of voxels 254D based at last in part on a camera frustum 204D of an image sensor 206D and/or depth image captured by the image sensor.

In the illustrated example, the image sensor 206D captures a depth image (not shown) including a surface 202D of the scene 200D. The depth image may be stored in computer memory in any convenient way that captures distance between some reference point and surfaces in the scene 200D. In some embodiments, the depth image may be represented as values in a plane parallel to an x-axis and y-axis, as illustrated in FIG. 2D, with the reference point being the origin of the coordinate system. Locations in the X-Y plane may correspond to directions relative to the reference point and values at those pixel locations may indicate distance from the reference point to the nearest surface in the direction indicated by the coordinate in the plane. Such a depth image may include a grid of pixels (not shown) in the plane parallel to the x-axis and y-axis. Each pixel may indicate a distance, in a particular direction, from the image sensor 206D to the surface 202D. In some embodiments, a depth sensor may be unable to measure a distance to a surface in a particular direction. Such a condition, for example, may result if the surface is out of range of the image sensor 206D. In some embodiments, the depth sensor may be an active depth sensor that measures distance based on reflected energy but a surface may not reflect sufficient energy for an accurate measurement. Accordingly, in some embodiments, the depth image may have "holes," where there are pixels to which no value is assigned.

In some embodiments, the reference point of the depth image may change. Such a configuration may allow the depth image to represent surfaces throughout an entire 3D scene, not limited to the portions having a predetermined and limited range of angles with respect to a particular point of reference. In such embodiments, the depth image may indicate distance to surfaces as the image sensor 406 moves through six degree-of-freedom (6DOF). In these embodiments, the depth image may include a set of pixels for each of multiple reference points. In these embodiments, a portion of the depth image may be selected based on a "camera pose," representing the direction and/or orientation in which the image sensor 206D is pointing at the time image data is captured.

The image sensor 206D may have a field-of-view (FOV), which may be represented by the camera frustum 204D. In some embodiments, the infinite camera frustum depicted may be reduced to a finite 3D trapezoidal prism 208D by assuming a maximum depth 210D that the image sensor 206D may provide, and/or a minimum depth 212D that the image sensor 206D may provide. The 3D trapezoidal prism 208D may be a convex polyhedron delimited by at six planes.

In some embodiments, one or more voxels 254D may be grouped into a brick 252D. In some embodiments, the scene 200D may include one or more bricks, and each brick may be identifiable by a brick identifier such as [0000]-[0015] illustrated in FIG. 2D.

FIG. 2E illustrates a simplified schematic diagram of a plane extraction system in one or more embodiments. The plane extraction system 200E may include depth fusion 204E, which may receive multiple depth maps 202E. The multiple depth maps 202E may be created by one or more users wearing depth sensors, and/or downloaded from local/remote memories. The multiple depth maps 202E may represent multiple views of a same surface. There may be differences between the multiple depth maps, which may be reconciled by the depth fusion 204E.

In some embodiments, the depth fusion 204E may generate SDFs 206E based, at least in part, on an example process delineated below. The example process may start with representing a scene (e.g., the scene 200D) with one or more bricks (e.g., the brick 252D), each brick including one or more voxels (e.g., the voxel 254D). Each brick may represent a portion of the scene. The bricks may be identifiable relative to a persistent coordinate system such that, even as a pose of an image sensor (e.g., the image sensor 206D) changes, the same bricks represent the same volume in the scene. The example process may capture a depth image (e.g., the depth image including the surface 202D) from a depth sensor (e.g., the depth sensor 206D).

The depth sensor may be an active depth sensor, transmitting, for example, IR radiation and measuring time of flight for a reflection. Each such measurement represents distance to a surface from the depth sensor in a particular direction. That depth information may represent the same volume as is represented by the bricks. The example process may cull a portion of the one or more bricks against a camera frustum (e.g., the finite 3D trapezoidal prism 208D derived from the camera frustum 204D) so as to produce a first one or more bricks, which is a reduced set of bricks from the one or more bricks.

Such culling may eliminate bricks representing portions of the scene outside the field of view of the image sensor at the time image data being processed was acquired. That image data, therefore, is unlikely to contain information useful in creating or updating a brick. Moreover, the example process may cull a portion of the first one or more bricks against the depth image so as to produce a second one or more bricks, which is a reduced set of bricks from the first one or more bricks. In addition, the example process may generate a 3D reconstruction of the scene based on the second one or more bricks.

Mesh bricks 208E may be extracted from the SDFs 206E by, for example, applying a marching cube algorithm over corresponding bricks (e.g., bricks [0000]-[0015] in FIG. 2d). Plane extraction 210E may detect planar surfaces in the mesh bricks 208E and extract planes based at least in part on the mesh bricks 208E. The plane extraction 210E may also extract surfels (surface elements) for each brick based, at least in part, on corresponding mesh bricks. Surfels may include vertices in a mesh but not the edges connecting neighboring vertices such that storing surfels consumes less memory space than a mesh. A plane data store 212E may persist the extracted planes and surfels.

In some embodiments, XR applications may request and obtain planes from the plane data store 212E by plane query 214E, which may be sent by application programming interfaces (APIs). For example, an application may send to a plane extraction system 200E information about its position, and ask for all planes near it (e.g., within five meters radius). The plane extraction system 200E may then searches its plane data store 212E, and send the selected planes to the application. The plane query 214E may include information such as where the application needs a plane, what kind of plane the application needs, and/or how the plane should look like (e.g., horizontal or vertical or angled, which may be determined by checking primitive normals (e.g., unit normal vectors) of the planes in the plane data store).

FIG. 2F illustrates a simplified flow diagram for generating a model of an environment represented by a mesh in one or more embodiments. In some embodiments, the method 200F may be performed on a meshing service on an XR platform. The method 200F may start from an input mesh representing the environment at act 202F. In some embodiments, the input mesh may have a high resolution, which may be indicated by the number of triangles. The input mesh may be generated by a reconstruction system (e.g., a volumetric 3D reconstruction system) and the input mesh may include 3D reconstruction data.

In some embodiments, the reconstruction system may generate a volumetric 3D representation of the environment, which may create a data hierarchy of 3D information of the environment captured by one or more sensors. For example, a sensor may be a depth camera, which may capture 3D information of the environment, for example, a stream of depth images with respective poses of the depth camera (i.e. camera poses). The 3D information of the environment may be processed into a voxel grid. Each voxel may contain one or more signed distance functions (SDFs) that describe whether the voxel lies inside or outside the geometries of objects in the environment. The voxels may be grouped into "bricks." Each brick may include multiple voxels, for example, in cubic volumes such as $8^3$ voxels. The bricks may be further grouped into "tiles." Each tile may include multiple bricks.

The size of a tile may be selected to facilitate memory operations in a computing device. The size, for example, may be selected based on the amount of information about the environment that is maintained in active memory of a device that is processing such data. The system, for example, may pass tiles between active memory, which is usually local to the device, and other memory that has more latency, such as non-volatile memory or remote memory in a cloud. One or more whole or partial tiles may contain information representing a "block" in a mesh or other representation of an environment.

In some embodiments, the volumetric 3D reconstruction system may generate the input mesh 202F as a topologically-connected global mesh. In some embodiments, the volumetric 3D reconstruction system may generate the input mesh 202F as a global mesh that is visually seamless although topologically-disconnected. For example, a topologically-disconnected global mesh may be comprised of multiple mesh blocks, each of which is generated from a block.

A reconstruction system may be configured to capture substantial detail of an environment, which enables the system to distinguish between adjacent portions of the representation that have relatively small differences in their characteristics. Adjacent regions of different properties may be identified as different surfaces, resulting in the system identifying a large number of surfaces in the environment. However, such a system may capture details that are unnecessary for many applications, but are nonetheless processed. For example, a reconstruction system may unnecessarily present bumps on a wall with many triangles when two triangles making a rectangle would be a sufficient representation of the wall for a client application requesting meshes from the meshing service. In some embodiments, an application, when requesting a mesh from the meshing service, may specify a target simplification level of the requested mesh. That target simplification level may be expressed as a degree of compression, a number of triangles per unit area, or in any other suitable way.

The method 200F may efficiently generate a model of the environment, which is sufficient for the client application, from the input mesh. At act 204F, the input mesh may be segmented into one or more first mesh blocks, each of which may correspond to a block in the data hierarchy of the volumetric 3D representation of the environment. Each first mesh block may represent a portion of the environment and may have a first value of a metric of complexity (e.g., mesh resolution). In some embodiments, a metric of complexity of a mesh block indicates a number of triangles in the mesh block. In some embodiments, processing may be performed on mesh blocks sequentially and/or in parallel. However, simplification processing as described herein may be applied to the entire mesh or any suitable portion (e.g., one or more mesh blocks).

Act 206F represents a sub-process that is performed on each of multiple mesh blocks. The sub-processing may be performed on multiple mesh blocks independently, such that the processing may be readily performed in parallel for some or all of the mesh blocks. The sub-process may be performed on all mesh blocks or a subset of the mesh blocks selected for further processing. The subset of the mesh blocks may be selected based, at least in part, on a field-of-view of a device on which an application requesting the simplified mesh is executing. At act 206F, some of the first mesh blocks may be selected based on, for example, objects described in the first mesh blocks or locations of the first mesh blocks. For each of the selected first mesh blocks, a multi-stage simplification may be performed. In some embodiments, the multi-stage simplifications on the selected first mesh blocks may be performed in parallel and, as a result, the simplifications on the selected first mesh blocks may be completed approximately at a same point of time, though this may depend on the metric of complexity of each mesh block of the selected first mesh blocks.

The multi-stage simplification may include a pre-simplification operation, a region-based operation (e.g., a planarization operation), and a post-simplification operation. In some embodiments, the multi-stage simplification may be performed based on an input value from the client application. The input value may indicate required mesh complexity by the client application (e.g., mesh resolution). The input value from the client application may be the same or different for each of the selected first mesh blocks.

At act 212F, a pre-simplification operation may be performed on a selected first mesh block to generate a second mesh block. The pre-simplification operation may reduce the complexity of the block. For a mesh block, the pre-simplification may reduce the number of polygons in the mesh block. In some embodiments, the amount of pre-simplification at act 212F may be configurable. A target value, for example, may be provided as an input to the processing at act 212F, for example, by the client application. The target value may be a single value or multiple values of one or more specified or predetermined metrics. The one or more metrics may include, for example, absolute triangle count, a percentage of the initial triangle counts, and/or a quadric error metric, which may measure an average squared distance between a simplified mesh and an original mesh (e.g., the input mesh 202F).

The target value may be provided in any suitable way. An instance of the method 200F, for example, may be pre-configured with a target value. In some embodiments, the target value may be supplied through an API by an application requesting a mesh from the meshing service performing the method 200F. For example, the target value for act 212F may be a final target requested by a rendering function (e.g., the requesting application). In some embodiments, the target value provided as an input may be adjusted or overridden to ensure that sufficient data remains in the mesh for subsequent processing. For example, processing in act 214F may require a minimum number of triangles and a target value provided by an application may be replaced by that minimum value if the target value is below the minimum number of triangles.

In such embodiments, the pre-simplified mesh may have values of one or more metrics such that the pre-simplified mesh can be processed faster during the region-based operation than the original block segmented input mesh, while still containing all or most of the regions of the original block segmented input mesh. Without controlling the values of the one or more metrics, the simplified mesh may be too coarse, unevenly distributed, and/or lose many regions of the original block segmented input mesh that are required in the following region-based operation. The second mesh block produced in act 212F may have a second value of the metric of complexity, which may be less than the first value of the metric complexity. In some embodiments, the pre-simplification operation of act 212F may be performed using a triangle reduction algorithm.

At act 214F, a shape detection operation may be performed on the second mesh block to generate a third mesh block. A planarization operation is illustrated as an example. The third mesh block may have a third value of the metric of complexity. In some embodiments, the third value of metric complexity may be the same as the second value of the metric complexity. In some embodiments, the third value of metric complexity may be less than the second value of metric complexity. The planarization operation may include detecting planar areas in the second mesh block, for example, using a region growing algorithm, projecting meshes of the detected planar areas to corresponding planes, adjusting plane normals of the detected planar areas to be substantially perpendicular to the corresponding planes, and simplifying the projected meshes on each of the corresponding planes based on, for example, a target triangle count. In some embodiments, plane normals of the detected planar areas may be adjusted before projecting meshes of the detected planar areas to the corresponding planes.

At act 216F, a post-simplification operation may be performed on the third mesh block to generate a fourth mesh block. In some embodiments, processing at act 214F may desirably be performed on a mesh with more resolution than is required in the simplified mesh that is to be output from method 200F. In some embodiments, processing at act 216F may simplify the entire mesh block to reach a desired level of complexity (e.g., metric complexity), such as might be indicated by a target value of one or more metrics, which may be the same or different target than was supplied to act 212F. In some embodiments, the post-simplification operation at act 216F may focus on reducing the number of polygons within each plane detected by the planarization operation at act 214F.

The fourth mesh block may have a fourth value of the metric of complexity, which may be less than the third value of the metric complexity. In some embodiments, a percentage reduction between the third value of the metric complexity and the fourth value of the metric complexity may be greater than a percentage reduction between the first value of the metric complexity and the second value of the metric complexity. In some embodiments, the percentage reduction between the third value of the metric complexity and the fourth value of the metric complexity may be at least two times greater than the percentage reduction between the first value of the metric complexity and the second value of the metric complexity. In some embodiments, the post-simplification operation of act 216F may be performed using a triangle reduction algorithm. In some embodiments, the post-simplification operation of act 216F may be performed using the same simplification algorithm as the pre-simplification operation of act 212F.

At act 208F, the simplified selected blocks may be combined with other selected mesh blocks similarly processed as in act 206F and/or may be combined with unselected blocks into a new mesh of the environment. At act 210F, the new mesh of the environment may be provided to a client application. In some embodiments, the new mesh of the environment may be referred to as a simplified mesh. In some embodiments, act 208F may be skipped. The simplified mesh blocks may be sent directly to a client application, in which the mesh blocks may be visually seamless although topographically disconnected.

FIG. 2G illustrates an example user's view of a representation of some textual information pertaining to one or more runtime processes for a debugging process in one or more embodiments. More specifically, FIG. 2G illustrates that a user wearing and operating an MR system may be presented with not only a view of the actual environment around the user, such as a floor (40) or a desk (34), but also certain virtual elements to augment the experience in a manner wherein they also may be presented for viewing and interpretation, such as textual elements, graphical elements, artistic imagery, and the like. Moreover, a user's view (32) of a configuration wherein certain textual information (36, 38) pertaining to runtime processes may be presented to the user to assist, for example, in code development and/or debugging processes.

FIG. 2H illustrates an example (48) where a user operates a hand-held controller component (4) to interact with displayed representation through an MR device in one or more embodiments. In these embodiments illustrated in FIG. 2H, the a hand of a user (42) shows that the user may operate a hand-held controller component (4), such as by various button presses, swipes across a touch interface (such as by a thumb 44 as shown across the touch interface 46), or other device interactions to interact with the displayed information (36, 38), to, for example, step through processes sequentially, observe errors or impacts of various inputs, move to most recent activities, toggle visibility options, and the like. The system may be configured to generally keep the displayed information (36, 38) relatively low in the user's field of view to be somewhat out of the way.

FIG. 2I illustrates an example representation including some example status information or event information presented through an MR device in one or more embodiments. In these one or more embodiments illustrated in FIG. 2I, various status (52) and event (54) information may be presented to the user for similar viewability, as shown in the user's view (50) of FIG. 2I.

FIG. 2J illustrates an example where a user aims a virtual cursor at a first object in a representation through an MR device for recognizing the object in one or more embodiments. More specifically, the user has aimed a virtual cursor (60) at the countertop (62) of a cabinet using his hand (42) and a hand controller (4), and based upon the mesh of the room around the user, the system is identifying the countertop as a "table top" and presenting such estimation via text presentation virtual element (64) to the user.

FIG. 2K illustrates another example where a user aims a virtual cursor at a second object in a representation through an MR device for recognizing the second object in one or more embodiments. In these embodiments illustrated in FIG. 2K, the user has aimed a virtual cursor (60) at the floor (40) of the room adjacent to a cabinet door (66), such as by using his hand and a hand controller (or alternatively, for example, could be a head-wearable component based pointing configuration such as eye gaze detection and/or an aiming reticle), and based upon the mesh of the room around the user, the system is identifying the floor as a "floor" and presenting such estimation via text presentation virtual element (74) to the user.

FIG. 2L illustrates another example where a user aims at a third object in a representation through an MR device for recognizing the third object in one or more embodiments. In these one or more embodiments, the user has aimed a virtual cursor (60) at a door with a patterned shade pulled down (72; adjacent to a wall 76 and floor 40), such as by using his hand and a hand controller (or alternatively, for example, could be a head-wearable component based pointing configuration such as eye gaze detection and/or an aiming reticle), and based upon the mesh of the room around the user, the system is identifying the door as a "wall" and presenting such estimation via text presentation virtual element (76) to the user.

FIG. 2M illustrates another example where a user aims at a fourth object in a representation through an MR device for recognizing the fourth object in one or more embodiments. In these one or more embodiments, the user has aimed a virtual cursor (60) at a ceiling (80), such as by using his hand and a hand controller (or alternatively, for example, could be a head-wearable component based pointing configuration such as eye gaze detection and/or an aiming reticle), and based upon the mesh of the room around the user, the system is identifying the ceiling as a "ceiling" and presenting such estimation via text presentation virtual element (78) to the user.

FIG. 2O illustrates another example where a user aims at a fifth object in a representation through an MR device for estimating the fifth object in one or more embodiments. In these one or more embodiments illustrated in FIG. 2O, the system has m is-identified an object. In FIG. 2O, with a cursor (60) aimed at one in a series of cabinet doors (90, 92), with a cabinet countertop, the system is returning and presenting to the user that the cabinet door is a "wall". Depending upon the specific configuration, this may be a result of the cabinet door being orthogonal to or parallel to another identified wall, orthogonal to a ceiling and/or floor, etc.

FIG. 2P illustrates another example where a user aims at a sixth object in a representation through an MR device for estimating the sixth object in one or more embodiments. In these one or more embodiments, the system, as that in FIG. 2O, has returned and presented (86) an estimation of "seat" when the user is actually pointing the cursor (60) at a table (94) that happens to be at approximately typical seating surface height.

FIG. 2Q illustrates another example where a user views an area in a representation through an MR device for selecting one or more objects in the representation in one or more embodiments. In these one or more embodiments, a user is viewing a floor (40), cabinet (88, 92) area with a system configured to interpret a long stare at a portion of a floor as a desire to select such portion of said floor to placing a piece of starter content, as noted in the textual object (116) shown to the user.

FIGS. 2R and 2S illustrates examples where a user views an area in a representation through an MR device for placing one or more objects in the area in one or more embodiments. In these one or more embodiments illustrated in FIG. 2R, the user does gaze down to the floor (40), and after staring for a time longer than a predetermined threshold time period. In some embodiments, such stare is interpreted as a command to place a starter content object (120), as shown in FIG. 2S.

FIG. 2T-1 illustrates an example field of view of a user through an MR device in one or more embodiments. In these one or more embodiments, a user or designer may desire to have a certain virtual object placed at a given location within the user's field of view. For example, it may be desirable to a user to have a small digital clock textual readout object presented in the upper left of his or her field of view, generally out of the way of the remainder of the field of view. In another embodiment it may be desirable for a user to have some valuable textual information, such as pertinent operating instructions, presented in the center of the user's field of view. Such a configuration is shown in FIGS. 2T-1 and 2T-2. In FIG. 2T-1, the field of view (124) of the user includes some cabinetry (88, 90) and a door; the textual instruction virtual object (128) is presented in the center of the user's field of view.

FIG. 2T-2 illustrates another example field of view (126) of the user in FIG. 2T-1 through an MR device in one or more embodiments. In these one or more embodiments, as the user changes his head orientation down toward the floor (40), the textual instruction virtual object (128) may remain presented in the center of the user's field of view. In other words, the system may be configured to retain the virtual object generally in the center of the user's field of view. As noted above, the content may be placed anywhere, such as upper left, lower right, center, etc.

Further, in other embodiments, the system may be configured to maintain the content's position relative to the objects around the user in the room until a certain predetermined delta in position or orientation of the head is achieved, after which the object may be moved again to the center or other desired catchup position. In another embodiment the system may be configured to "soft lock" to certain aspects of the room. For example, the user may decide to "soft lock" a virtual clock right above his doorway, but when the user rotates his head such that the doorway is no longer in his field of view, to then have the clock jump to a different object then in his field of view and "soft lock" to that next object, and so on.

In other embodiments, the system may be configured to ensure that a desired content display is not overlayed in collision with other objects in the room. For example, a user may decide to have a small digital clock positioned three dimensionally about three feet in front of his straight ahead field of view—but in the event that this collides with a meshed object of the room, such as a computer monitor or wall, to have the small digital clock position just proximal of such other meshed object relative to the user, so that the user still can see the clock without collision/occlusion.

Figures 1, 2U:
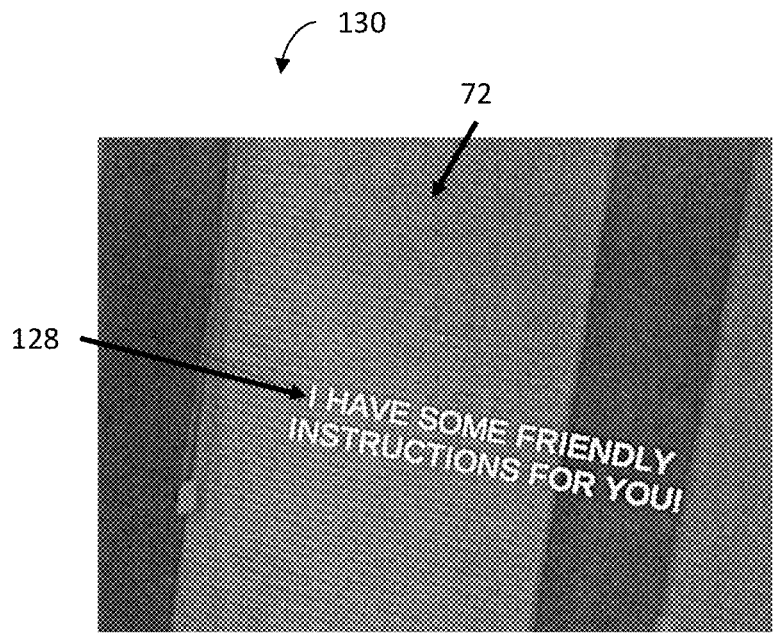
Figures 2, 2U:
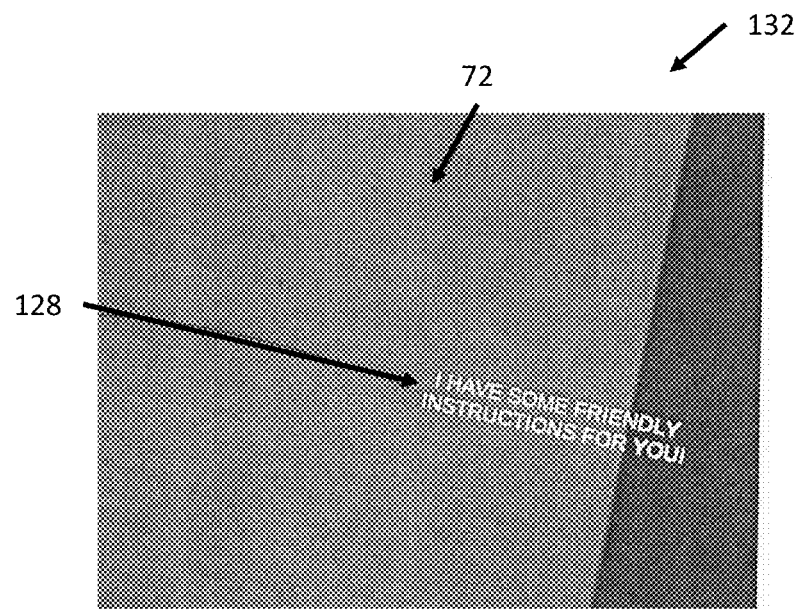

FIG. 2U-1 illustrates an example (130) where the virtual object pertaining to an instruction within a field of view of the user through an MR device in one or more embodiments. In these one or more embodiments, a user has placed a textual object pertaining to some instructions (128) centrally within the field of view, and about two feet forward relative to the head-wearable component (2) of his or her spatial computing system. As the user approaches a door or wall (72), the object (128) may be configured to remain approximately two feet away from the user's head-wearable component (2) until the object would start to collide with the mesh that is pertinent to the door (72).

FIG. 2U-2 illustrates an example (132) where the MR device avoids collision between the virtual object placed by the user in FIG. 2U-1 and another object recognized by the MR device in one or more embodiments. In these one or more embodiments, the system may be configured to continue to present the object (128) without collision with the wall, but with incremental decreases in scale as the user continues to get closer and closer to the door (72), almost as though the object is being projected onto the door (72) with a projector that is closing in as the user's head closes in.

Figures 1, 2V:
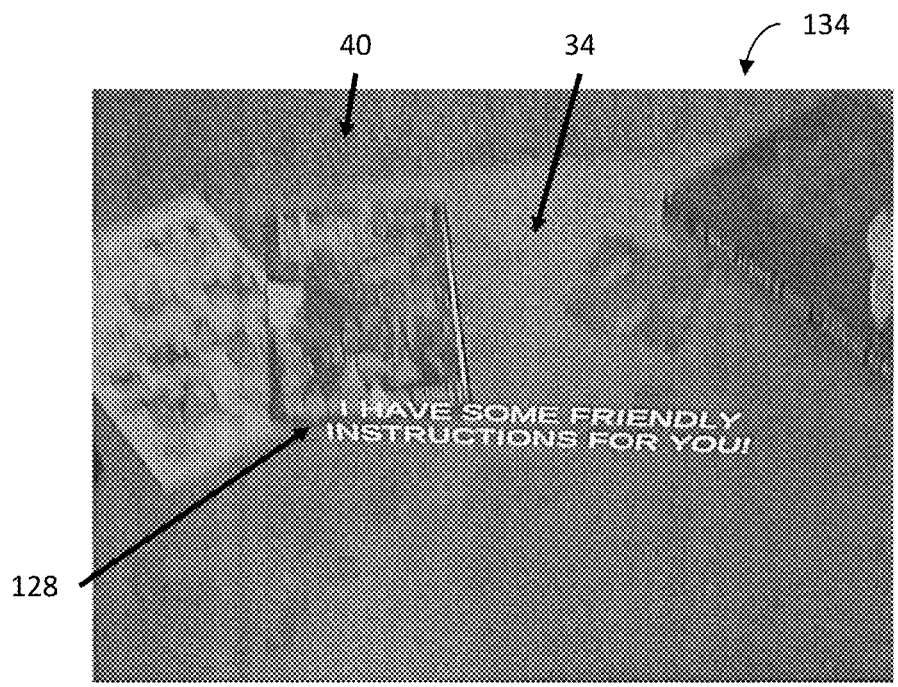
Figures 2, 2V:
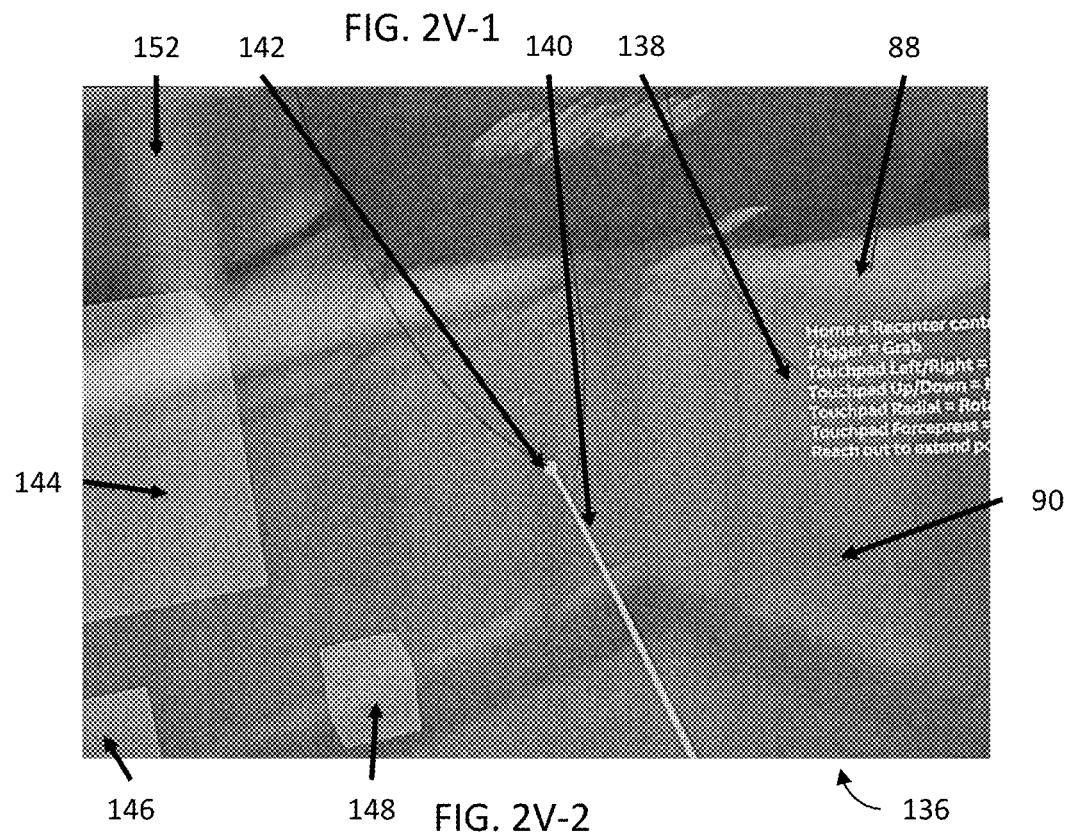

FIG. 2V-1 illustrates an example (134) where an MR device programmatically orients one or more objects within a field of view of the user through the MR device in one or more embodiments. In these one or more embodiments, a user view (134) illustrates that presented objects such as textual content (128) may be oriented by the system to align with gravity up, as shown, or in any other orientation, such as in parallel or orthogonal to a plane of a tabletop (34).

FIG. 2V-2 illustrates an example pointer having a pointer tip that may be used by a user via an MR device (136) in one or more embodiments. In these one or more embodiments, a virtual pointer may be utilized to move, size, and otherwise manipulate virtual objects, and simulated physics may be added to enhance operation of the pointer and also manipulation of objects. As illustrated in the example in FIG. 2V-2, a pointer (140) with distal pointer tip (142) is shown in a stationary position, as aimed, for example, by a user operating a hand-held component (4). Several virtual cube-like objects are shown in this user view (136), as is a small virtual display (138) pertaining to operation of the user interface. In the background, elements of a cabinet structure (88, 90, 152) are shown including a high cabinet frame member (152).

Figures 1, 2W:
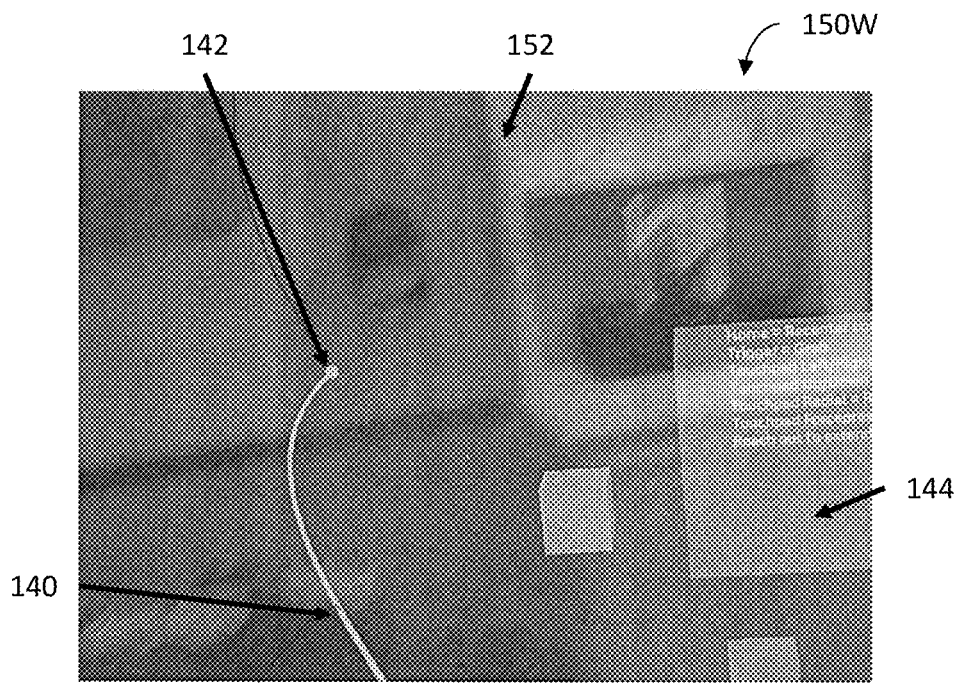
Figures 2, 2W:
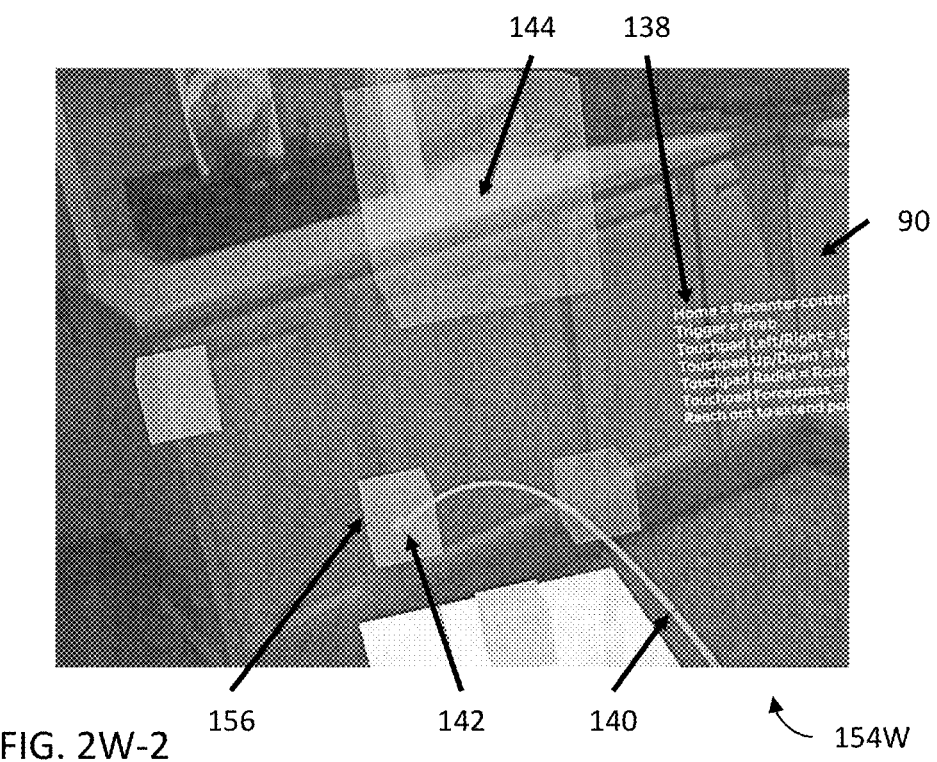

FIG. 2W-1 illustrates an example (150W) where the pointer in FIG. 2V-2 is presented with physics-based behavior with simulated mass configuration and/or simulated structural modulus configuration through the MR device in one or more embodiments. In these one or more embodiments, a mass configuration and structural modulus configuration may be simulated and imparted by the system to provide the pointer (140, 142) with a simulated physical behavior that may be observed in the user's view (150W), such that quick changes in orientation, as shown in FIG. 2W-1 relative to FIG. 2V-2, produce a simulated bending of the pointer (140).

In various embodiments, the system may be configured to add a desirable and customizable physical "feel" for the user as the user selects, moves, drags, and/or modifies various virtual objects. For example, the system may be configured to provide smooth movement with object and pointer positional and angular velocity limitations, filtering, interpolation, averaging, and the like. The structural modulus of the pointer (140) may be simulated using a Bezier spline, and may be given linear or nonlinear bending properties and various simulated mass characteristics.

Pointer objects (140, 142) may be configured to add simulated spring-based inertia to make objects move more realistically, and objects may be tagged with physical properties to respect gravity, collisions, and structural modulus configurations of themselves and other objects with which they may collide or interface, such as when dragged or repositioned by the pointer.

FIG. 2W-2 illustrates an example user view of manipulating an object with the pointer in FIG. 2W-1 or 2V-2 with an MR device in one or more embodiments. In these one or more embodiments, the user view (154W) of a pointer dragging a virtual cube object (156) with simulated mass and structural modulus imparted to each. Friction physics may also be added in various configurations as though virtual elements have static and kinetic coefficients of friction relative to each other, and relative to the space that they occupy or objects with which they may interface (for example, a virtual shuffleboard configuration may have a relatively low friction configuration for the virtual board, but higher friction elsewhere, with the exception of free 3-D space, which may be configured to have very little friction in one "thin air" embodiment, or relatively high friction in a "viscous gelatin world" simulated embodiment.

Figures 1, 2X:
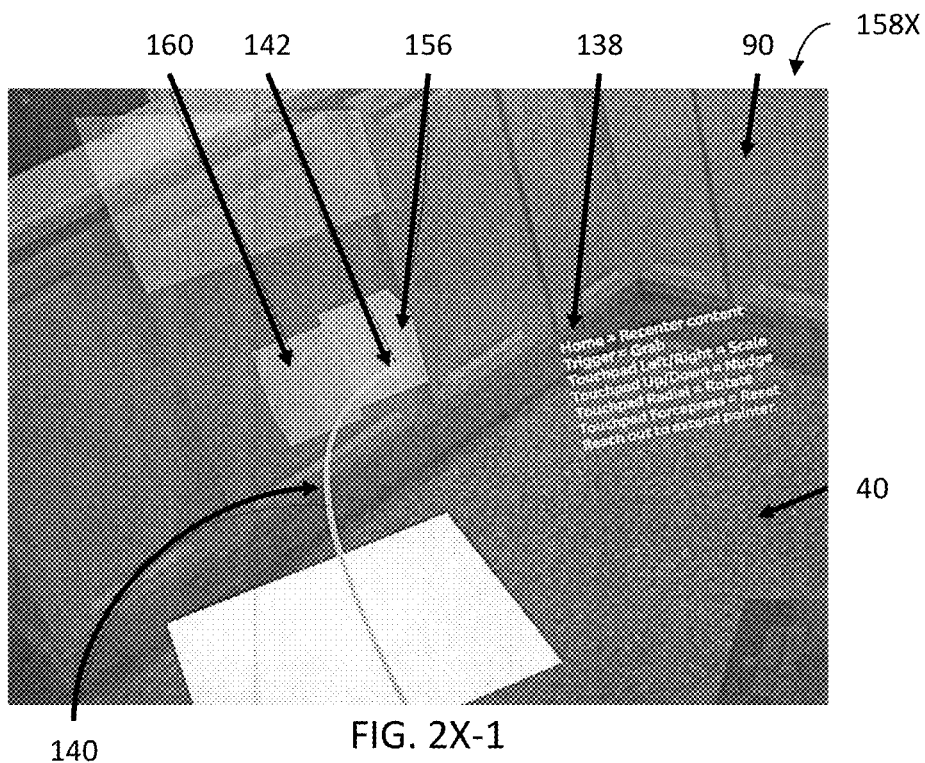
Figures 2, 2X:
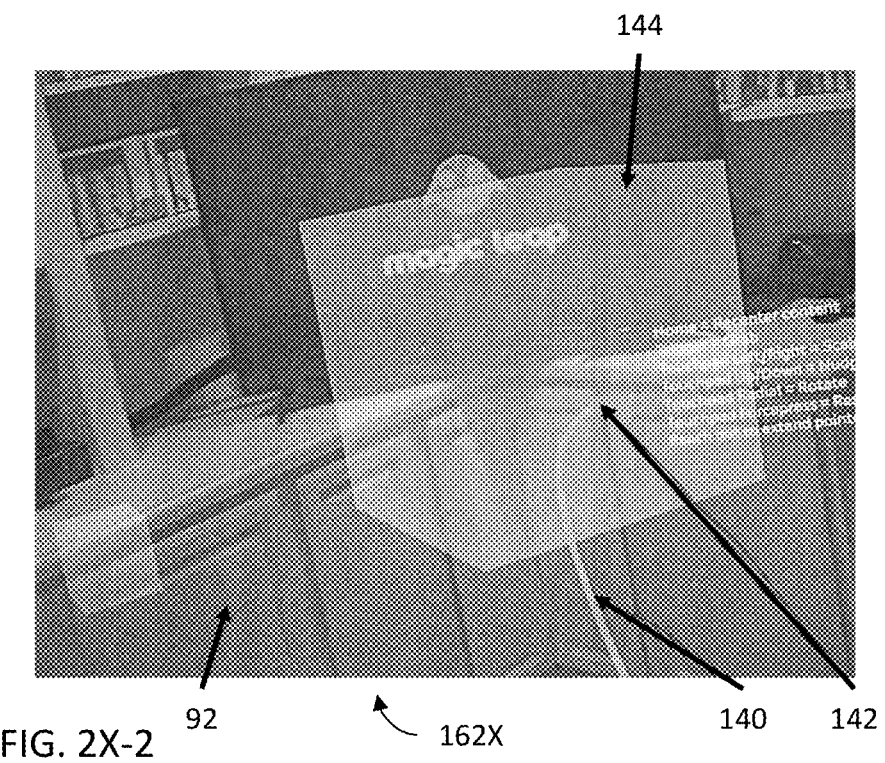

FIG. 2X-1 illustrates an example user view of manipulating an object into collision with another object using a pointer provided by an MR device in one or more embodiments. In these one or more embodiments, a user view (158X) of an embodiment wherein one virtual object (156) is being dragged into a collision state with another virtual object (160) via the intercoupled virtual pointer (140).

FIG. 2X-2 illustrates an example user view of resizing an object using a pointer provided by an MR device in one or more embodiments. In these one or more embodiments, a user view (162X) of an embodiment wherein a pointer (140, 142) is being utilized to re-size an object (144).

Figures 1, 2Y:
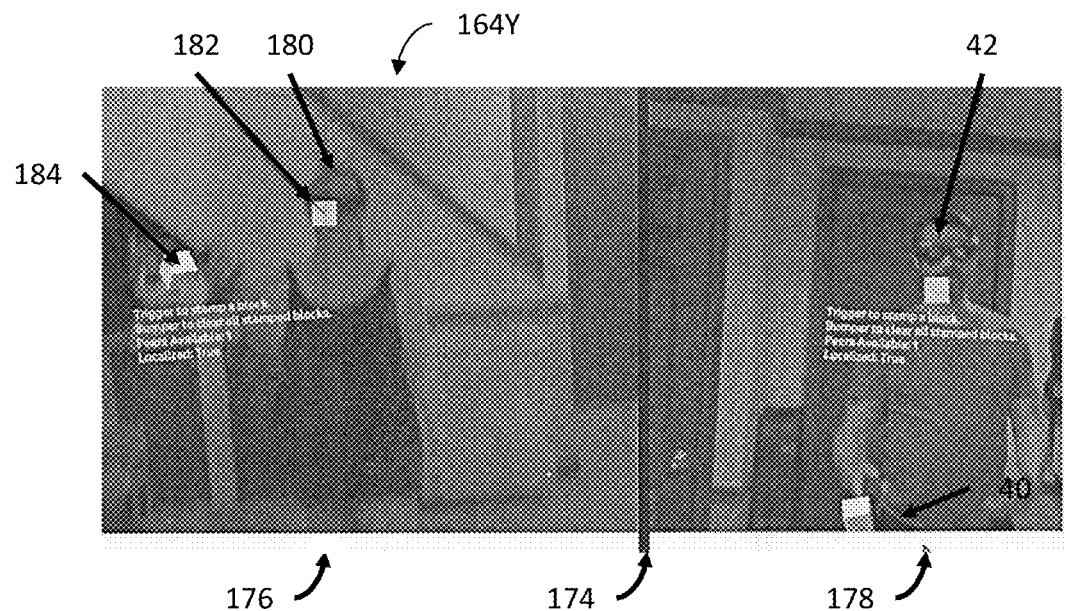
Figures 2, 2Y:
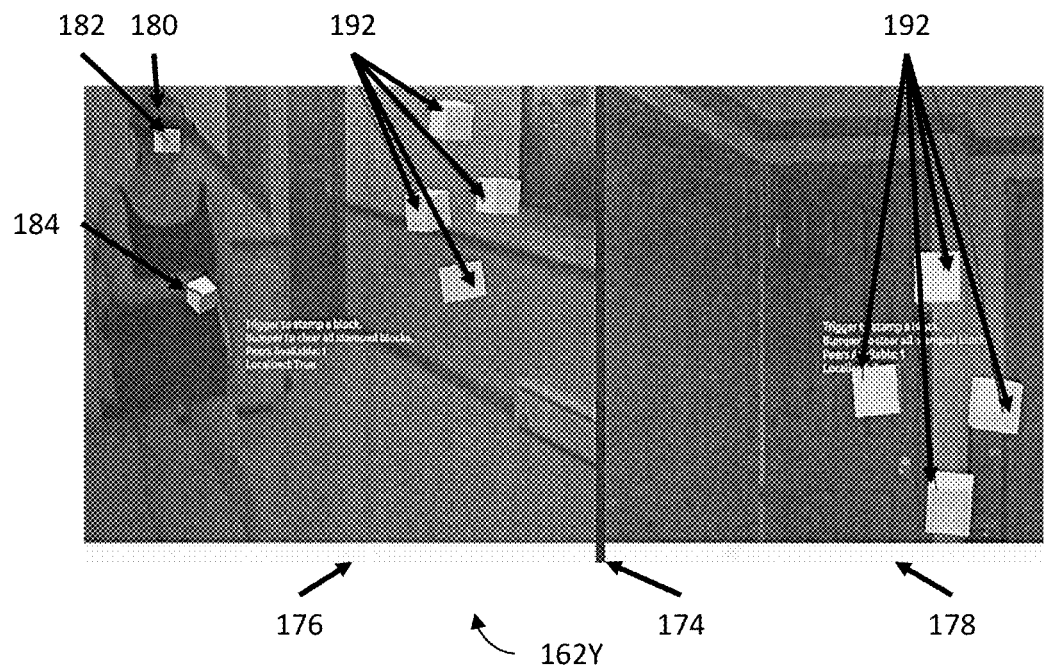

FIG. 2Y-1 illustrates an example split view (164Y) of a first user and a second user associated or tagged with respective one or more markers provided by respective MR devices in one or more embodiments. In these one or more embodiments, aspects of a configuration are illustrated in split-screen format (the user views 176 to the left of the split 174 represent views of the first user 42. The user views 178 to the right of the split 174 represent views of the second user 180).

FIG. 2Y-1 further illustrates a split view (164Y) wherein each of the users (180, 42) has a small cube virtually coupled to their head-wearable and hand-held spatial computing components. The second user (180) has these two small cubes labelled in the illustration as elements 184 and 182. As shown in FIG. 2Y-1, the first user sees these two small cubes in his view (176) and they are, indeed, remaining tied to the second user's head-wearable and hand-held spatial computing components as the second user moves around.

FIG. 2Y-2 illustrates an example split view (162Y) of the first user in FIG. 2Y-1 placing one or more objects with the MR device of the first user in one or more embodiments. In the split view (166) illustrated in FIG. 2Y-2, as the first user utilizes his hand-held spatial computing component to place four new cubes in space (192), these cubes are visible by the second user. In some embodiments, as the first user (42) asks the second user (180) to reach out and touch the top one (190) of the four new cubes (192), the second user (180) does appear to the first user to touch that top (190) new cube.

Figures 1, 2Z:
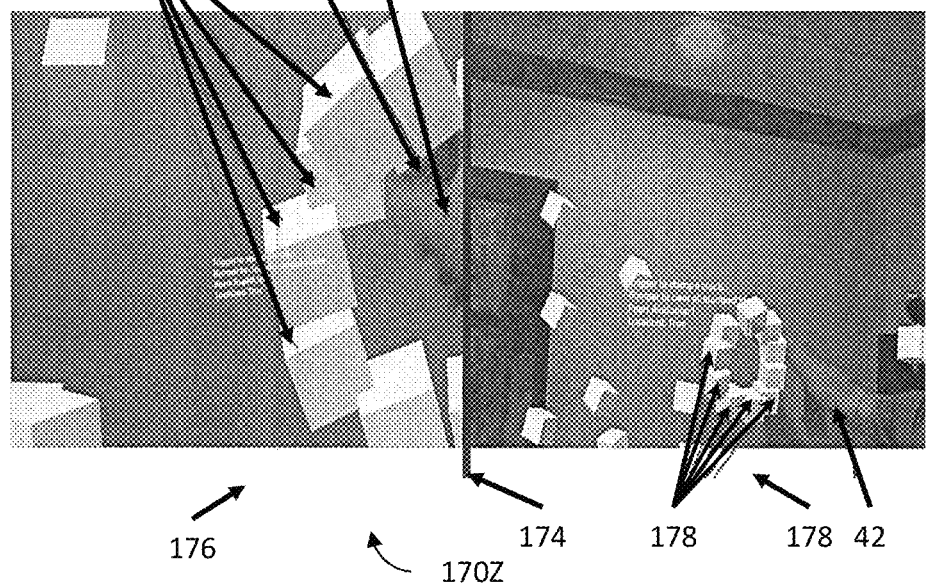
Figures 2, 2Z:
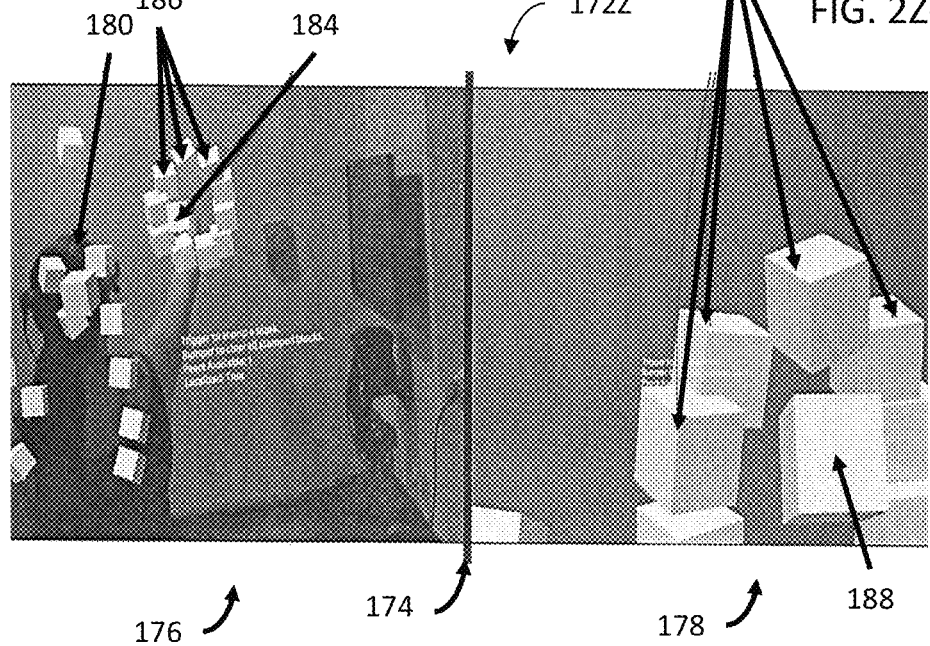

FIG. 2Z-1 illustrates an example split view (170Z) of the first user and the second user in FIG. 2Y-2 where the second user manipulates an object placed by the first user with their respective MR devices in one or more embodiments. FIG. 2Z-2 illustrates an example split view (172Z) of a first user and a second user where the first user places a pattern of objects with his MR device in one or more embodiments. In these one or more embodiments, the split views (170 and 172, respectively) are shown wherein the first user (42) creates a circular pattern of new cubes (186), after which the second user (180) sees these new cubes (186) in space in front of her and then places her own new cube (188) directly in the center for both users to see, thus illustrating that the two users are collaborating in space in a configuration involving viewability and spatial interaction by both of them, subject to a persistent coordinate frame that keeps their positions and orientations calibrated and consistent relative to each other so that they may effectively collaborate in space.

Figure 3A:
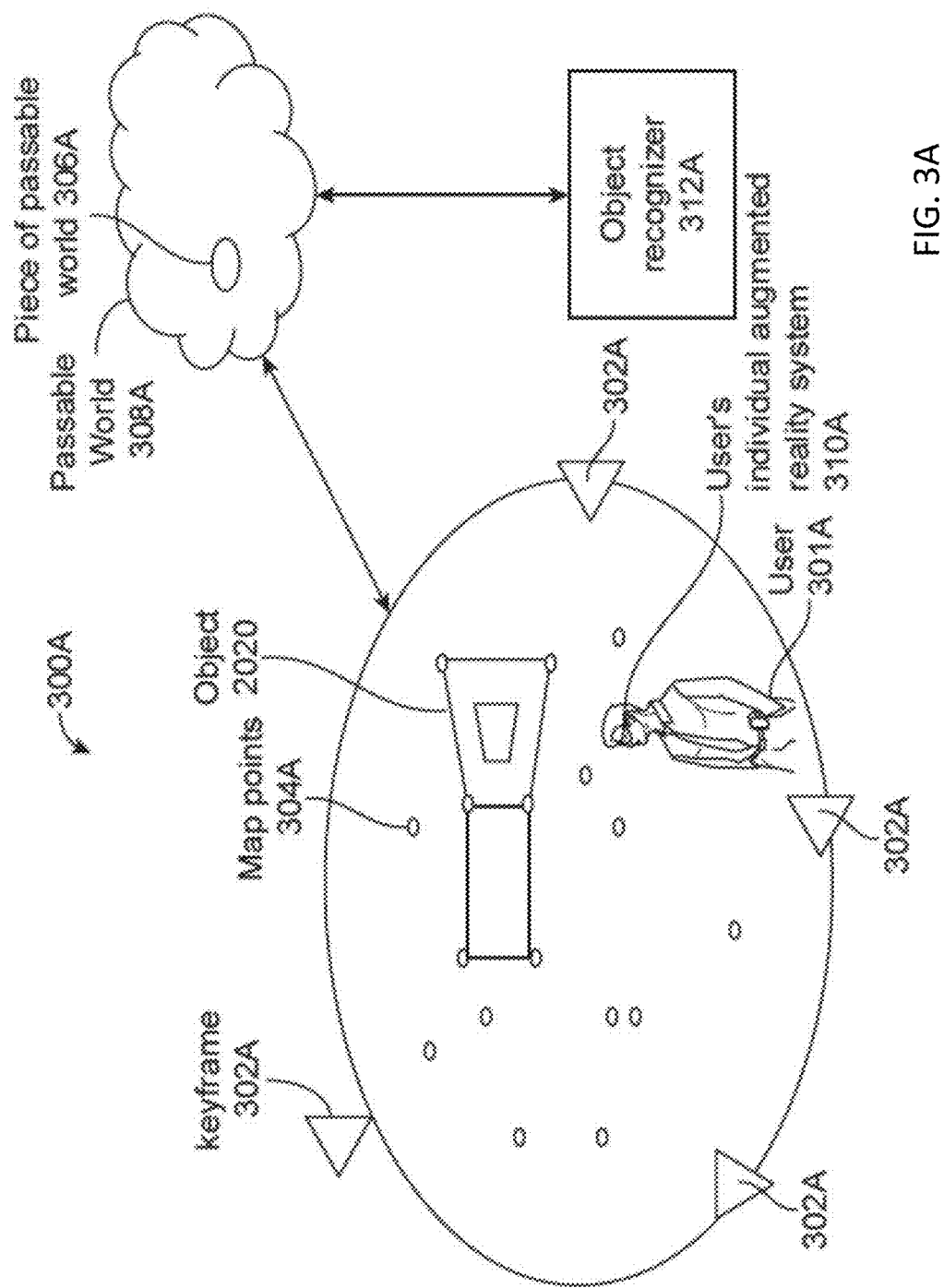
FIG. 3A illustrates some examples components of an example passable world model in one or more embodiments.

FIG. 3A illustrates some examples components of an example passable world model 300A in one or more embodiments. As a user 301A walks through an environment, the user's individual AR system 310A captures information (e.g., images, location information, position and orientation information, etc.) and saves the information through posed tagged images. In the illustrated embodiment, an image may be taken of the object 320A (which resembles a table) and map points 304A may be collected based on the captured image. This forms the core of the passable world model, as shown by multiple keyframes (e.g., cameras) 302A that have captured information about the environment.

As shown in FIG. 3A, there may be multiple keyframes 302A that capture information about a space at any given point in time. For example, a keyframe may be another user's AR system capturing information from a particular point of view. Another keyframe may be a room-based camera/sensor system that is capturing images and points 304A through a stationary point of view. By triangulating images and points from multiple points of view, the position and orientation of real objects in a 3D space may be determined.

In one or more embodiments, the passable world model 308A is a combination of raster imagery, point and descriptors clouds, and polygonal/geometric definitions (referred to herein as parametric geometry). All this information is uploaded to and retrieved from the cloud, a section of which corresponds to a particular space that the user may have walked into. As shown in FIG. 3A, the passable world model also contains many object recognizers 312A that work on the cloud or on the user's individual system 310A to recognize objects in the environment based on points and pose-tagged images captured through the various keyframes of multiple users. Essentially by continually capturing information about the physical world through multiple keyframes 302A, the passable world is always growing, and may be consulted (continuously or as needed) in order to determine how to render virtual content in relation to existing physical objects of the real world. By collecting information from the user's environment, a piece of the passable world 306A is constructed/augmented, and may be "passed" along to one or more AR users simultaneously or in the future.

Asynchronous communications may be established between the user's respective individual AR system and the cloud-based computers (e.g., server computers). In other words, the user's individual AR system is constantly updating information about the user's surroundings to the cloud, and also receiving information from the cloud about the passable world. Thus, rather than each AR user having to capture images and recognize objects based on the captured images, having an asynchronous system allows the system to be more efficient. Information that already exists about that part of the world is automatically communicated to the individual AR system while new information is updated to the cloud. It should be appreciated that the passable world model lives both on the cloud or other form of networking computing or peer to peer system, and also may live on the user's individual AR system.

In one or more embodiments, the AR system may employ different levels of resolutions for the local components (e.g., computational component such as the belt pack 104E) and remote components (e.g., cloud-based computer(s)). This is because the remote components (e.g., resources that reside on the cloud servers) are typically more computationally powerful than local components. The cloud-based computers may pick data collected by the many different individual AR systems, and/or one or more space or room-based sensor systems, and utilize this information to add on to the passable world model. The cloud-based computers may aggregate only the best (e.g., most useful) information into a persistent world model. In other words, redundant information and/or less-than-optimal quality information may be timely disposed so as not to deteriorate the quality and/or performance of the system.

Figure 3B:
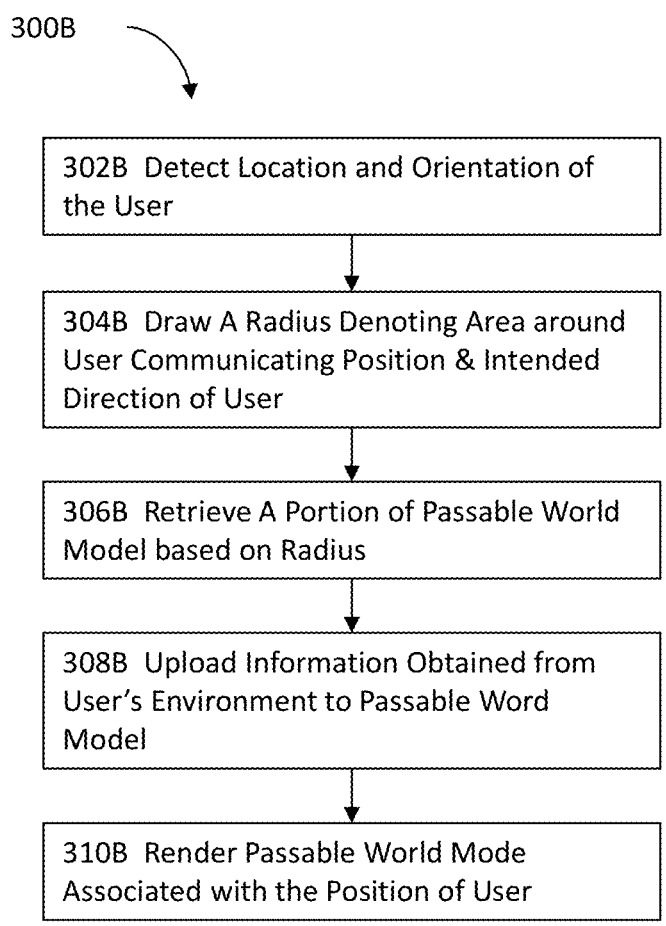
FIG. 3B illustrates an example process for recognizing objects with object recognizers in one or more embodiments.

FIG. 3B illustrates an example process (300B) for recognizing objects with object recognizers in one or more embodiments. At 302B, the user's individual AR system may detect a location and orientation of the user within the world. In one or more embodiments, the location may be derived by a topological map of the system, as will be described in further detail below. In other embodiments, the location may be derived by GPS or any other localization tool. It should be appreciated that the passable world may be constantly accessed by the individual AR system.

In another embodiment (not shown), the user may request access to another user's space, prompting the system to access that section of the passable world, and associated parametric information corresponding to the other user. Thus, there may be many triggers for the passable world. At the simplest level, however, it should be appreciated that the passable world is constantly being updated and accessed by multiple user systems, thereby constantly adding and receiving information from the cloud.

Following the above example, based on the known location of the user, at 304B, the system may draw a radius denoting a physical area around the user that communicates both the position and intended direction of the user. Next, at 306B, the system may retrieve a piece of the passable world based on the anticipated position of the user. In one or more embodiments, the piece of the passable world may contain information from the geometric map of the space acquired through previous keyframes and captured images and data stored in the cloud. At 308B, the AR system uploads information from the user's environment into the passable world model. At 310B, based on the uploaded information, the AR system renders the passable world associated with the position of the user to the user's individual AR system.

This information enables virtual content to meaningfully interact with the user's real surroundings in a coherent manner. For example, a virtual "monster" may be rendered to be originating from a particular building of the real world. Or, in another example, a user may leave a virtual object in relation to physical coordinates of the real world such that a friend (also wearing the AR system) finds the virtual object in the same physical coordinates. In order to enable such capabilities (and many more), it is important for the AR system to constantly access the passable world to retrieve and upload information. It should be appreciated that the passable world contains persistent digital representations of real spaces that is crucially utilized in rendering virtual and/or digital content in relation to real coordinates of a physical space. It should be appreciated that the AR system may maintain coordinates of the real world and/or virtual world. In some embodiments, a third party may maintain the map (e.g., coordinates) of the real world, and the AR system may consult the map to determine one or more parameters in order to render virtual content in relation to real objects of the world.

It should be appreciated that the passable world model does not itself render content that is displayed to the user. Rather, it is a high-level concept of dynamically retrieving and updating a persistent digital representation of the real world in the cloud. In one or more embodiments, the derived geometric information is loaded onto a game engine, which then renders content associated with the passable world. Thus, regardless of whether the user is in a particular space or not, that particular space has a digital representation in the cloud that can be accessed by any user. This piece of the passable world may contain information about the physical geometry of the space and imagery of the space, information about various avatars that are occupying the space, information about virtual objects and other miscellaneous information.

As described in detail further herein, one or more object recognizers may examine or "crawl" the passable world models, tagging points that belong to parametric geometry. Parametric geometry, points and descriptors may be packaged into passable world models, to allow low latency passing or communicating of information corresponding to a portion of a physical world or environment. In one or more embodiments, the AR system can implement a two-tier structure, in which the passable world model may allow fast pose processing in a first tier, but then inside that framework is a second tier (e.g., FAST features). In one or more embodiments, the second-tier structure can increase resolution by performing a frame-to-frame based three-dimensional (3D) feature mapping.

Figure 3C:
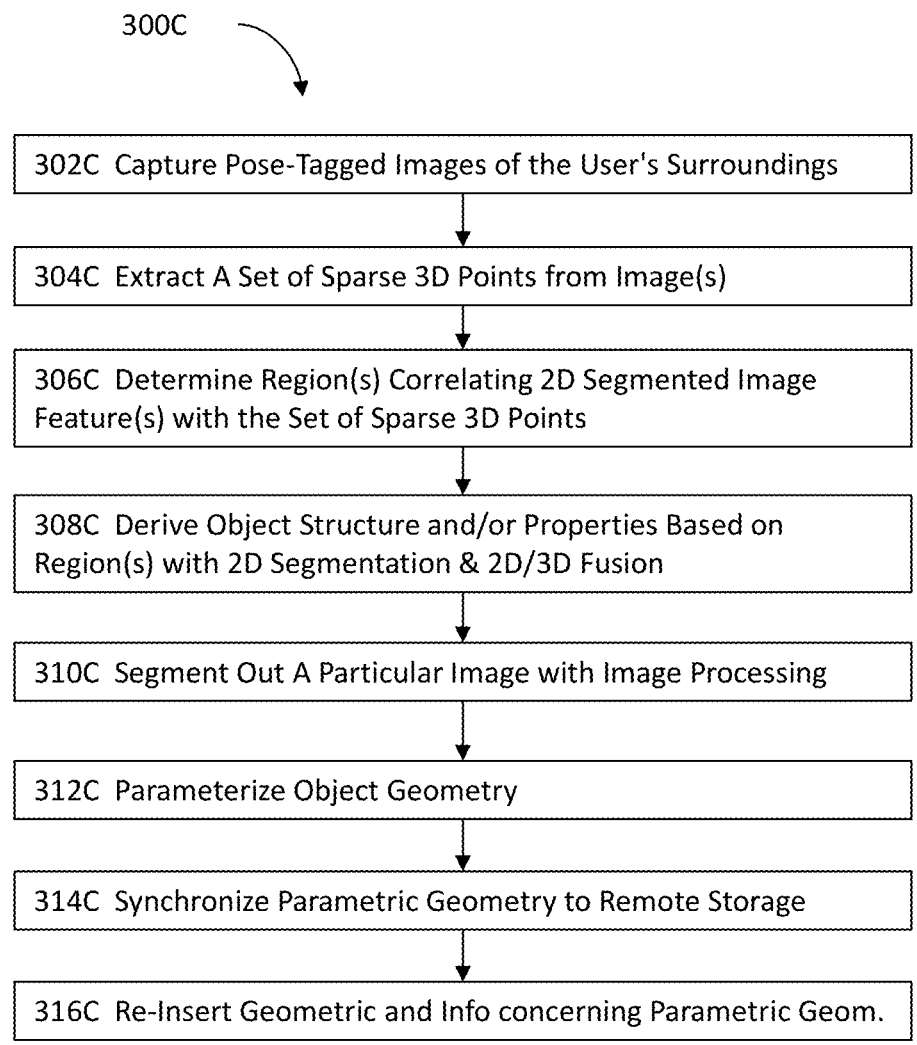
FIG. 3C illustrates an example process for recognizing objects with object recognizers in one or more embodiments.

FIG. 3C illustrates an example process (300C) for recognizing objects with object recognizers in one or more embodiments. At 302C, when a user walks into a room, the user's individual AR system captures information (e.g., images, sensor information, pose tagged images, etc.) about the user's surroundings from multiple points of view. At 304C, a set of 3D points may be extracted from the one or more captured images. For example, by the time the user walks into a section of a room, the user's individual AR system has already captured numerous keyframes and pose tagged images about the surroundings (similar to the embodiment shown in FIG. 3A). It should be appreciated that in one or more embodiments, each keyframe may include information about the depth and color of the objects in the surroundings.

In one or more embodiments, the object recognizers (either locally or in the cloud) may use image segmentation techniques to find one or more objects. It should be appreciated that different objects may be recognized by their own object recognizers that have been written by developers and programmed to recognize that particular object. For illustrative purposes, the following example, will assume that the object recognizer recognizes doors. The object recognizer may be an autonomous and/or atomic software object or "robot" that utilizes the pose tagged images of the space, including key frames and 2D and 3D feature points taken from multiple keyframes, and uses this information, and geometry of the space to recognize one or more objects (e.g., the door)

It should be appreciated that multiple object recognizers may run simultaneously on a set of data, and multiple object recognizers may run independent of each other. It should be appreciated that the object recognizer takes 2D images of the object (2D color information, etc.), 3D images (depth information) and also takes 3D sparse points to recognize the object in a geometric coordinate frame of the world.

Next, at 306C, the object recognizer(s) may correlate the 2D segmented image features with the sparse 3D points to derive object structures and one or more properties about the object using 2D/3D data fusion (308C). For example, the object recognizer may identify specific geometry of the door with respect to the keyframes. Next, at 308C, the object recognizer parameterizes the geometry of the object. For example, the object recognizer may attach semantic information to the geometric primitive (e.g., the door has a hinge, the door can rotate 90 degrees, etc.) of the object. Or, the object recognizer may reduce the size of the door, to match the rest of the objects in the surroundings, etc.

At 310C, a particular image may be segmented out with image processing. The object geometry may be parameterized at 312C by using one or more parameters that receive one or more respective parameter values to respectively represent one or more geometric features (e.g., one or more dimensions). The parametric geometry or information thereof may be synchronized at 314C to a remote storage (e.g., a cloud-based storage, a remote computing system, etc.) At 316C, the object recognizer may re-insert the geometric and parametric information into the passable world model.

For example, the object recognizer may dynamically estimate the angle of the door, and insert it into the world. Thus, it can be appreciated that using the object recognizer allows the system to save computational power because, rather than constantly requiring real-time capture of information about the angle of the door or movement of the door, the object recognizer uses the stored parametric information to estimate the movement or angle of the door. This allows the system to function independently based on computational capabilities of the individual AR system without necessarily relying on information in the cloud servers. It should be appreciated that this information may be updated to the cloud, and transmitted to other AR systems such that virtual content may be appropriately displayed in relation to the recognized door.

As briefly discussed above, object recognizers are atomic autonomous software and/or hardware modules which ingest sparse points (e.g., not necessarily a dense point cloud), pose-tagged images, and geometry, and produce parametric geometry that has semantics attached. The semantics may take the form of taxonomical descriptors, for example "wall," "chair," "Aeron® chair," and properties or characteristics associated with the taxonomical descriptor. For example, a taxonomical descriptor such as a table may have associated descriptions such as "has a flat horizontal surface which can support other objects." Given an ontology, an object recognizer turns images, points, and optionally other geometry, into geometry that has meaning (e.g., semantics).

Because the individual AR systems are intended to operate in the real-world environment, the points represent sparse, statistically relevant, natural features. Natural features are those that are inherent to the object (e.g., edges, holes), in contrast to artificial features added (e.g., printed, inscribed or labeled) to objects for the purpose of machine-vision recognition. The points do not necessarily need to be visible to humans. It should be appreciated that the points are not limited to point features, e.g., line features and high dimensional features.

In one or more embodiments, object recognizers may be categorized into two types, Type 1—Basic Objects (e.g., walls, cups, chairs) and Type 2—Detailed Objects (e.g., Aeron® chair, my wall, etc.). In some implementations, the Type 1 recognizers run across the entire cloud, whereas the Type 2 recognizers run against previously found Type 1 data (e.g., search all chairs for Aeron® chairs). In one or more embodiments, the object recognizers may use inherent properties of an object to facilitate object identification. Or, in other embodiments, the object recognizers may use ontological relationships between objects in order to facilitate implementation. For example, an object recognizer may use the fact that window must be "in" a wall to facilitate recognition of instances of windows.

In one or more embodiments, object recognizers may be bundled, partnered or logically associated with one or more applications. For example, a "cup finder" object recognizer may be associated with one, two or more applications in which identifying a presence of a cup in a physical space would be useful. For example, a coffee company may create its own "cup finder" application that allows for the recognition of cups provided by the coffee company. This may enable delivery of virtual content/advertisements, etc. related to the coffee company, and may directly and/or indirectly encourage participation or interest in the coffee company.

Applications may be logically connected tor associated with defined recognizable visual data or models. For example, in response to a detection of any Aeron® chairs in an image, the AR system calls or executes an application from the Herman Miller Company, the manufacturer and/or seller of Aeron® chairs. Similarly, in response to detection of a Starbucks® signs or logo in an image, the AR system calls or executes a Starbucks® application.

In yet another example, the AR system may employ an instance of a generic wall finder object recognizer. The generic wall finder object recognizer identifies instances of walls in image information, without regard to specifics about a wall. Thus, the generic wall finder object recognizer may identify vertically oriented surfaces that constitute walls in the image data. The AR system may also employ an instance of a specific wall finder object recognizer, which is separate and distinct from the generic wall finder.

The specific wall finder object recognizer identifies vertically oriented surfaces that constitute walls in the image data and which have one or more specific characteristics beyond those of generic wall. For example, a given specific wall may have one or more windows in defined positions, one or more doors in defined positions, may have a defined paint color, may have artwork hung from the wall, etc., which visually distinguishes the specific wall from other walls. Such features may allow the specific wall finder object recognizer to identify particular walls. For example, one instance of a specific wall finder object recognizer may identify a wall of a user's office. Other instances of specific wall finder object recognizers may identify respective walls of a user's living room or bedroom.

A specific object recognizer may stand independently from a generic object recognizer. For example, a specific wall finder object recognizer may run completely independently from a generic wall finder object recognizer, not employing any information produced by the generic wall finder object recognizer. Alternatively, a specific (e.g., more refined) object recognizer may be run nested against objects previously found by a more generic object recognizer. For example, a generic and/or a specific door finder object recognizer may run against a wall found by a generic and/or specific wall finder object recognizer, since a door must be in a wall. Likewise, a generic and/or a specific window finder object recognizer may run against a wall found by a generic and/or specific wall finder object recognizer, since a window must be "in" a wall.

In one or more embodiments, an object recognizer may not only identify the existence or presence of an object, but may also identify other characteristics associated with the object. For example, a generic or specific door finder object recognizer may identify a type of door, whether the door is hinged or sliding, where the hinge or slide is located, whether the door is currently in an open or a closed position, and/or whether the door is transparent or opaque, etc.

As noted above, each object recognizer is atomic, that is the object recognizer is autonomic, autonomous, asynchronous, and essentially a black box software object. This allows object recognizers to be community-built. Developers may be incentivized to build object recognizers. For example, an online marketplace or collection point for object recognizers may be established. Object recognizer developers may be allowed to post object recognizers for linking or associating with applications developed by other object recognizer or application developers.

Various other incentives may be similarly provided. As another example, an incentive may be provided to an object recognizer developer or author based on the number of times an object recognizer is logically associated with an application and/or based on the total number of distributions of an application to which the object recognizer is logically associated. As a further example, an incentive may be provided to an object recognizer developer or author based on the number of times an object recognizer is used by applications that are logically associated with the object recognizer. The incentives may be monetary incentives, in one or more embodiments. In other embodiments, the incentive may comprise providing access to services or media behind a pay-wall, and/or providing credits for acquiring services, media, or goods.

It would, for example, be possible to instantiate any number of distinct generic and/or specific object recognizers. Some embodiments may require a very large number of generic and specific object recognizers. These generic and/or specific object recognizers can all be run against the same data. As noted above, some object recognizers can be nested such that they are essentially layered on top of each other. In one or more embodiments, a control program may control the selection, use or operation of the various object recognizers, for example arbitrating the use or operation thereof. Some object recognizers may be placed in different regions, to ensure that the object recognizers do not overlap each other. As discussed above, the object recognizers may run locally at the individual AR system's belt back, or may be run on one or more cloud servers.

Figure 3D:
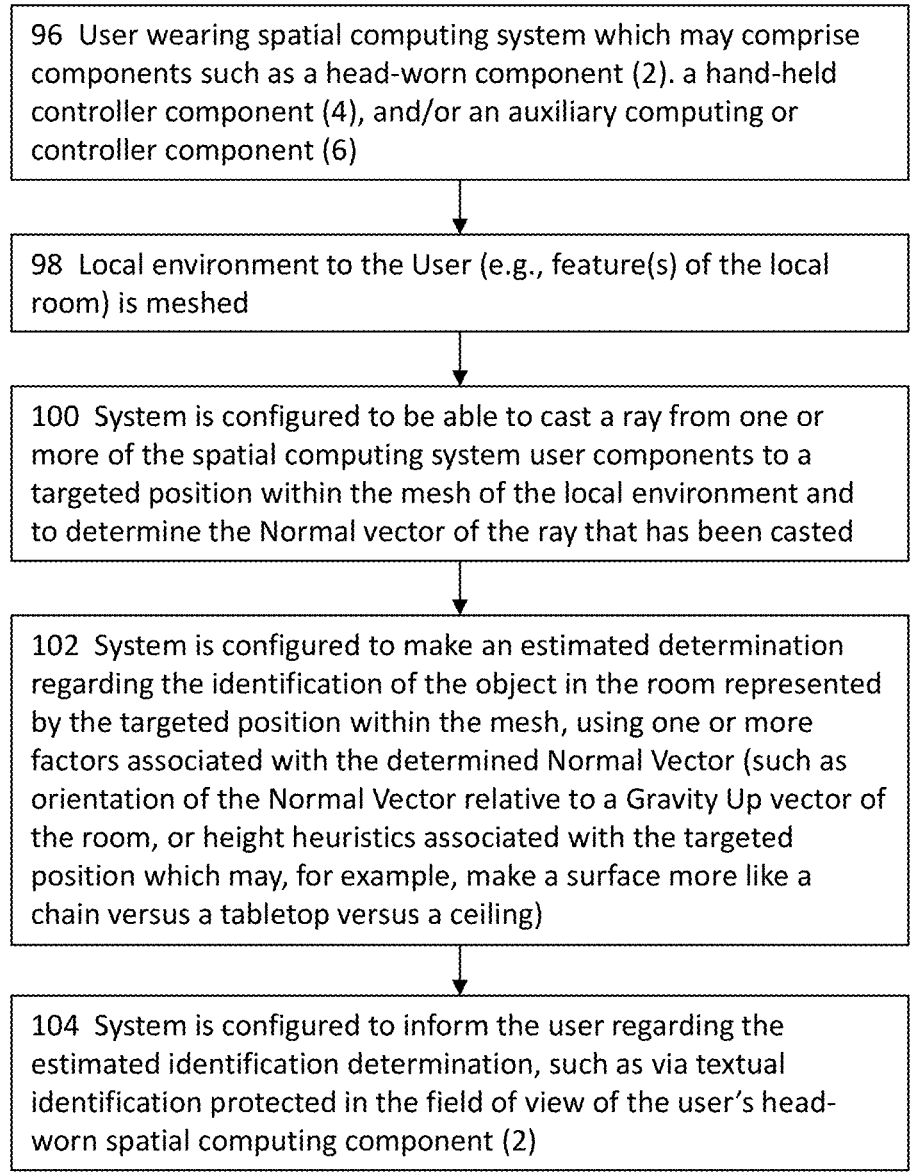
FIG. 3D illustrates an example process for recognizing objects in a 3D space with ray casting in one or more embodiments.

FIG. 3D illustrates an example process for recognizing objects in a 3D space with ray casting in one or more embodiments. In these one or more embodiments illustrated in FIG. 3D, a user may, at 96, be wearing an MR system and may be in a local environment (e.g., an office, a room, etc.), wherein the MR system has created or uploaded a mesh of the features of such room, such as a triangular mesh of the walls of the room, a desk near the user, a floor, a ceiling, and a cabinet structure against one of the walls (98). The MR system may be configured to cast a ray, such as by using a ray casting function within a development environment such as Unity™, from one or more of the components of the spatial computing system, toward a targeted position within the mesh of the local environment of the user, and to determine a normal vector of the ray that has been casted and aimed (100). For example, a user may operate a hand-held controller device (4) to aim a virtual pointer at a portion of the wall around him, or at the surface of his desk, or the floor or ceiling.

The system may be configured to make an estimated determination regarding the identification of the object in the room represented by the targeted position within the mesh by using one or more factors associated with the determined normal vector (102). For example, the system may be configured to also determine or acquire a "gravity-up" vector based upon the mesh information pertaining to the orientation and positioning of the walls of the room; and the MR system may be configured to compare the orientation of the determined normal vector pertaining to the targeted position to the orientation of the gravity-up vector, and/or utilize height and/or geometry heuristics, to make an educated guess that the user is pointing at, for example, a tabletop, a seating surface, a floor, or a ceiling.

In some embodiments, the MR system may be configured to utilize information such as: ceilings and floors often are in parallel planes with the ceiling about 8-10 feet above the floor, and are orthogonal to walls; floors are gravity down relative to ceilings; and/or seating surfaces often are located at about 18-24"; and tabletops often may be located around 36-40" high. In some embodiments, the MR system may be configured to inform the user regarding the estimated identification determination, such as via a textual identification element in the field of view of the user's head-worn spatial computing system (104). Referring back to FIGS. 2J, 2K, 2L, 2M, 2O, and 2P where various user views (56, 58, 68, 70, 80, 82) are illustrated. As shown in FIG. 2J, a user has aimed a virtual cursor (60) at the countertop (62) of a cabinet using his hand (42) and a hand controller (4), and based upon the mesh of the room around the user, the system is identifying the countertop as a "table top" and presenting such estimation via text presentation virtual element (64) to the user.

Referring to FIG. 2K, the user has aimed a virtual cursor (60) at the floor (40) of the room adjacent to a cabinet door (66), such as by using his hand and a hand controller (or alternatively, for example, could be a head-wearable component based pointing configuration such as eye gaze detection and/or an aiming reticle), and based upon the mesh of the room around the user, the system is identifying the floor as a "floor" and presenting such estimation via text presentation virtual element (74) to the user.

Referring to FIG. 2L, the user has aimed a virtual cursor (60) at a door with a patterned shade pulled down (72; adjacent to a wall 76 and floor 40), such as by using his hand and a hand controller (or alternatively, for example, could be a head-wearable component based pointing configuration such as eye gaze detection and/or an aiming reticle), and based upon the mesh of the room around the user, the system is identifying the door as a "wall" and presenting such estimation via text presentation virtual element (76) to the user.

Referring to FIG. 2M, the user has aimed a virtual cursor (60) at a ceiling (80), such as by using his hand and a hand controller (or alternatively, for example, could be a head-wearable component based pointing configuration such as eye gaze detection and/or an aiming reticle), and based upon the mesh of the room around the user, the system is identifying the ceiling as a "ceiling" and presenting such estimation via text presentation virtual element (78) to the user.

As noted above and in FIG. 3D, the system may be configured to make an object identification based upon an estimation; the identification may not always be correct. For example, referring to user views (80, 82) of FIGS. 2O and 2P, respectively, the system has mis-identified an object. In FIG. 2O, with a cursor (60) aimed at one in a series of cabinet doors (90, 92), with a cabinet countertop, the MR system is returning and presenting to the user that the cabinet door is a "wall" (84). Depending upon the specific configuration, this may be a result of the cabinet door being orthogonal to or parallel to another identified wall, orthogonal to a ceiling and/or floor, etc. In FIG. 2P, the MR system has returned and presented (86) an estimation of "seat" (86) when the user is actually pointing the cursor (60) at a table (94) that happens to be at approximately typical seating surface height.

Figure 3E:
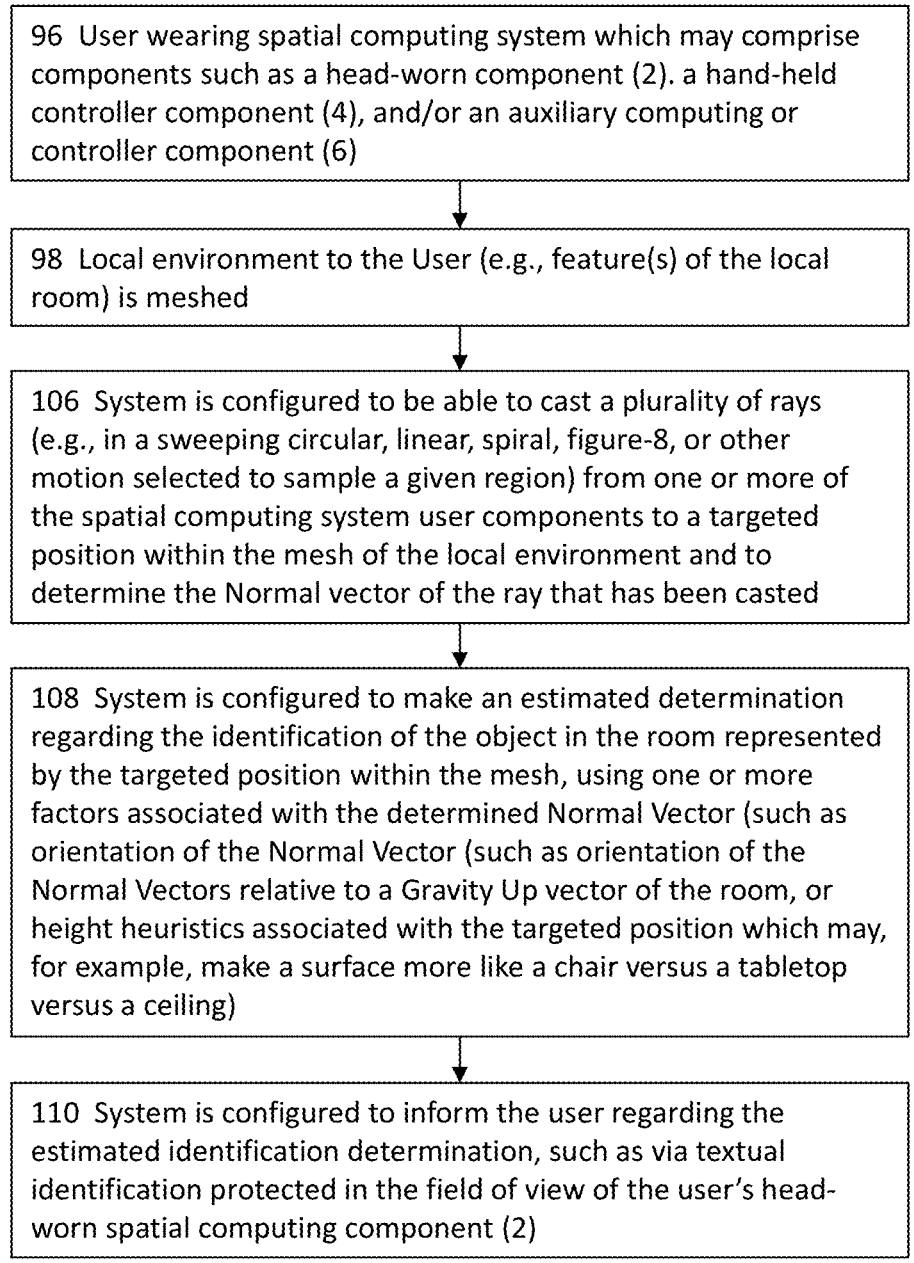
FIG. 3E illustrates an example process for recognizing objects in a 3D space with ray casting in one or more embodiments.

FIG. 3E illustrates an example process for recognizing objects in a 3D space with ray casting in one or more embodiments. In these one or more embodiments, in addition to an MR system (96) being associated with a mesh (98) of the local environment, a plurality of rays (106) may be utilized to gain more information for the estimated determination (108), such as by sweeping, such as by automation or manually, with ray casting around the region adjacent the aimed cursor, so that further information about the region may be gained (such as whether the region seems to be a planar surface or not; the sweeping to gain additional information from the ray casting may be conducted in a predetermined pattern, such as a circular, linear, spiral, or figure-8 pattern). With the enhanced information, the estimation may be returned to the user (110).

Figure 3F:
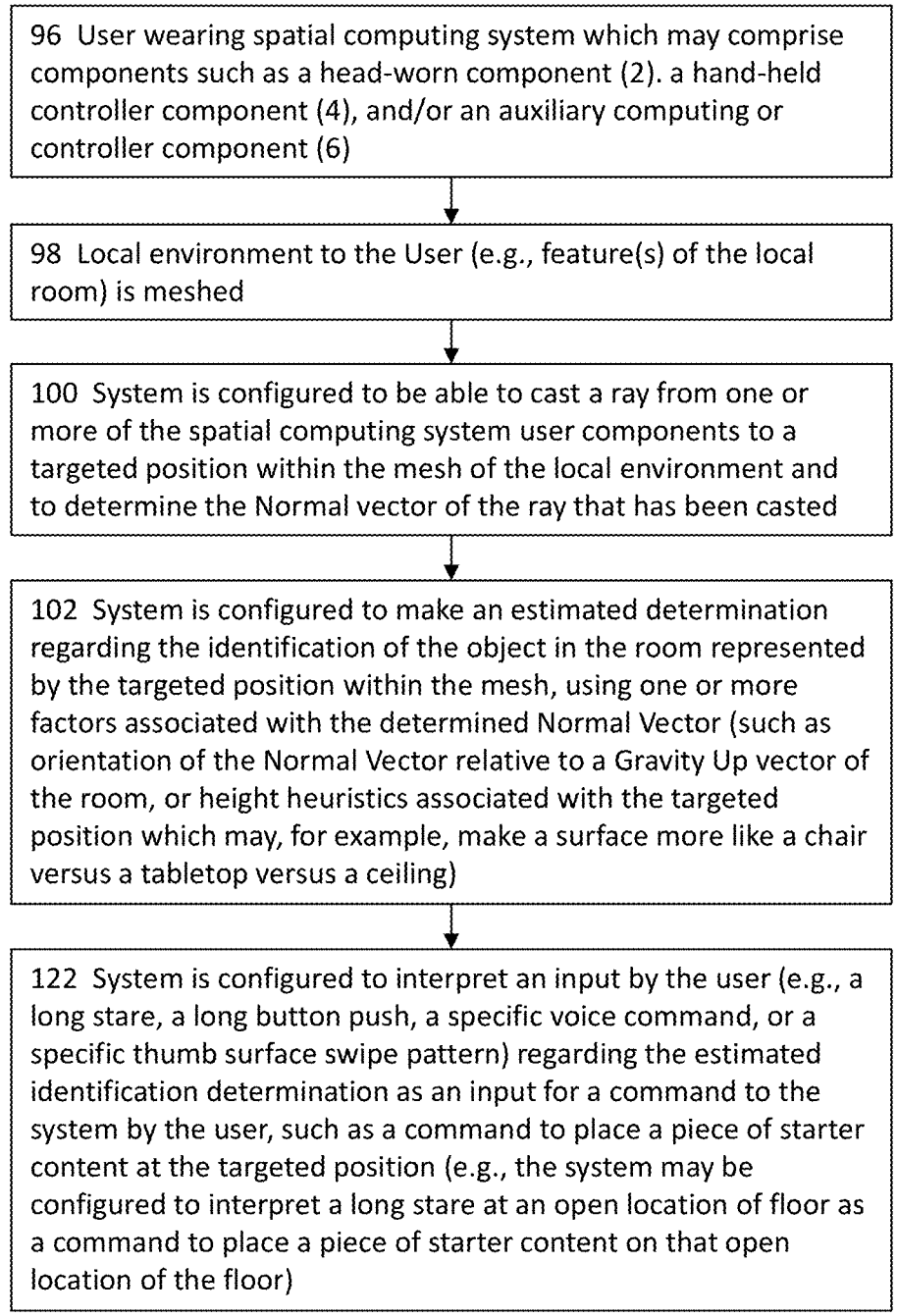
FIG. 3F illustrates an example process for recognizing objects in a 3D space with ray casting in one or more embodiments.

Referring ahead to FIG. 3F, in various embodiments, a configuration similar to that described in reference to FIGS. 3D-3E may be utilized to efficiently issue and receive commands or inputs. For example, referring to FIG. 3F, an embodiment is illustrated wherein in addition to a system (96) being associated with a mesh (98) of the local environment, and being configured to cast one or more rays (100) to assist in estimating identification of various objects, the system may be configured to interpret an input by the user (such as a long stare, a long button push, a specific voice command, or a specific thumb surface swipe pattern, for example) regarding the estimated identification determination (102) regarding the identification of the object in the room represented by the targeted position within the mesh, using one or more factors associated with the determined normal vector (e.g., the orientation of the normal vector relative to a gravity up vector of the room, height heuristics associated with the targeted position which may, for example, pertain to a surface more like a chair versus a tabletop versus a ceiling).

The MR system may be configured to interpret (122) an input by the user (e.g., a long stare, a long button push on a physical or virtual controller, a gesture such as a swipe pattern, etc.) regarding the estimated object identification determination as an input for a command to place a piece of starter content at the targeted position. For example, an MR system may be configured to interpret a long stare at an open location of floor as a command to place a piece of starter content on that open location of the floor.

Referring to FIGS. 2Q, 2R, and 2S, such a configuration is further illustrated in user views (112, 114, 118). Referring to FIG. 2Q, a user is viewing a floor (40), cabinet (88, 92) area with a system configured to interpret a long stare at a portion of a floor as a desire to select such portion of said floor to placing a piece of starter content, as noted in the textual object (116) shown to the user. Referring to FIG. 2R, the user does gaze down to the floor (40), and after staring for a time longer than a predetermined threshold time period, such stare is interpreted as a command to place a starter content object (120), as shown in FIG. 2S.

Referring to FIGS. 2T-1, 2T-2, 2U-1, 2U-2, and 2V-1, in another embodiment, a user or designer may desire to have a certain virtual object placed at a given location within the user's field of view. For example, it may be desirable to a user to have a small digital clock textual readout object presented in the upper left of his or her field of view, generally out of the way of the remainder of the field of view. In another embodiment it may be desirable for a user to have some valuable textual information, such as pertinent operating instructions, presented in the center of the user's field of view.

Such a configuration is shown in FIGS. 2T-1 and 2T-2. In FIG. 2T-1, the field of view of the user includes some cabinetry (88, 90) and a door; the textual instruction virtual object (128) is presented in the center of the user's field of view. Referring to FIG. 2T-2, as the user changes his head orientation down toward the floor (40), the textual instruction virtual object (128) may remain presented in the center of the user's field of view. In other words, the system may be configured to retain the virtual object generally in the center of the user's field of view.

As noted above, the content may be placed anywhere, such as upper left, lower right, center, etc. Further, in other embodiments, the system may be configured to maintain the content's position relative to the objects around the user in the room until a certain predetermined delta in position or orientation of the head is achieved, after which the object may be moved again to the center or other desired catchup position. In another embodiment the system may be configured to "soft lock" to certain aspects of the room. For example, the user may decide to "soft lock" a virtual clock right above his doorway, but when the user rotates his head such that the doorway is no longer in his field of view, to then have the clock jump to a different object then in his field of view and "soft lock" to that next object, and so on.

In other embodiments, the system may be configured to ensure that a desired content display is not overlayed in collision with other objects in the room. For example, a user may decide to have a small digital clock positioned three dimensionally about three feet in front of his straight ahead field of view—but in the event that this collides with a meshed object of the room, such as a computer monitor or wall, to have the small digital clock position just proximal of such other meshed object relative to the user, so that the user still can see the clock without collision/occlusion. For example, referring to FIG. 8C, a user has placed a textual object pertaining to some instructions (128) centrally within the field of view, and about two feet forward relative to the head-wearable component (2) of his or her spatial computing system.

As the user approaches a door or wall (72), the object (128) may be configured to remain approximately two feet away from the user's head-wearable component (2) until the object would start to collide with the mesh that is pertinent to the door (72). In one embodiment, as shown in FIG. 8D, the system may be configured to continue to present the object (128) without collision with the wall, but with incremental decreases in scale as the user continues to get closer and closer to the door (72), almost as though the object is being projected onto the door (72) with a projector that is closing in as the user's head closes in. Referring to FIG. 2V-1, a user view (134) illustrates that presented objects such as textual content (128) may be oriented by the system to align with gravity up, as shown, or in any other orientation, such as in parallel or orthogonal to a plane of a tabletop (34).

Figure 3G:
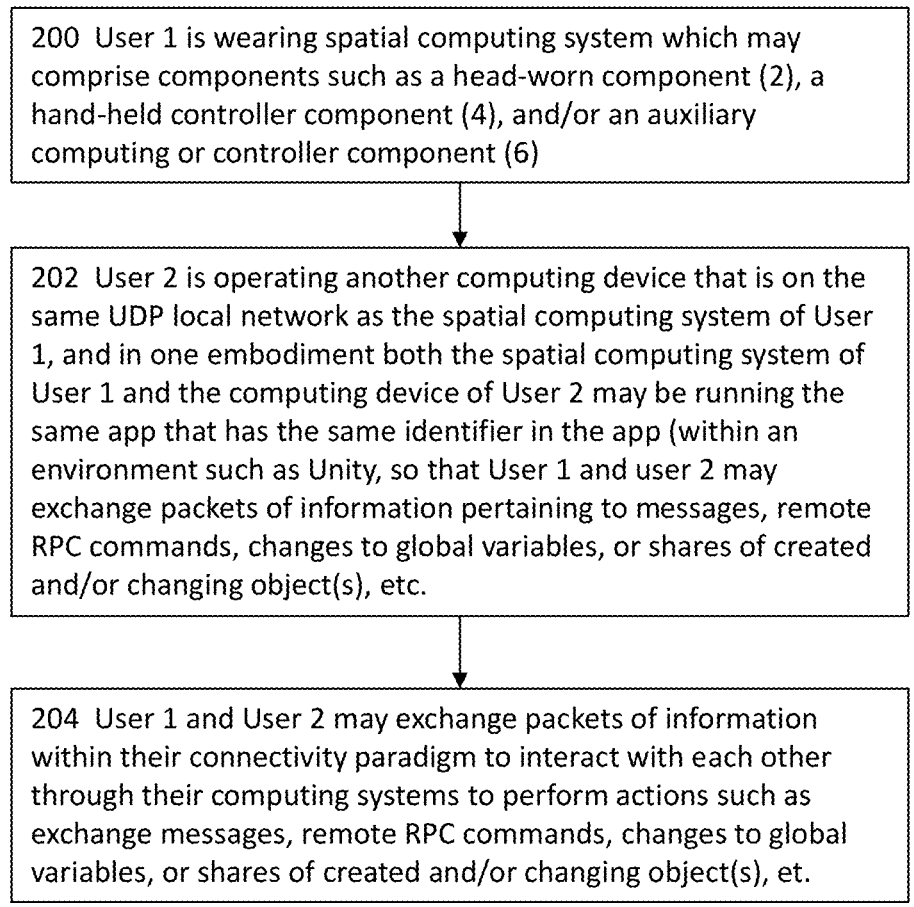
FIG. 3G illustrates an example process for multi-user collaboration in a MR environment in one or more embodiments.

FIG. 3G illustrates an example process for multi-user collaboration in a MR environment in one or more embodiments. In these one or more embodiments illustrated in FIG. 3G, a plurality of users may work together with connected systems (e.g., MR systems). As shown in FIG. 3G, with a first user wearing a spatial computing system which may comprise components such as a head-worn component (2), a hand-held controller component (4), and/or an auxiliary computing or controller component (6) (200), and a second user operating another computing device, such as an MR system, a laptop computer, or smartphone, that is on the same UDP (user diagram protocol) local network as the spatial computing system of the first user, the two users may collaborate.

In some embodiments, both the spatial computing system of the first user and the computing device of the second user may execute the same application that has the same identifier in the application (within an environment such as Unity™), so that the first user and second user may exchange packets of information pertaining to, for example, messages, RPC (remote procedure call) commands, changes to global variables, and/or shares of created and/or changing objects, etc. (202). With such a configuration, the two users may exchange packets of information within their connectivity paradigm to interact with each other through their computing systems to do things such as exchange messages, remote RPC commands, changes to global variables, shares of created and/or changing objects, and the like (204).

FIG. 3H illustrates an example process for multi-user collaboration in a MR environment in one or more embodiments. In these one or more embodiments, collaboration among multiple users of spatial computing systems (e.g., an MR system, a laptop computer, a mobile device, etc. having specifically installed software programs) facilitated by spatial alignment relative to a persistent coordinate frame ("PCF"), which may include a coordinate frame that is persistent relative to the physical world around a user and may be generally configured not to drift or move across multiple user sessions.

Systems such as those available from Magic Leap, Inc. under the tradename "Magic Leap One"™ may be configured such that whenever a Magic Leap One spatial computing system recognizes that the system is in a space it has seen before, one or more PCFs placed in the space may be restored. In these embodiments, content placed relative to a PCF may be persisted across multiple reboots. Such a spatial computing platform may be configured to automatically synchronize PCFs amongst users who are in the same space so multiple users may see and collaborate on the same content that is placed at the same physical location by one user.

In these embodiments, referring back to FIG. 3H, two users may both be wearing spatial computing systems which may comprise components such as a head-worn component (2), a hand-held controller component (4), and/or an auxiliary computing or controller component (6) (206). The local environment for each of the users (such as features of their local room, which may or may not be the same room) may be meshed, and their spatial computing systems are capable of utilizing Persistent Coordinate Frame ("PCF") information (208).

The spatial computing systems of the two users preferably are both on the same UDP local network and are able to work with one or more established PCFs. In one embodiment, both spatial computing systems of the two users may be running the same application that has the same identifier in the app (within an environment such as Unity™ so that the two users may exchange, for example, packets of information pertaining to messages, remote RPC commands, changes to global variables, actions, and/or shares of created and/or changing objects, etc. The spatial computing systems may maintain known relative positions and orientations of the various components of one user's spatial computing system relative to those of the other user (and vice versa) through the one or more PCFs (210).

In some embodiments, these two users may exchange, for example, network packets of information within their connectivity paradigm to interact with each other through their computing systems to do things such as exchange messages, remote RPC commands, changes to global variables, and/or shares of created and/or changing objects, etc., all of which may be done relative to commonly utilized PCF information. The users may thus predictably experience the locations and orientations of the components of the systems of each other in a shared experience, such as a shared and collaboratively created 3-dimensional spatial drawing (i.e., as though they are sharing and visualizing a portion of the same 3-dimensional space, whether or not they are actually in the same physical location) (212).

Figure 4A:
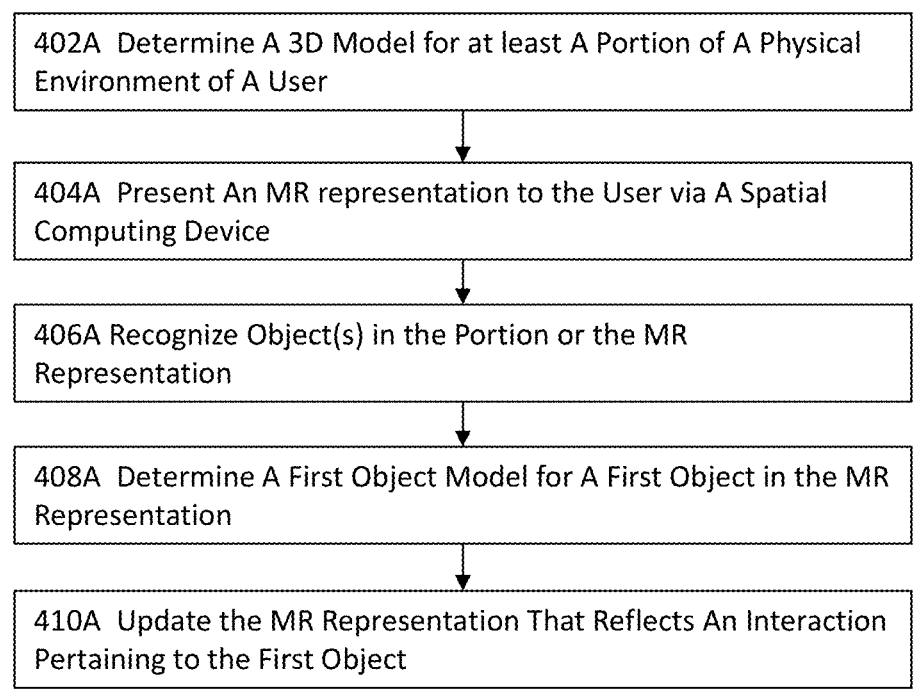
FIG. 4A illustrates a high-level flow diagram for a process for a spatial computing system or device in one or more embodiments.

FIG. 4A illustrates a high-level flow diagram for a process for a spatial computing system or device in one or more embodiments. In these one or more embodiments, a three-dimensional (3D) model may be determined at 402A for at least a portion of a physical environment in which a user of a spatial computing system or device may be located. In some embodiments, the 3D model is sharable among multiple users of spatial computing systems so that different users may construct their respective 3D models for their respective physical environments, and these respective 3D models may be integrated together to form a larger 3D model representing, for example, the union of the respective environments and sharable among a plurality of users.

In some of these embodiments, the larger 3D model preserves the geometric and/or geographical accuracies. For example, a first user is located in a first space, and a second user is located in a second space that is, for example, 60 feet away to the right of the first space. Both users may use their spatial computing systems (e.g., MR devices) to respectively construct the first 3D model representing the first space and the second 3D model representing the second space. These two 3D models may be integrated together while preserving the relative or absolute locations to a configurable degree of accuracy (e.g., within 2 inches, 3 feet, etc.) More details about 402A will be described below with reference to FIG. 4B.

At 404A, an MR representation may be presented to the user via the spatial computing system. For example, the processor(s), graphics processing processor(s), etc. may invoke pertinent program code to render virtual contents and project, via one or more projectors or projection fibers in the spatial computing system, the virtual contents to at least one eye of the user so that the virtual contents appear to be overlaid and positioned at the position(s) determined by the spatial computing system (e.g., MR device (114A) illustrated in FIG. 1A) relative to the user to form the MR representation as if the virtual contents were physically present at the position(s).

The processor(s) may further function in tandem with, for example, image capturing sensor(s), graphics processing unit(s), etc. in the spatial computing system to further execute program code to recognize one or more objects (e.g., a physical object as virtual objects are placed by the spatial computing system) in the MR representation at 406A. For example, an image capturing sensor may capture an image of a portion of the physical environment, and the processor, etc. may process the captured image using one or more image recognizers described above to recognize one or more objects in the image and stores and associates the information pertaining to the one or more recognized objects with the one or more objects.

In some embodiments, the spatial computing system may further distinguish one object from another object in the captured image. For example, the physical environment may include a first robot on a table and painting on a wall where the painting illustrates a second robot. The spatial computing system may recognize both objects as robots. The spatial computing system may further process the image with, for example, depth information associated with the captured image to determine that the wall is located at a certain angle relative to the user, and that the painting or the first robot is substantially parallel to the wall within some threshold angle difference and some threshold distance difference (e.g., a threshold of the difference between the distance of the wall relative to the user and the distance of the painting relative to the user below which the painting is determined to be on the wall). The spatial computing system may thus determine that the first robot has no or negligible depth and is thus not a 3D robot.

In some embodiments, the spatial computing system may optionally replace a recognized object with a substantially similar, identical, or different virtual object by, for example, overlaying a virtual object over the recognized object to completely occlude the recognized object. For example, the spatial computing system may recognize an aquarium or a fish tank in the physical environment and overlay a virtual aquarium over the recognized aquarium so that the user and/or one or more virtual objects may interact with the aquarium or its contents (e.g., water, creatures, ornaments, pump, filter, etc. in the virtual aquarium) in a more realistic manner (e.g., by modeling the virtual aquarium with physics-based behaviors).

A first object model for a first object in the MR representation may be determined at 408A. The first object model may be determined anew in some embodiments where the spatial computing system is offline and disconnected from a remote computing system (e.g., a server 104A in FIG. 1A), or no suitable object models exist in some embodiments. In some other embodiments, the first object model may be identified from a local (e.g., local memory of the spatial computing device) or remote repository (e.g., 122A, or 120A in FIG. 1A) without reconstructing the first object model for the first object anew.

In some embodiments, an object model may be constructed based on governing physics principles such as friction modeling, spring-force modeling, modeling with drag, dampening effects, etc. with one or more physical properties (e.g., elastic modulus, plastic modulus, bulk modulus, shear modulus, weight, and/or density, etc.) It shall be noted that all physics disciplines may be applied to an object model, and that the more physics disciplines applied to the object model, the object model behaves more realistically although at the expense of increased utilization of compute and/or storage resources.

The MR representation may be updated at 410A into an updated MR representation to reflect an interaction involving or pertaining to the first object model. An interaction may comprise an interaction between the user of the spatial computing system and the first object, an interaction between the first object and a second object, etc. For example, the user may interact with the first object by issuing a command (e.g., by staring at the first object for a threshold period of time, by voice command(s), by gesture(s), by using a physical or virtual controller, etc.) to instruct the spatial computing system to lock on the first object.

The spatial computing system may graphically emphasize the first object (e.g., by using a graphic indicator such as a diamond, a square, etc., by altering the representation of the first object to glow, etc.) by using at least the first object model for the first object. The spatial computing system may place the first object either at a substantially fixed location relative to the user (e.g., at the upper right-hand corner of the field of view provided to the user by the spatial computing system) or may allow the first object to move freely, according to one or more predetermined patterns, or a combination of free motion and one or more predetermined movement patterns. In some embodiments, such an interaction between a user and an object may be considered as imposing a soft lock on the object.

For example, a user may place a virtual clock, a virtual monitor (or television), a navigation guide, etc. within the user's field of view by using a placement or move command (e.g., an eye movement, a voice command, positioning of a cursor, etc.) with an approximate location for placement based at least in part upon one or more factors (e.g., the type of the object, etc.) In some embodiments, the spatial computing system may automatically place the object at a position that is approximately fixed relative to the user's view, regardless of the movement of the user or a part thereof (e.g., a user turning the user's head). In some embodiments, the object may be placed at a location that is relatively fixed to a fixed location or reference point, and thus the object may move outside the user's field of view when the user moves or turns the user's head.

In some embodiments where an object that is locked on and graphically emphasized moves beyond the visual range (e.g., the object moved over a threshold distance away from the user, the object moved beyond the field of view of the user, etc.), a different graphical indication may be employed to indicate the approximate location and/or approximate bearing or orientation relative to the user. For example, an arrowhead, a circle, or other suitable types of indicators may be dynamically displayed in the MR representation within the field of view of the user to indicate the approximate location and/or approximate orientation of the object relative to the user. This different graphical indication may also dynamically change in size, shape, and/or direction as the relative location between the object and the user changes.

The interaction may also involve the first object and a second object. For example, the first object may be a virtual object represented by the first object model, and the second object may be a physical object (or another virtual object). In an example where the first object is a virtual balloon filled with some air, a user may interact with the virtual balloon by, for example, moving the virtual balloon around where the virtual balloon may be represented by a physics-based model that mimics the motion of a balloon. The user may also squeeze the virtual balloon where the physics-based model of the virtual balloon deforms in a more realistic manner as the user would expect by squeezing a real balloon.

Once the interaction is predicted (e.g., a user's hand is predicted to contact the virtual balloon) or determined (e.g., actual contact or "collision" is detected between the virtual balloon and the user's hand), the spatial computing system may update the MR representation statically, dynamically, or in real-time, depending how the spatial computing system is configured by the user.

Figure 4B:
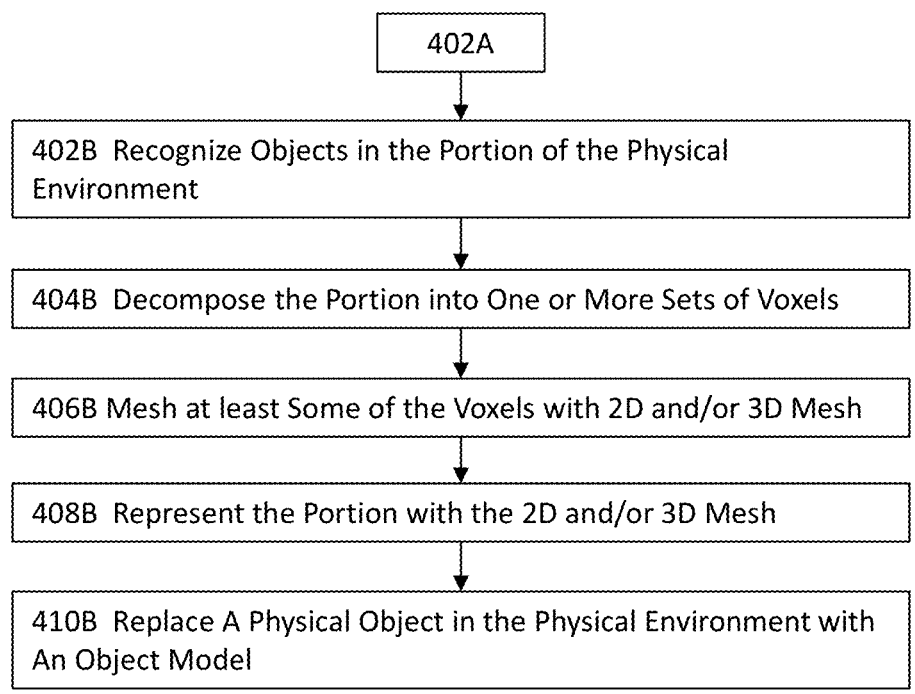
FIG. 4B illustrates more details about the high-level flow diagram in FIG. 4A for a process for a spatial computing system or device in one or more embodiments.

FIG. 4B illustrates more details about the high-level flow diagram in FIG. 4A for a process for a spatial computing system or device in one or more embodiments. More specifically, FIG. 4B illustrates more details about determining a 3D model for at least a portion of the physical environment of the user at 402A. In these one or more embodiments, the spatial computing system may invoke required or desired hardware and software components to recognize one or more objects in the portion of the physical environment. Recognizing an object may determine one or more characteristics of the object such as, a general type of the object (e.g., a chair), a specific type of the object (e.g., an Aeron chair), one or more dimensions of the object, an estimated material of the object, one or more properties of the object (e.g., physical properties, display properties, electrical properties, etc.), one or more sub-components of the object, and/or one or more dynamic attributes of the object (e.g., whether a part of the object opens to a certain direction, whether the object moves due to its nature or due to the presence of wheels or casters, etc.)

The portion of the physical environment may be decomposed at 404B into one or more sets of voxels. In some embodiments, a voxel comprises a value or a set of values on a regular grid in three-dimensional space, and a position of the voxel may be specified or inferred based at least in part upon its position relative to another voxel(s). In some embodiments, a voxel may or may not comprise the coordinates of their vertices when used to represent an object.

At least one of the set of voxels may be discretized or meshed with a set of two-dimensional (2D) and/or three-dimensional (3D) elements. For example, a voxel may be discretized to include only 2D elements (e.g., triangles, squares, rectangles, or polygons) for its exterior surfaces in some embodiments. As another example, a voxel may be discretized to include only 3D elements (e.g., rectangular prisms, tetrahedrons, etc.) Yet as another example, a voxel may be discretized to include one or more 3D elements for one or more portions of an object and one or more 2D elements for the remaining portion of the object.

The portion of the physical environment may be represented with the set of 2D and/or 3D elements at 408B. In these embodiments, although the portion of the environment may be seen directly through the transparent or translucent display of the spatial computing system, these techniques described herein discretize at least a portion of the physical environment so that the user of the spatial computing system or a virtual object displayed therewith may interact with the portion of the physical environment, if required or desired by an mixed-reality representation of an interaction between an object and the portion of the physical environment.

In some embodiments, a physical object or a portion thereof may be replaced with an object model at 410B. In these embodiments, replacing a physical object does not mean actually removing the physical object away from its location. Rather, replacing a physical object with an object model may include overlaying the object model on top of the physical object from the user's current perspective. As the user's perspective may change dynamically due to the user's movement or turning the user's head, the spatial computing system may automatically update the presentation of the overlaid object model in the mixed-reality representation to the user.

Figure 4C:
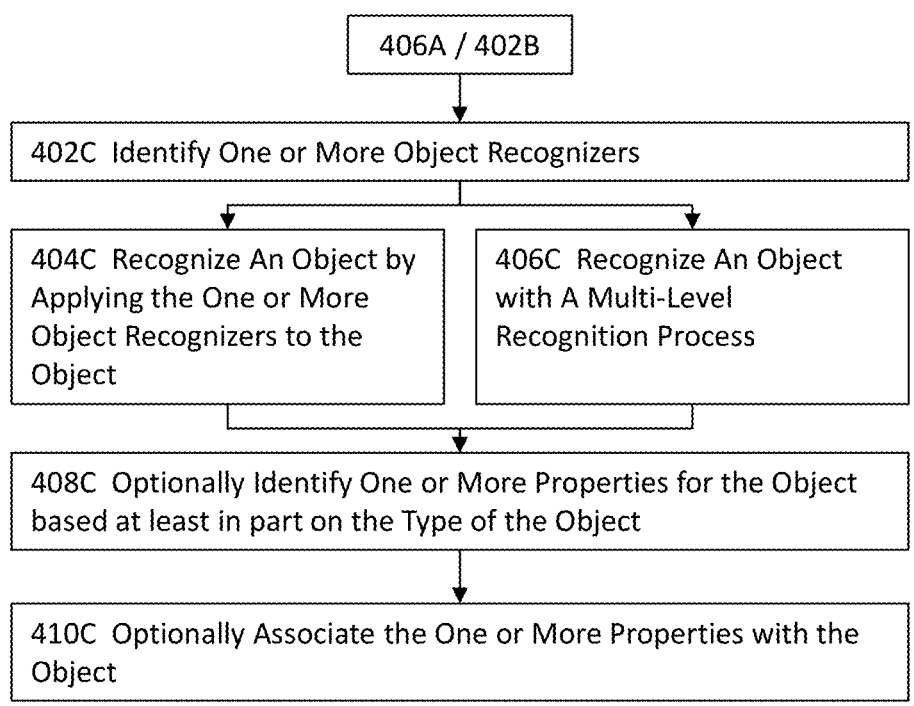
FIG. 4C illustrates more details about the high-level flow diagram in FIG. 4A for a process for a spatial computing system or device in one or more embodiments.

FIG. 4C illustrates more details about the high-level flow diagram in FIG. 4A for a process for a spatial computing system or device in one or more embodiments. More specifically, FIG. 4C illustrates more details about recognizing one or more objects with one or more object recognizers at 406A of FIG. 4A or 402B of FIG. 4B. In these one or more embodiments, one or more object recognizers may be identified at 402C. For example, one or more object recognizers each recognizing a specific object or a specific type of objects may be identified from a repository storing therein a plurality of object recognizers. In some embodiments, an object recognizer may comprise a set of 2D or 3D point representation where each point corresponds to a feature of an object or a type of object for which the object recognizer is devised. In some other embodiments, an object recognizer may include a set of one or more 2D or 3D images that may be manipulated (e.g., enlarged, shrunk, rotated, mirrored, etc.)

Object recognizers may also be classified or categorized into a plurality of classes or categories such as, furniture, office supplies, electronics, plants, animals, decorations, building structures, etc. Classification or categorization of object recognizers may facilitate object recognition by identifying or determining one or more pertinent classes of object recognizers for a physical environment and subsequently applying these one or more pertinent classes so that unlikely object recognizers need not be performed for an object in the physical environment to conserve compute resources.

In some embodiments, object recognizers may also include the general object recognizer type and the specific object recognizer type. A general object recognizer generally recognizes that an object is of a certain type (e.g., cars, cups, monitors, etc.), whereas a specific object recognizer recognizes an object with a much higher granularity of accuracy by examining (e.g., comparing) more data between the object being recognized and the data the object recognizer is aware of. On the other hand, a specific object recognizer examines more data (e.g., data pertaining to more detailed features of an object) for an object to determine whether the object matches the features of a specific object. As a result, general object recognizers may be applied to the same object in a much more efficient way than specific object recognizer. For example, a general object recognizer may recognize an object as a chair yet provides not much more information beyond such recognition. A specific object recognizer may recognize the same object as an Aeron® chair, a sofa, etc. by consuming more compute resources.

Object recognition with object recognizers may be performed in many different ways. For example, an object may be recognized at 404C at least by applying the one or more object recognizers to the object in series or in parallel until one or more matches are found in some embodiments. For example, one or more general object recognizers may be first applied to an object to determine the general category of the object being recognized; and one or more specific object recognizers corresponding to each of the one or more general object recognizers may be identified and applied to determine more specifics of the object in some embodiments.

In some other embodiments, these one or more object recognizers may be performed with a multi-level or hierarchical recognition process at 406C. For example, one or more first object recognizers (e.g., office recognizer, part recognizer, beach recognizer, etc.) may be first applied to one or more objects to approximately determine whether the environment or an object therein corresponds to a specific environment; and one or more object recognizers corresponding to the first object recognizer may be applied to an object in the environment to recognize the object.

Once the object is recognized, one or more properties may be identified at 408C based at least in part upon the type of the object or the recognized object. For example, the elastic modulus, plastic modulus, bulk modulus, shear modulus, weight, and/or density, etc. may be optionally identified at 408C for the object recognized at 404C or 406C. These one or more properties identified at 408C may be optionally associated with the object at 410C. For example, these one or more properties may be linked to the object or an object model representing the object in some embodiments or embedded in the object model representing the object in some other embodiments.

Figure 4D:
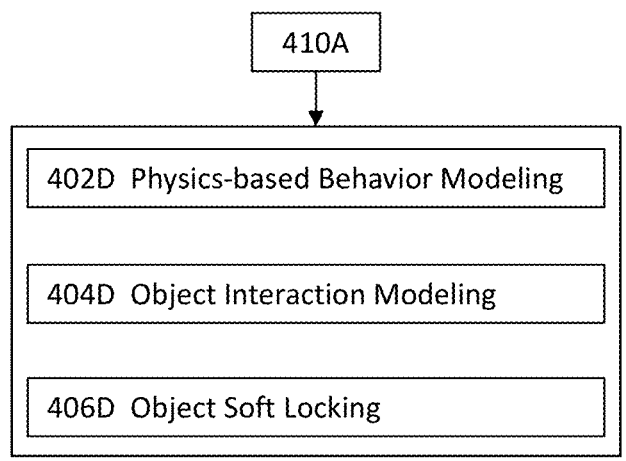
FIG. 4D illustrates more details about the high-level flow diagram in FIG. 4A for a process for a spatial computing system or device in one or more embodiments.

FIG. 4D illustrates more details about the high-level flow diagram in FIG. 4A for a process for a spatial computing system or device in one or more embodiments. More specifically, FIG. 4D illustrates some example types of interactions that may be modeled with the techniques described herein. In some embodiments, a spatial computing system may perform physics-based behavior modeling 402D by introducing physics disciplines into the behaviors of an object being rendered and presented in a mixed-reality presentation.

For example, an object model may be constructed with physical properties such as density, modulus or moduli, friction coefficient, etc. so that the object model may be perceived to deform or move in a more realistic way. As another example, an object model may be constructed with a force-based modeling (e.g., spring force, dampening effects, etc.) to mimic some real-world motions.

In some embodiments, a spatial computing system may perform object interaction modeling 404D that models an interaction involving an object. As described above, an interaction may include an object-to-object interaction or a user-to-object interaction. For example, a first object may collide with a second object. As another example, a user may act on an object to induce a change in the state (e.g., a shape of the object, a motion state of the object, a location of the object, or a direction or orientation of the object, etc.) of the object.

In some embodiments, a spatial computing system may predict and/or detect a collision between two objects (e.g., between two virtual objects, between a virtual object and a physical object, between two physical objects). As a virtual object is rendered and placed in a mixed-reality representation, the spatial computing system is aware of the physical and motion characteristics of the virtual object. Furthermore, a physical object may be detected, recognized, and tracked by the spatial computing system. As a result, the spatial computing system may predict collision between two objects and/or detect actual collision between two objects in a mixed-reality representation.

To predict or detect a collision, a spatial computing system may, for example, first prune one or more objects in a mixed-reality representation from further processing. For example, stationary objects that are not in or near (e.g., within a threshold angle or distance) the direction or pattern of motion of a moving object may be pruned and need not be further considered in detection or prediction of collision with a moving object. For a moving object that may collide with a first object, a bounding box may be determined for each of these two objects. In some embodiments, a spatial computing system may first determine partition a space into a plurality of cells and filter out objects that are unlikely to be in the same cell from further processing.

For example, a three-dimension shape (e.g., sphere, cube, rectangular prism, etc.) may be determined as a bounding box that fully encloses an object, and the techniques determined herein determine whether two bounding boxes intersect. Each bounding box may be modeled with coordinates for vertices or simply as three intervals along three axes of a coordinate system. The bounding boxes of remaining objects to be processed may be further pruned by filtering out bounding boxes that are not likely to intersect in one or more dimensions.

The process may then determine whether two bounding boxes actually collide or are to collide at a certain time point be determining whether the three pairs of intervals (or the corresponding coordinates of the two bounding boxes) intersect. If the three pairs of intervals (e.g., one interval for each bounding box along each axis) intersect at or around a time point, the process may determine that a collision occurred or is to occur.

These techniques may also detect or predict collision in other different, suitable ways. For example, some embodiments may determine whether two objects may be completely separated by a plane so that one object is located on one side of the plane, and the other object is located on the other side of the plane. More specifically, these embodiments may first track the planes of each object (e.g., six or more planes each having at least three vertices for an object being tracked) and dynamically determines whether the two sets of planes may be separated by at least one plane.

In some embodiments, the system may be configured to "soft lock" (406D) to an object (e.g., a real object or a virtual object). For example, the user may decide to "soft lock" a virtual clock right above his doorway, but when the user rotates his head such that the doorway is no longer in his field of view, to then have the clock jump to a different object then in his field of view and "soft lock" to that next object, and so on. In these embodiments, the system may be configured to maintain the content's position relative to the objects around the user in the room until a certain predetermined delta in position or orientation of the head is achieved, after which the object may be moved again to the center or other desired catchup position. In another embodiment the system may be configured to "soft lock" to certain aspects of the room. For example, the user may decide to "soft lock" a virtual clock right above his doorway, but when the user rotates his head such that the doorway is no longer in his field of view, to then have the clock jump to a different object then in his field of view and "soft lock" to that next object, and so on.

In other embodiments, the system may be configured to ensure that a desired content display is not overlayed in collision with other objects in the room. For example, a user may decide to have a small digital clock positioned three dimensionally about three feet in front of his straight ahead field of view—but in the event that this collides with a meshed object of the room, such as a computer monitor or wall, to have the small digital clock position just proximal of such other meshed object relative to the user, so that the user still can see the clock without collision/occlusion. For example, referring to FIG. 8C, a user has placed a textual object pertaining to some instructions (128) centrally within the field of view, and about two feet forward relative to the head-wearable component (2) of his or her spatial computing system.

System Architecture Overview

Figure 5:
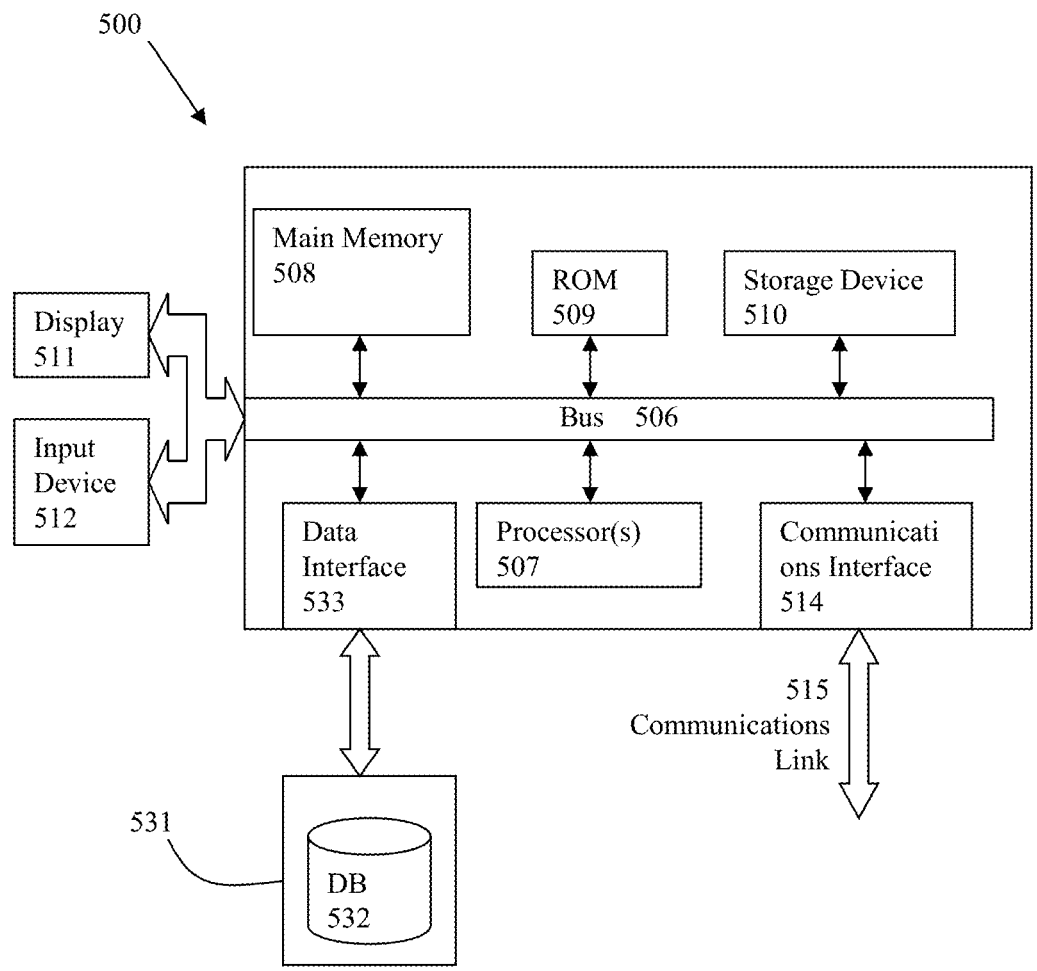

FIG. 5 illustrates a computerized system on which one or more processes for a spatial computing system (e.g., a mixed reality system or device) may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of determination, identification, synchronization, calculation of graphical coordinates, rendering, transforming, translating, rotating, generating software objects, placement, assignments, association, etc. may be performed by one or more processors, one or more processor cores, or combination thereof.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer-implemented method, comprising:
presenting, by a spatial computing system, an extended reality presentation to a user located in a physical environment, wherein
the extended reality presentation presented to the user comprises one or more virtual objects generated by the spatial computing system and transmitted to one or both eyes of the user and the physical environment, and
the physical environment includes a first physical object and a second physical object and is perceived by the user wearing at least a display subsystem of the spatial computing system via light reflected from the physical environment into the one or both eyes of the user;
rendering, by the spatial computing system, the extended-reality representation for an object interaction between the first physical object and a first virtual object of the one or more virtual objects or between the first physical object and the user;
determining a physics-based effect on the first physical object caused by the object interaction by using at least a stereoscopic model for the first physical object based at least in part upon the object interaction between the first physical object and the first virtual object or the user, wherein the spatial computing system renders the extended-reality representation at least by overlaying the stereoscopic model over the first physical object relative to a perspective of the user; and
updating the extended reality presentation into an undated extended reality presentation based at least in part upon the physics-based effect.

2. The computer-implemented method of claim 1, wherein rendering the extended-reality representation for the object interaction comprises:
predicting the object interaction between the first physical object and the first virtual object or between the first physical object and the user, wherein the updated extended reality presentation comprises the second physical object in the physical environment, the one or more virtual objects, and the physics-based effect; and
determining the stereoscopic model for the first physical object, wherein the user perceives the stereoscopic model as a three-dimensional (3D) representation of the first physical object, wherein the object interaction comprises a user-to-object interaction between the user and the first physical object or an object-to-object interaction between the first virtual object of the one or more virtual objects and the first physical object.

3. The computer-implemented method of claim 2, wherein rendering the extended-reality representation for the object interaction further comprises:
occluding the physical object in the extended reality presentation with the stereoscopic model of the physical object based at least in part upon a persistent coordinate frame for at least the physical environment so that the physical object is occluded by the stereoscopic model, and the persistent coordinate frame for at least the physical environment is persistent relative to the physical environment surrounding the user; and
presenting, in the extended reality presentation, the stereoscopic model in place of the first physical object.

4. The computer-implemented method of claim 3, wherein presenting, in the extended reality presentation, the stereoscopic model in place of the first physical object comprises:
completely or partially occluding at least the first physical object in the physical environment at least by transmitting a first light beam representing a virtual content to both eyes of the user; and
transmitting a second light beam representing the stereoscopic model to both eyes of the user so that the stereoscopic model appears to the user to be overlaid on top of the virtual content, wherein the persistent coordinate frame is configurable not to drift or move across multiple extended-reality sessions involving at least the physical environment by the user or one or more other users.

5. The computer-implemented method of claim 2, wherein determining the stereoscopic model for the first physical object comprises:
recognizing the first physical object as a recognized object at least by performing a nested object recognition at multiple levels using respective object recognizers;
determining the stereoscopic model for the first physical object based at least in part upon geometry, at least one physical property, and at least one kinematic or dynamic characteristic of the first physical object; and
mimicking a real-world effect on the first physical object as the physics-based effect in the updated extended reality presentation based at least in part upon the recognized object using the stereoscopic model.

6. The computer-implemented method of claim 1, wherein the one or more virtual objects and the physics-based effect are generated by the spatial computing system and transmitted to the one or the both eyes of the user, and the physical environment comprising the second physical object is perceived by the user through the light reflected from the physical environment and perceived by the user.

7. The computer-implemented method of claim 1, wherein updating the extended reality presentation into the undated extended reality presentation comprises:
identifying the object interaction between the first physical object and the first virtual object;
determining a separate stereoscopic model for the first virtual object based at least in part upon the object interaction between the first physical object and the first virtual object; and
presenting, in the extended reality presentation, first virtual object as the stereoscopic model.

8. The computer-implemented method of claim 7, wherein updating the extended reality presentation into the undated extended reality presentation comprises:
determining a separate physics-based effect on the first virtual object caused by the object interaction by using at least the separate stereoscopic model for the first virtual object; and
updating the extended reality presentation into the undated extended reality presentation based at least in part upon the physics-based effect on the first physical object and the separate physics-based effect on the first virtual object, wherein the spatial computing system comprises one or more projection fibers or protectors for rendering the extended reality presentation and the undated extended reality presentation to the user.

9. The computer-implemented method of claim 1, wherein the object interaction is captured by one or more sensors as an input to a to the spatial computing system of a user-wearable extended-reality device, and the physics-based effect includes a deformation of the first physical object, a movement of the first physical object, a motion of the first physical object, or a static, a dynamic, a real-time change in size, shape, direction, orientation, or location of the first physical object, or a physical-based, predicted behavior of the first physical object as perceived by the user from the updated extended-reality representation.

10. The computer-implemented method of claim 1, wherein the object interaction between the first physical object and the first virtual object or between the first physical object and the user is initiated by a command, and the command comprises the user staring at the first physical object or the first virtual object for a threshold time period, a voice command, a gesture from the user, an action by the user captured by a sensor, or a user's use of a physical or virtual controller.

11. A system, comprising:
a spatial computing system comprising a microprocessor and memory, the memory storing thereupon a sequence of instructions which, when executed by the microprocessor, causes the spatial computing system to perform a set of acts, the set of acts comprising:
presenting, by a spatial computing system, an extended reality presentation to a user located in a physical environment, wherein
the extended reality presentation presented to the user comprises one or more virtual objects generated by the spatial computing system and transmitted to one or both eyes of the user and the physical environment, and
the physical environment includes a first physical object and a second physical object and is perceived by the user wearing at least a display subsystem of the spatial computing system via light reflected from the physical environment into the one or both eyes of the user;

rendering, by the spatial computing system, the extended-reality representation for an object interaction between the first physical object and a first virtual object of the one or more virtual objects or between the first physical object and the user;

determining a physics-based effect on the first physical object by the object interaction by using at least a stereoscopic model for the first physical object based at least in part upon the object interaction between the first physical object and the first virtual object or the user, wherein the spatial computing system renders the extended-reality representation at least by overlaying the stereoscopic model over the first physical object relative to a perspective of the user; and updating the extended reality presentation into an undated extended reality presentation based at least in part upon the physics-based effect.

12. The system of claim 11, wherein the sequence of instructions for rendering the extended-reality representation for the object interaction further comprises instructions, which when executed by the microprocessor, further causes the spatial computing system to perform the set of acts that further comprises:

predicting the object interaction between the first physical object and the first virtual object or between the first physical object and the user, wherein the updated extended reality presentation comprises the second physical object in the physical environment, the one or more virtual objects, and the physics-based effect;

determining the stereoscopic model for the first physical object, wherein the user perceives the stereoscopic model as a three-dimensional (3D) representation of the first physical object, wherein the object interaction comprises a user-to-object interaction between the user and the first physical object or an object-to-object interaction between the first virtual object of the one or more virtual objects and the first physical object;

occluding the physical object in the extended reality presentation with the stereoscopic model of the physical object based at least in part upon a persistent coordinate frame for at least the physical environment so that the physical object is occluded by the stereoscopic model, and the persistent coordinate frame for at least the physical environment is persistent relative to the physical environment surrounding the user; and presenting, in the extended reality presentation, the stereoscopic model in place of the first physical object.

13. The system of claim 12, wherein the sequence of instructions for presenting, in the extended reality presentation, the stereoscopic model in place of the first physical object further comprises instructions, which when executed by the microprocessor, further causes the spatial computing system to perform the set of acts that further comprises:

completely or partially occluding at least the first physical object in the physical environment at least by transmitting a first light beam representing a virtual content to both eyes of the user; and transmitting a second light beam representing the stereoscopic model to both eyes of the user so that the stereoscopic model appears to the user to be overlaid on top of the virtual content.

14. The system of claim 12, wherein the sequence of instructions for determining the stereoscopic model for the first physical object further comprises instructions, which when executed by the microprocessor, further causes the spatial computing system to perform the set of acts that further comprises:

recognizing the first physical object as a recognized object at least by performing a nested object recognition at multiple levels using respective object recognizers;

determining the stereoscopic model for the first physical object based at least in part upon geometry, at least one physical property, and at least one kinematic or dynamic characteristic of the first physical object; and mimicking a real-world effect on the first physical object as the physics-based effect in the updated extended reality presentation based at least in part upon the recognized object using the stereoscopic model.

15. The system of claim 11, wherein the one or more virtual objects and the physics-based effect are generated by the spatial computing system and transmitted to the one or the both eyes of the user, and the physical environment comprising the second physical object is perceived by the user through the light reflected from the physical environment and perceived by the user.

16. A computer program product comprising a non-transitory computer readable storage medium having stored thereupon a sequence of instructions which, when executed by a processor, causes the processor to perform a set of acts, the set of acts comprising:

presenting, by a spatial computing system, an extended reality presentation to a user located in a physical environment, wherein
the extended reality presentation presented to the user comprises one or more virtual objects generated by the spatial computing system and transmitted to one or both eyes of the user and the physical environment, and
the physical environment includes a first physical object and a second physical object and is perceived by the user wearing at least a display subsystem of the spatial computing system via light reflected from the physical environment into the one or both eyes of the user;

rendering, by the spatial computing system, the extended-reality representation for an object interaction between the first physical object and a first virtual object of the one or more virtual objects or between the first physical object and the user;

determining a physics-based effect on the first physical object by the object interaction by using at least a stereoscopic model for the first physical object based at least in part upon the object interaction between the first physical object and the first virtual object or the user, wherein the spatial computing system renders the extended-reality representation at least by overlaying the stereoscopic model over the first physical object relative to a perspective of the user; and updating the extended reality presentation into an undated extended reality presentation based at least in part upon the physics-based effect.

17. The computer program product of claim 16, the sequence of instructions for updating the extended reality presentation into the undated extended reality presentation further comprises instructions, which when executed by the microprocessor, further causes the spatial computing system to perform the set of acts that further comprises identifying the object interaction between the first physical object and the first virtual object;

determining a separate stereoscopic model for the first virtual object based at least in part upon the object interaction between the first physical object and the first virtual object; and presenting, in the extended reality presentation, first virtual object as the stereoscopic model.

18. The computer program product of claim 17, the sequence of instructions for updating the extended reality presentation into the undated extended reality presentation further comprises instructions, which when executed by the microprocessor, further causes the spatial computing system to perform the set of acts that further comprises:

determining a separate physics-based effect on the first virtual object caused by the object interaction by using at least the separate stereoscopic model for the first virtual object; and updating the extended reality presentation into the undated extended reality presentation based at least in part upon the physics-based effect on the first physical object and the separate physics-based effect on the first virtual object.

19. The computer program product of claim 16, wherein the sequence of instructions for rendering the extended-reality representation for the object interaction further comprises instructions, which when executed by the microprocessor, further causes the spatial computing system to perform the set of acts that further comprises:

predicting the object interaction between the first physical object and the first virtual object or between the first physical object and the user, wherein the updated extended reality presentation comprises the second physical object in the physical environment, the one or more virtual objects, and the physics-based effect;

determining the stereoscopic model for the first physical object, wherein the user perceives the stereoscopic model as a three-dimensional (3D) representation of the first physical object, wherein the object interaction comprises a user-to-object interaction between the user and the first physical object or an object-to-object interaction between a first virtual object of the one or more virtual objects and the first physical object;

occluding the physical object in the extended reality presentation with the stereoscopic model of the physical object based at least in part upon a persistent coordinate frame for at least the physical environment so that the physical object is occluded by the stereoscopic model, and the persistent coordinate frame for at least the physical environment is persistent relative to the physical environment surrounding the user; and presenting, in the extended reality presentation, the stereoscopic model in place of the first physical object.

20. The computer program product of claim 16, wherein the object interaction is captured by one or more sensors as an input to a to the spatial computing system of a user-wearable extended-reality device, the physics-based effect includes a deformation of the first physical object, a movement of the first physical object, a motion of the first physical object, or a static, a dynamic, a real-time change in size, shape, direction, orientation, or location of the first physical object, or a physical-based, predicted behavior of the first physical object as perceived by the user from the updated extended-reality representation, the object interaction between the first physical object and the first virtual object or between the first physical object and the user is initiated by a command, and the command comprises the user staring at the first physical object or the first virtual object for a threshold time period, a voice command, a gesture from the user, an action by the user captured by a sensor, or a user's use of a physical or virtual controller.

* * * * *